(12) United States Patent
Uesugi

(10) Patent No.: US 12,167,296 B2
(45) Date of Patent: Dec. 10, 2024

(54) INFORMATION COLLECTING METHOD, COMMUNICATION CONTROL APPARATUS, AND INFORMATION COLLECTOR APPARATUS

(71) Applicant: PANASONIC CORPORATION, Osaka (JP)

(72) Inventor: Mitsuru Uesugi, Kanagawa (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 348 days.

(21) Appl. No.: 17/640,488

(22) PCT Filed: Aug. 26, 2020

(86) PCT No.: PCT/JP2020/032177
§ 371 (c)(1),
(2) Date: Mar. 4, 2022

(87) PCT Pub. No.: WO2021/044922
PCT Pub. Date: Mar. 11, 2021

(65) Prior Publication Data
US 2022/0345847 A1    Oct. 27, 2022

(30) Foreign Application Priority Data

Sep. 6, 2019   (JP) ................................. 2019-162835
Mar. 31, 2020   (JP) ................................. 2020-064450

(51) Int. Cl.
*H04W 4/02*    (2018.01)
*H04W 4/80*    (2018.01)

(52) U.S. Cl.
CPC ........... *H04W 4/023* (2013.01); *H04W 4/026* (2013.01); *H04W 4/80* (2018.02)

(58) Field of Classification Search
CPC .............. G06F 16/587; H04L 12/2816; H04L 12/2823; H04L 67/55; H04L 67/567; H04W 4/023; H04W 4/026; H04W 4/80
See application file for complete search history.

(56) References Cited

U.S. PATENT DOCUMENTS 6,560,221 B1   5/2003  Hara et al.
10,334,020 B2   6/2019  Lei et al.
(Continued)

FOREIGN PATENT DOCUMENTS

JP   H10-257098 A    9/1998
JP   2017-117253 A   6/2017
(Continued)

OTHER PUBLICATIONS

Internatinal Search Report issued in International Bureau of WIPO Patent Application No. PCT/JP2020/032177, dated Oct. 27, 2020, along with an English translation thereof.
(Continued)

*Primary Examiner* — Kashif Siddiqui
(74) *Attorney, Agent, or Firm* — GREENBLUM & BERNSTEIN, P.L.C.

(57) ABSTRACT

A user terminal sends out an interest including text data and an image file for matching to an information centric network. When a server receives the interest from the user terminal, the server separates the image file for matching from the interest and sends out a simple interest that includes the text data and does not include the image file for matching and a complex interest that includes the image file for matching to the information centric network. A camera associates the text data included in the simple interest with the image file for matching included in the complex interest, executes a matching process for verifying whether any of the image files accumulated in the own device matches the image file for matching based on the criteria stipulated in the text data, and transmits a matching result report to the user terminal.

18 Claims, 49 Drawing Sheets

(56) References Cited

U.S. PATENT DOCUMENTS

| | | | | |
|---|---|---|---|---|
| 2013/0258878 A1* | 10/2013 | Wakikawa | ............. | G08G 1/092 |
| | | | | 370/252 |
| 2017/0155738 A1* | 6/2017 | Dong | ...................... | H04L 67/02 |
| 2018/0248932 A1* | 8/2018 | Lei | .......................... | H04L 67/06 |
| 2020/0050627 A1 | 2/2020 | Satou et al. | | |

FOREIGN PATENT DOCUMENTS

| | | |
|---|---|---|
| JP | 2017-169093 A | 9/2017 |
| JP | 6373437 B1 | 8/2018 |
| JP | 2018-169645 A | 11/2018 |

OTHER PUBLICATIONS

Extended European Search Report issued in European Patent Office (EPO) Patent Application No. 20860804.2, dated Sep. 6, 2022.
Bazzi Alessandro et al., "Cellular aided vehicular named data networking", 2014 International Conference on connected Vehicle and Expo (ICCVE), IEEE, Nov. 3, 2014, pp. 747-752, XP032794569.
Akihiro Nakao 5GMF / The University of Tokyo Japan: "Draft Recommendation : High level technical Characteristics of Network Softwarization for IMT-2020"; TD126 (WP1/13), ITU-T DRFT; Study period 2017-2020; Study Group; Series TD126 (WP 1/13), International Telecommunication Union, Geneva; CH, vol. 6/13, 20/13, 21/13, 22/13, 23/13, Feb. 14, 2017, pp. 1-61, XP044209404.

* cited by examiner

Fig.2
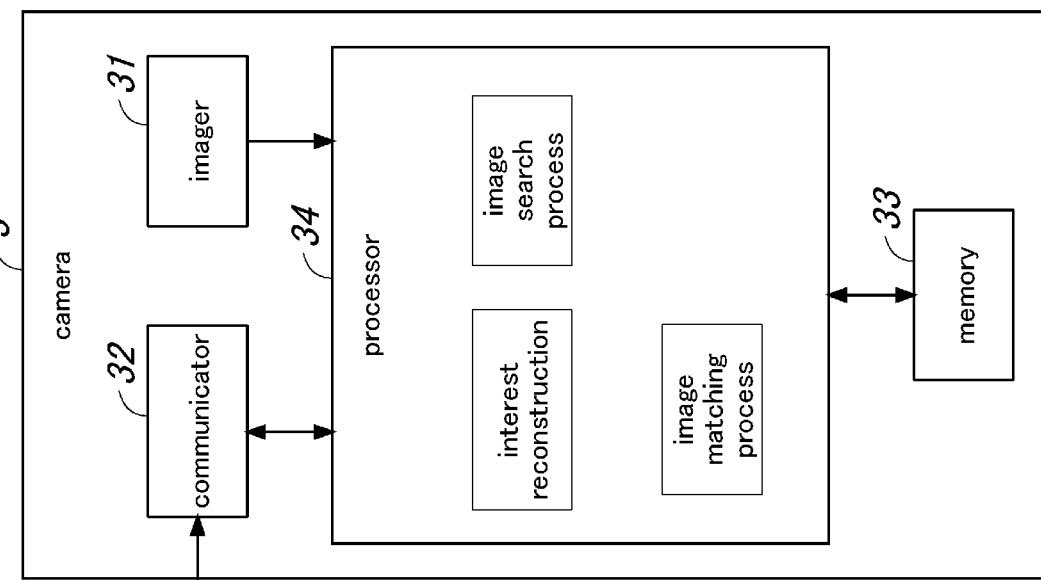
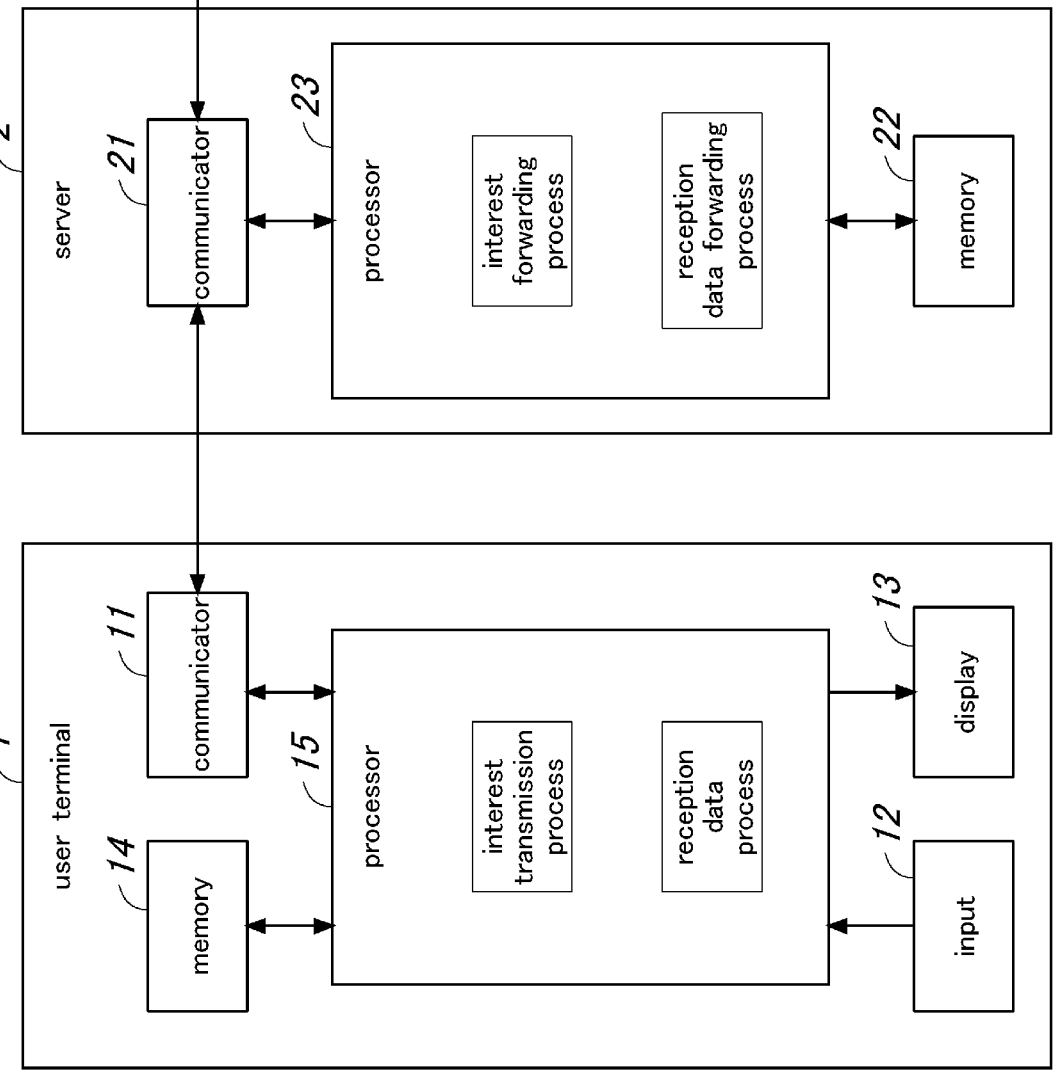

INFORMATION COLLECTING METHOD, COMMUNICATION CONTROL APPARATUS, AND INFORMATION COLLECTOR APPARATUS

TECHNICAL FIELD

The present invention relates to an information collecting method in which an information collector apparatus collects information accumulated in a content accumulating device by using an information centric network, a communication control apparatus connected to the information centric network, and an information collector apparatus connected to the information centric network.

BACKGROUND ART

An IP network (the Internet) is widely used today. In the IP network, when a user terminal acquires a content accumulated in a device, the user terminal obtains an IP address of the device and accesses the device by using the IP address so that the user terminal can acquire a necessary content.

On the other hand, as a technology alternative to such an IP network, there is known an information centric network (ICN) technology. Also, as a technology similar to the information centric network, a CCN (Contents Centric Network) and an NDN (Named Data Network) exist. These technologies may be also referred to as "attribute routing," "name routing," "information routing," and so on focusing on the method of routing (route control), and are configured to allow a content accumulated in a device to be collected by using the attributes, name, and the like of the content.

Incidentally, in the information centric network, a user can collect a necessary content from a device in the network by adding a content name including character information for identifying the necessary content to an interest (message) and transmitting the interest from the user terminal. However, the collected contents include a lot of those that the user does not need. Therefore, there is a problem that it takes a lot of time and effort to select an appropriate content from the collected contents.

To address such a problem, there is known a technology in which a device for accumulating image files (contents), such as a camera, searches the image files accumulated in the own device according to the search criteria specified by an information collector, and when image files that meet the search criteria are found, the device performs a process of verifying whether any of the image files matches an image file for matching specified by the information collector to select an appropriate image file (see Patent Document 1).

PRIOR ART DOCUMENT(S)

Patent Document(s)

[Patent Document 1] JP6373437B1

SUMMARY OF THE INVENTION

Task to be Accomplished by the Invention

However, with the aforementioned conventional technology, since the image file for matching (matching target data) is added to the interest in addition to the text data describing the search criteria, the amount of data of the interest becomes large. Therefore, when there is a low-speed line in the route to a target device in which a content meeting the criteria is accumulated, a problem of communication delay that it takes a long time till the interest reaches the target device or a problem of communication disruption that the interest fails to reach the target device occurs, and there is a problem that the image file for matching cannot be forwarded to the target device promptly and stably.

Also, with the aforementioned conventional technology, when the content (image file) requested by the user is found, the content is delivered to the information collector, but in the information centric network, the content is delivered to the information collector by reversely following the route along which the interest was forwarded. Namely, the interest and the content travel through the same line.

On the other hand, while the search criteria added to the interest require only text data and thus the interest has a small volume, the content such as an image file has a large volume. Here, in the information centric network, the interest and the content travel through the same line, and therefore, though a low-speed line is sufficient for the interest itself, it is necessary to use a high-speed line for the interest also because the content has a large volume, and this results in inefficiency.

Further, the content request (interest) is transmitted in 1-to-N communication in which the content request is simultaneously distributed to many content accumulating devices, while the content is transmitted in one-to-one communication in which the content is transmitted from the content accumulating device to the device of the information collector. Thus, it is desired to construct a system that can reconcile two apparently incompatible features, namely, 1-to-N communication using a low-speed line and one-to-one communication using a high-speed line, thereby to efficiently perform the content request and the transmission of content corresponding thereto.

In view of the above, a primary object of the present invention is to provide an information collecting method, a communication control apparatus, and an information collector apparatus which can forward the matching target data having a large amount of data to a content accumulating device promptly and stably, and can efficiently perform communication for requesting an unspecified number of content accumulating devices for a content and communication for delivering the found content to the information collector by reconciling the features of the both communications.

Means to Accomplish the Task

An information collecting method of the present invention is an information collecting method in which an information collector apparatus collects information accumulated in a content accumulating device via an information centric network, wherein: the information collector apparatus sends out an interest including request content data and matching target data to the information centric network; when a communication control apparatus connected to the information centric network receives the interest from the information collector apparatus, the communication control apparatus separates, from the interest, a simple interest that includes the request content data and does not include the matching target data and a complex interest that includes the matching target data, and sends out the simple interest and the complex interest to the information centric network; and when the content accumulating device receives the simple interest and the complex interest from the communication control apparatus, the content accumulating device associates the request content data included in the simple interest with the matching target data included in the complex interest, performs a matching process for verifying whether any of contents accumulated in an own device matches the matching target data based on criteria stipulated in the request content data, and sends out a response message including a matching result of the matching process to the information centric network.

Also, a communication control apparatus of the present invention is a communication control apparatus connected to an information centric network, comprising: a receiver that receives an interest including request content data and matching target data from an information collector apparatus; a processor that separates, from the interest, a simple interest that includes the request content data and does not include the matching target data and a complex interest that includes the matching target data; and a transmitter that sends out the simple interest and the complex interest to the information centric network.

Also, an information collecting method of the present invention is an information collecting method in which an information collector apparatus uses an information centric network to collect information accumulated in a content accumulating device, wherein the information collector apparatus transmits an interest including request content data to the content accumulating device via a low-speed communication path configuring the information centric network, and when the content accumulating device receives the interest from the information collector apparatus, the content accumulating device searches for a content that meets search criteria described in the request content data included in the interest from among contents accumulated in an own device, and when a content that meets the search criteria is found, transmits the content to the information collector apparatus via a high-speed communication path different from the low-speed communication path.

Also, an information collector apparatus of the present invention is an information collector apparatus connected to an information centric network, comprising: a transmitter that transmits an interest including request content data to a content accumulating device via a low-speed communication path configuring the information centric network; and a receiver that receives, from the content accumulating device, a content found by a search process performed by the content accumulating device to find a content that meets search criteria described in the request content data from among contents accumulated in the content accumulating device, via a high-speed communication path different from the low-speed communication path.

Effect of the Invention

According to the present invention, since the communication control apparatus separates the simple interest that includes the request content data and does not include the matching target data and the complex interest that includes the matching target data and sends them out to the information centric network, it is possible to forward the matching target data having a large amount of data to the content accumulating device promptly and stably.

Also, by use of the information centric network, it is possible to efficiently request an unspecified number of content accumulating devices for a content. In addition, even when the information centric network is configured by a low-speed communication path, an interest including text data having a small volume can be distributed stably. Also, since the content is transmitted via a high-speed communication path, even a content having a large volume can be delivered to the information collector apparatus promptly and stably. Thus, it is possible to efficiently perform communication for requesting an unspecified number of content accumulating devices for a content and communication for delivering the found content to the information collector by reconciling the features of the both communications.

BRIEF DESCRIPTION OF THE DRAWINGS

FIG. 2 is a block diagram showing schematic configurations of a user terminal 1, a server 2, and a camera 3 according to the first embodiment;

DETAILED DESCRIPTION OF THE INVENTION

Figure 1:
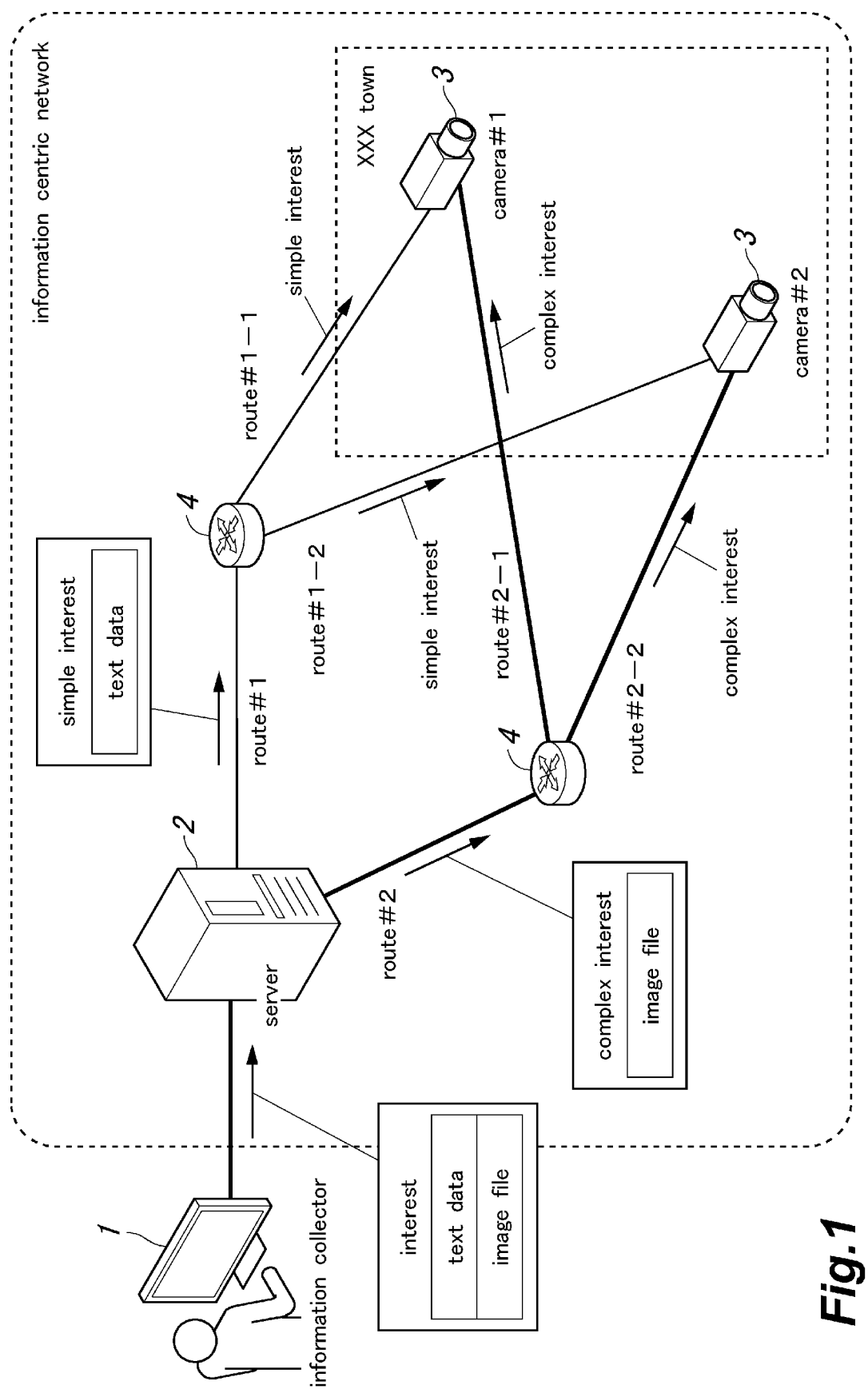
FIG. 1 is an overall configuration diagram of a communication system according to the first embodiment.

A first aspect of the present invention made to solve the above problem is an information collecting method in which an information collector apparatus collects information accumulated in a content accumulating device via an information centric network, wherein: the information collector apparatus sends out an interest including request content data and matching target data to the information centric network; when a communication control apparatus connected to the information centric network receives the interest from the information collector apparatus, the communication control apparatus separates, from the interest, a simple interest that includes the request content data and does not include the matching target data and a complex interest that includes the matching target data, and sends out the simple interest and the complex interest to the information centric network; and when the content accumulating device receives the simple interest and the complex interest from the communication control apparatus, the content accumulating device associates the request content data included in the simple interest with the matching target data included in the complex interest, performs a matching process for verifying whether any of contents accumulated in an own device matches the matching target data based on criteria stipulated in the request content data, and sends out a response message including a matching result of the matching process to the information centric network.

According to this, since the communication control apparatus separates the simple interest that includes the request content data and does not include the matching target data and the complex interest that includes the matching target data and sends them out to the information centric network, the matching target data having a large amount of data can be forwarded to the content accumulating device promptly and stably.

In a second aspect of the present invention, a data accumulating device provided on a high-speed communication path accumulates the matching target data included in the complex interest, and when the content accumulating device receives the simple interest, the content accumulating device requests the data accumulating device to provide the matching target data.

According to this, unnecessary forwarding of the complex interest is suppressed, whereby the load on the information centric network can be reduced.

In a third aspect of the present invention, the communication control apparatus sends out the simple interest to a low-speed communication path configuring the information centric network and including a communication section adapted for long range wireless communication, and sends out the complex interest to a high-speed communication path configuring the information centric network and including a communication section adapted for near field communication.

According to this, the simple interest, which has a small amount of data, is transmitted via the low-speed communication path, while the complex interest, which has a large amount of data, is transmitted via the high-speed communication path, whereby efficient communication can be achieved.

In a fourth aspect of the present invention, when the content accumulating device receives the complex interest from the communication control apparatus, the content accumulating device forwards the complex interest to another nearby content accumulating device.

According to this, the complex interest can be delivered to the content accumulating device even when the high-speed communication path does not exist or is interrupted or even when the content accumulating device is outside the wireless communication area.

In a fifth aspect of the present invention, a moving body receives the complex interest via near field communication from a station device connected to the high-speed communication path, transports the complex interest, and transmits the complex interest to the content accumulating device via near field communication.

According to this, the complex interest can be delivered to the content accumulating device even when the high-speed communication path of the information centric network does not exist or is interrupted.

In a sixth aspect of the present invention, the communication control apparatus notifies a position of the station device to the moving body, and the moving body changes a movement route so as to pass a vicinity of the station device and acquires the complex interest from the station device.

According to this, the moving body can reliably receive the complex interest from the station device. Note that regarding the change of the movement route of the moving body, measures for promoting the change of the movement route, e.g., giving an incentive such as points, may be taken.

In a seventh aspect of the present invention, the communication control apparatus sends out the complex interest including pieces of division data obtained by dividing the matching target data to the information centric network, and the content accumulating device acquires the matching target data by integrating the pieces of division data included in the complex interest.

According to this, the content accumulating device can acquire the matching target data even when the information centric network does not include an appropriate high-speed communication path. In this case, when the content accumulating device determines, based on the simple interest, that the matching target data is unnecessary, the content accumulating device may ignore the complex interest transmitted thereafter. Also, when the content accumulating device has acquired pieces of division data sufficient to appropriately execute the matching process, the content accumulating device may stop receiving the complex interest transmitted thereafter.

In an eighth aspect of the present invention, the content accumulating device executes preprocessing based on the request content data included in the simple interest during a period from when the simple interest is received till when the complex interest is received.

According to this, by executing the preprocessing during the period from when the simple interest is received till when the complex interest is received, it is possible to shorten the time or improve the efficiency of the matching process which is executed after the complex interest is received.

In a ninth aspect of the present invention, as the preprocessing, the content accumulating device searches for a content that meets search criteria described in the request content data included in the simple interest from among the contents accumulated in the own device, and determines whether the matching target data is necessary based on a result of search.

According to this, it is only required to forward the complex interest to the content accumulating device that needs the matching target data, and therefore, the load on the information centric network can be reduced.

In a tenth aspect of the present invention, when the content accumulating device determines that the matching target data is necessary, the content accumulating device transmits information related to the own device to the communication control apparatus, the communication control apparatus notifies information related to the content accumulating device that needs the matching target data to a moving body transporting the complex interest, and the moving body changes a movement route so as to pass a vicinity of the content accumulating device that needs the matching target data and forwards the complex interest to the content accumulating device.

According to this, the complex interest can be reliably forwarded from the moving body to the content accumulating device. Note that regarding the change of the movement route of the moving body, measures for promoting the change of the movement route, e.g., giving an incentive such as points, may be taken.

An eleventh aspect of the present invention is a communication control apparatus connected to an information centric network, comprising: a receiver that receives an interest including request content data and matching target data from an information collector apparatus; a processor that separates, from the interest, a simple interest that includes the request content data and does not include the matching target data; and a transmitter that sends out the simple interest and the complex interest to the information centric network.

According to this, as in the first aspect of the present invention, the matching target data having a large amount of data can be forwarded to the content accumulating device promptly and stably.

A twelfth aspect of the present invention is an information collecting method in which an information collector apparatus uses an information centric network to collect information accumulated in a content accumulating device, wherein the information collector apparatus transmits an interest including request content data to the content accumulating device via a low-speed communication path configuring the information centric network, and when the content accumulating device receives the interest from the information collector apparatus, the content accumulating device searches for a content that meets search criteria described in the request content data included in the interest from among contents accumulated in an own device, and when a content that meets the search criteria is found, transmits the content to the information collector apparatus via a high-speed communication path different from the low-speed communication path.

According to this, by use of the information centric network, it is possible to efficiently request an unspecified number of content accumulating devices for a content. In addition, even when the information centric network is configured by a low-speed communication path, an interest including text data having a small volume can be distributed stably. Also, since the content is transmitted via a high-speed communication path, even a content having a large volume can be delivered to the information collector apparatus promptly and stably. Thus, it is possible to efficiently perform communication for requesting an unspecified number of content accumulating devices for a content and communication for delivering the found content to the information collector by reconciling the features of the both communications.

In a thirteenth aspect of the present invention, the high-speed communication path configures an IP network.

According to this, it is possible to efficiently deliver the content from the content accumulating device to the information collector apparatus based on the IP address of the information collector apparatus. In this case, it is preferred to transmit the IP address of the information collector apparatus to the content accumulating device by adding it to the interest.

In a fourteenth aspect of the present invention, the content accumulating device sends out a response message, which includes a notification that the content accumulating device has transmitted the content and identification information of the content, to the information centric network, and a repeater connected to both of the low-speed communication path and the high-speed communication path receives the response message via the low-speed communication path and the content via the high-speed communication path.

According to this, the repeater performs the request for content on behalf of the information collector apparatus. Therefore, the information collector apparatus does not have to execute control taking into account that the interest transmission and the content reception are performed by using different communication paths.

In a fifteenth aspect of the present invention, the content accumulating device sends out a response message, which includes a notification that the content accumulating device has transmitted the content and identification information of the content, to the information centric network, the information collector apparatus receives the response message, and when a repeater connected to the high-speed communication path receives the content from the content accumulating device, the repeater temporarily accumulates the content and, in response to a transmission request from the information collector apparatus, transmits the content to the information collector apparatus.

According to this, since the content transmitted from the content accumulating device is temporarily accumulated in the repeater, it is possible to prevent a lot of contents from being sent to the information collector apparatus in a concentrated manner.

In a sixteenth aspect of the present invention, a wireless distributor connected to the low-speed communication path distributes the interest to the content accumulating device via long range wireless communication, and the content accumulating device forwards the content via near field communication to a wireless receiver connected to the high-speed communication path.

According to this, it is possible to simultaneously forward the interest to the content accumulating devices positioned within the communication area of the wireless distributor. Also, since the forwarding range of the interest can be limited by the communication area of the wireless distributor, unnecessary forwarding of the interest can be suppressed. Further, even when the wired high-speed communication path does not exist or is interrupted, the content of the content accumulating device can be delivered to the information collector apparatus.

In a seventeenth aspect of the present invention, a moving body receives the content from the content accumulating device via near field communication, transports the content, and forwards the content via near field communication to a station device connected to the high-speed communication path.

According to this, even when the high-speed communication path does not exist or is interrupted, the content of the content accumulating device can be delivered to the information collector apparatus.

In an eighteenth aspect of the present invention, a wireless distributor connected to the low-speed communication path notifies a position of the station device to the moving body, and the moving body changes a movement route so as to pass a vicinity of the station device and forwards the content collected from the content accumulating device to the station device.

According to this, the content can be reliably forwarded from the moving body to the station device.

In a nineteenth aspect of the present invention, wherein the content accumulating device transmits a notification that requests content collection to the wireless distributor connected to the low-speed communication path when the content that meets the search criteria was found by a search process, the wireless distributor notifies information related to the content accumulating device that requested the content collection to the moving body, and the moving body changes a movement route so as to pass a vicinity of the content accumulating device that requested the content collection and receives the content forwarded from the content accumulating device.

According to this, the content that meets the search criteria specified by the user can be reliably delivered to the moving body from the content accumulating device in which the content is accumulated.

A twentieth aspect of the present invention is an information collector apparatus connected to an information centric network, comprising: a transmitter that transmits an interest including request content data to a content accumulating device via a low-speed communication path configuring the information centric network; and a receiver that receives, from the content accumulating device, a content found by a search process performed by the content accumulating device to search for a content that meets search criteria described in the request content data from among contents accumulated in the content accumulating device, via a high-speed communication path different from the low-speed communication path.

According to this, similarly to the twelfth aspect of the present invention, it is possible to efficiently perform communication for requesting an unspecified number of content accumulating devices for a content and communication for delivering the found content to the information collector by reconciling the features of the both communications.

In the following, modes for carrying out the present invention will be described with reference to the drawings.

First Embodiment

FIG. 1 is an overall configuration diagram of a communication system according to the first embodiment.

This communication system collects necessary contents or supplementary information thereof by using an information centric network (ICN) and includes a user terminal 1 (information collector apparatus), a server 2 (communication control apparatus), and cameras 3 (content accumulating devices). The user terminal 1, the server 2, and the cameras 3 are connected to each other via the information centric network. Also, routers 4 are installed in the information centric network. Note that besides those shown in the drawing, the routers 4 are installed at appropriate locations in the information centric network.

The user terminal 1 is operated by a user (information collector) to perform operations regarding information collection. In the present embodiment, image search is performed as an example of the information collection. When necessary information is input by the user, the user terminal 1 generates an interest including text data and an image file for matching and sends out the interest to the information centric network.

Here, the text data (request content data) describes information related to the user's request content; specifically, the position information of the image capture location (area), the time information of the image capture time (period), and the like, which serve as the criteria for the search process performed by the cameras 3 (search criteria). This text data is generated according to the user's input operation related to the search criteria or the like. At this time, if the user specifies a specific area (for example, near XXX town) as the image capture location, the image files captured by any camera 3 positioned in that area become the targets. Also, if the user specifies a specific time zone as the image capture time (period), the image files captured by the cameras 3 in the time zone become the targets.

In the case of person search, for example, the image file for matching (matching target data) includes a face image or the like of the search target person. Each camera 3 performs a matching process using the face image of the search target person to select an image file in which the search target person appears. The result of the matching process is reported to the user, whereby the user can confirm the current location and the movement route of the search target person.

Upon receipt of the interest from the user terminal 1, the server 2 separates the image file for matching from the interest, generates a simple interest that includes the text data and does not include the image file for matching and a complex interest that includes the image file for matching, and sends out the simple interest and the complex interest to different communication routes of the information centric network. Particularly, the server 2 sends out the simple interest to a low-speed communication route (route #1) and sends out the complex interest to a high-speed communication route (route #2).

Upon receipt of the simple interest and the complex interest from the server 2, each camera 3 searches for an image file (content) that meets the search criteria described by the text data included in the simple interest from among the image files accumulated in the own device, and then, executes a matching process for verifying whether any of the image files found by the search matches the image file for matching included in the complex interest and transmits a response message including a matching result to the user terminal 1 that made the request (the sender of the interest).

Note that in the present embodiment, each camera 3 receives the complex interest including the image file and executes the image matching process using the image file, but the matching target data added to the complex interest is not limited to the image data. For example, voice data or odor data may be used as the matching target data. In this case, it is preferred that the text data describes, as a search criterion, information related to the type of the matching target data, namely, the type of the content that becomes the target of the search process and the matching process performed by the camera 3.

Also, the server 2 may divide the interest into two when the image file (matching target data) has a predetermined volume or more. In the case where multiple types of matching target data are the targets, it may be determined whether to divide the interest into two depending on the type of the matching target data. Namely, the interest is divided into two when the matching target data is of a predetermined type (for example, image).

Further, in the present embodiment, description is made of an example in which the cameras 3 are connected to the information centric network as the content accumulating devices, but the content accumulating devices are not limited to cameras. In the information centric network, the connected devices share contents, and therefore, devices other than the cameras, for example, not only the sensing devices such as a temperature/humidity sensor and a microphone but also the server and the routers can function as the content accumulating devices.

Next, schematic configurations of the user terminal 1, the server 2, and the camera 3 according to the first embodiment will be described. FIG. 2 is a block diagram showing schematic configurations of the user terminal 1, the server 2, and the camera 3.

The user terminal 1 includes a communicator 11, an input 12, a display 13, a memory 14, and a processor 15.

The communicator 11 transmits an interest (request message) to the network and receives, as a response to the interest, a matching result report (response message) transmitted from the network.

The input 12 enables the user (information collector) to perform input operation for specifying the search criteria and/or the image of the search target (such as a face image of a person). The display 13 displays an input image when specifying the search criteria and/or the image of the search target as well as information received by the communicator 11.

The memory 14 stores programs executed by the processor 15 and the like.

The processor 15 executes various processes related to information collection by executing the programs stored in the memory 14. In the present embodiment, the processor 15 executes an interest transmission process, a reception data process, etc.

In the interest transmission process, the processor 15 acquires the text data related to the search criteria input by the user and the image file of the search target specified by the user, generates an interest including the text data and the image file, and controls the communicator 11 to send out the interest to the information centric network.

In the reception data process, the processor 15 executes processes such as displaying, on the display 13, data received by the communicator 11 from the information centric network, which includes, for example, the matching result report from the camera 3.

The server 2 includes a communicator 21 (receiver, transmitter), a memory 22, and a processor 23.

The communicator 21 performs transmission and reception of the interest (request message) and the response message to and from the information centric network.

The memory 22 stores programs executed by the processor 23 and the like.

The processor 23 executes various processes related to information collection by executing the programs stored in the memory 22. In the present embodiment, the processor 23 executes an interest forwarding process, a reception data forwarding process, etc.

In the interest forwarding process, the processor 23 controls the communicator 21 so as to forward the interest received by the communicator 11 from an upper node (such as the router on the side of the user terminal 1) to a lower node (such as the router on the side of the camera 3) in the information centric network.

Particularly, in the present embodiment, the processor 23 separates the image file from the interest received from the user terminal 1 (image separation process) and generates a simple interest that includes the text data and does not include the image file and a complex interest that includes the image file. Then, the processor 23 controls the communicator 21 to send out the simple interest to the low-speed communication route of the information centric network and to send out the complex interest to the high-speed communication route of the information centric network.

In the reception data forwarding process, the processor 23 controls the communicator 21 so as to forward the data (for example, the matching result report) received by the communicator 11 from a lower node (such as the router on the side of the camera 3) to an upper node (such as the router on the side of the user terminal 1) in the information centric network.

The camera 3 includes an imager 31, a communicator 32 (receiver, transmitter), a memory 33, and a processor 34.

The imager 31 captures an image of the surroundings of the camera 3 and outputs the captured image data. This captured image data (still image, moving image) is stored in an image file by the processor 34.

The communicator 32 receives the interest (request message) transmitted from the information centric network and transmits the matching result report (response message) to the information centric network.

The memory 33 stores programs executed by the processor 23 and the like. Also, the memory 33 accumulates the image files generated by the processor 34.

The processor 34 executes various processes related to information collection by executing the programs stored in the memory 22. In the present embodiment, the processor 34 executes an interest reconstruction process, an image search process, an image matching process, etc.

In the interest reconstruction process, when the simple interest from the server 2 as well as the complex interest from the server 2 are received by the communicator 32, the processor 34 associates the text data included in the simple interest with the image file for matching included in the complex interest. At this time, when there are not so many received interests, the text data can be associated with the image file for matching based on the arrival timings of the simple interest and the complex interest. Note that in this interest reconstruction process, it is only required to associate the text data with the image file for matching, and it is unnecessary to reproduce the interest message including the text data and the image file for matching.

In the image search process, the processor 34 searches for an image file that meets the search criteria described in the text data from among the image files accumulated in the own device. Specifically, the text data describes, as the search criteria, the position information of the image capture location (area) and the time information of the image capture time (period), and an image file matching the image capture location (area) and the image capture time (period) is searched for.

In the image matching process, the processor 34 verifies whether any of the image files found by the image search matches the image file for matching and generates a matching result report to be transmitted to the user terminal 1 as a response to the interest. This matching result report (a response message including the matching result) is sent out from the communicator 32 to the information centric network and is forwarded along the communication path for the simple interest in the reverse direction to reach the user terminal 1.

Note that in the image matching process, a matching accuracy (certainty of the matching, recognition rate) representing the possibility that the subjects (for example, a person or the like) appearing in two image files are identical is acquired, and when the matching accuracy reaches a predetermined threshold value (for example, 90%), information indicating that the matching is successful, the identification information of the own device (camera ID), and the position information of the own device are added to the matching result report. On the other hand, when the matching accuracy does not reach the threshold value, information indicating that the matching failed, the identification information of the own device (camera ID), and the position information of the own device are added to the matching result report.

Also, in the image matching process, the processor 34 may transmit the numerical value of the matching accuracy itself to the user terminal 1 so that the user terminal 1 performs the identification judgment. In this case, when multiple matching results are returned, for example, the user terminal 1 may select the one with the highest matching accuracy or may select an optimal one taking into account both the matching accuracy and a position difference from the previously verified position. Thereby, compared to the case where the user terminal 1 receives only the success/failure information of the verification, a more appropriate one can be selected.

Figure 3:
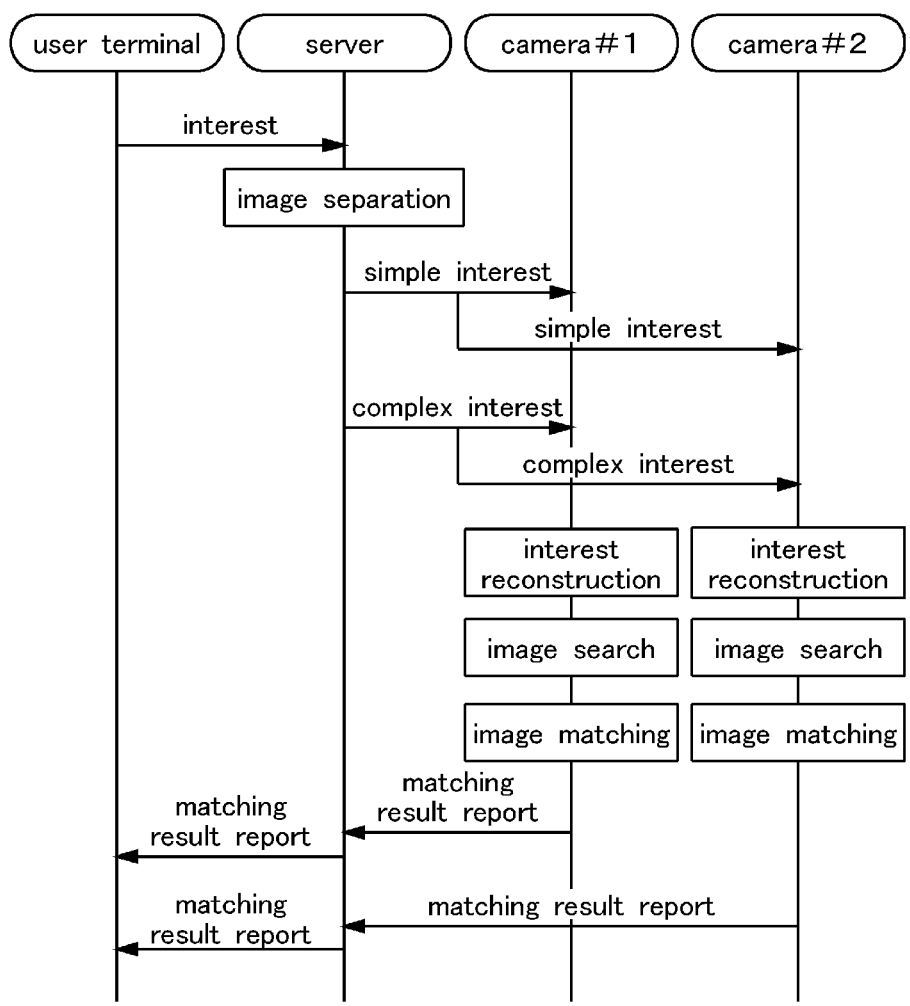
FIG. 3 is a sequence diagram showing an operating procedure of the communication system according to the first embodiment.

Next, an operating procedure of the communication system according to the first embodiment will be described. FIG. 3 is a sequence diagram showing an operating procedure of the communication system.

First, the user terminal 1 sends out an interest including text data and an image file for matching to the information centric network. Then, when the server 2 receives the interest from the user terminal 1, the server 2 separates the image file from the interest (image separation process), generates a simple interest that includes the text data and does not include the image file, and sends out the simple interest to the low-speed communication route of the information centric network (route #1). In addition, the server 2 generates a complex interest that includes the image file and sends out the complex interest to the high-speed communication route of the information centric network (route #2).

Next, when each camera 3 receives the simple interest from the server 2 as well as the complex interest from the server 2, the camera 3 associates the text data included in the simple interest with the image file for matching included in the complex interest (interest reconstruction process). Then, each camera 3 searches for an image file that meets the search criteria described in the text data from among the image files accumulated in the own device (image search). Subsequently, each camera 3 verifies whether any of the image files found by the image search matches the image file for matching (image matching). Then, each camera 3 transmits the matching result report to the server 2. This matching result report is received by the user terminal 1 via the server 2.

Second Embodiment

Figure 4:
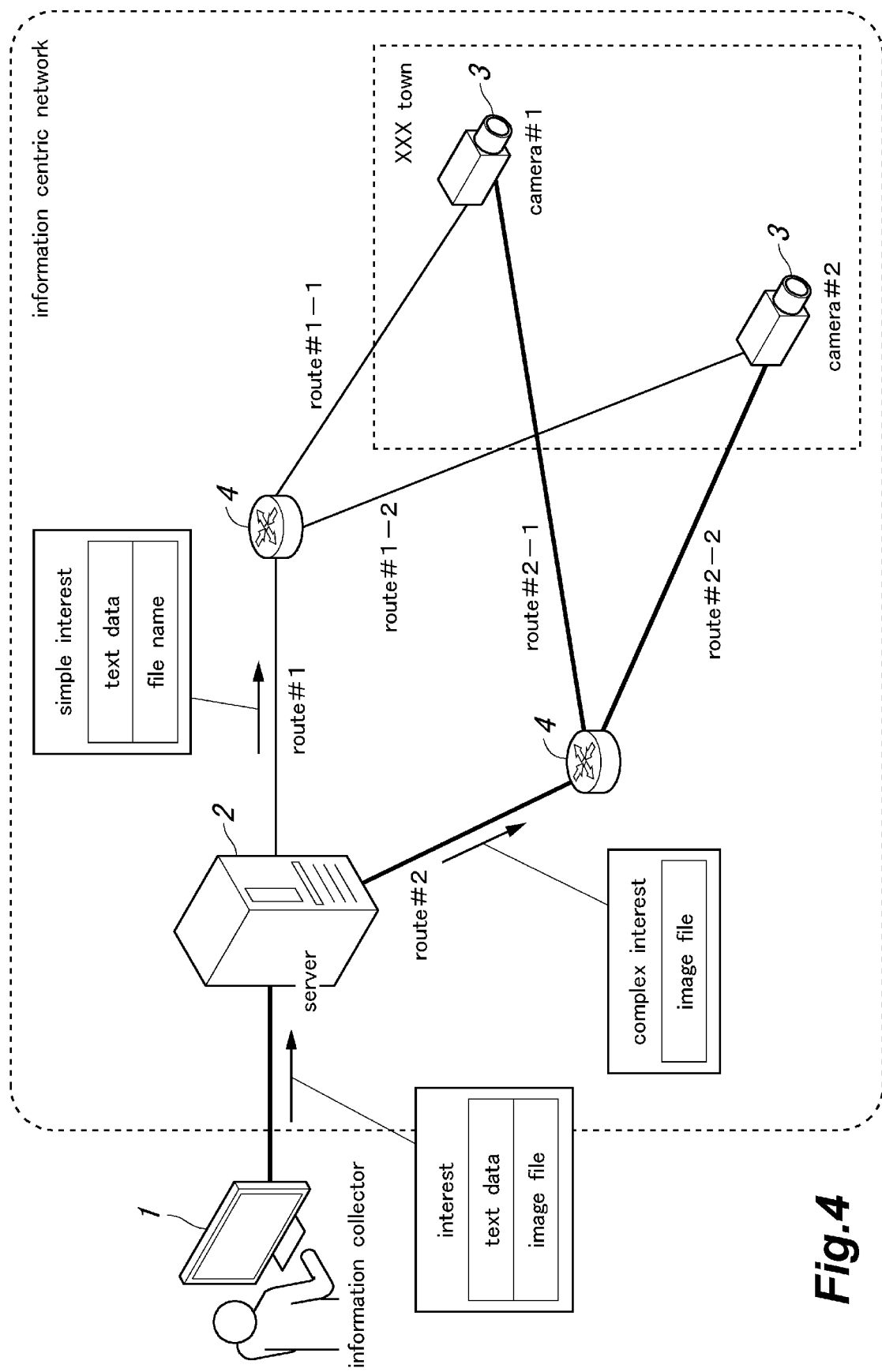
FIG. 4 is an overall configuration diagram of a communication system according to the second embodiment.

Next, the second embodiment will be described. Note that except for what will be particularly discussed here, this embodiment is the same as the above-described embodiment. FIG. 4 is an overall configuration diagram of a communication system according to the second embodiment. Note that an operating procedure of this communication system is the same as in the first embodiment (see FIG. 1).

In the present embodiment, as in the first embodiment (see FIG. 1), the server 2 separates the image data included in the interest from the user terminal 1, sends out the simple interest that includes the text data and does not include the image file to the low-speed communication route of the information centric network, and sends out the complex interest that includes the image file to the high-speed communication route of the information centric network.

On the other hand, in the present embodiment, the server 2 adds the identification information of the image file included in the complex interest to the simple interest. Here, the identification information of the image file is a file name given to the image file, for example. For example, a file name "GZA-20190624-9s3fd" is added to the simple interest. Note that each file name should be given a certain length and include time and/or random numbers (not limited to numerical numbers but may include random alphabets, symbols, and the like) so as not to be identical with other file names as much as possible.

Thereby, when the camera 3 receives the simple interest and the complex interest, the camera 3 can easily and properly execute the process (interest reconstruction process) of associating the text data included in the simple interest with the image file included in the complex interest based on the identification information of the image file included in the simple interest.

Note that in the present embodiment, the camera 3 associates the text data with the image file based on the identification information of the image file, but the server 2 may add attribute information of the image file (for example, information related to the size of the image file or information related to the type (such as a person) of the image capture target) to the simple interest and transmit it to the camera 3, and the camera 3 may associate the text data with the image file based on the attribute information of the image file.

Third Embodiment

Figure 5:
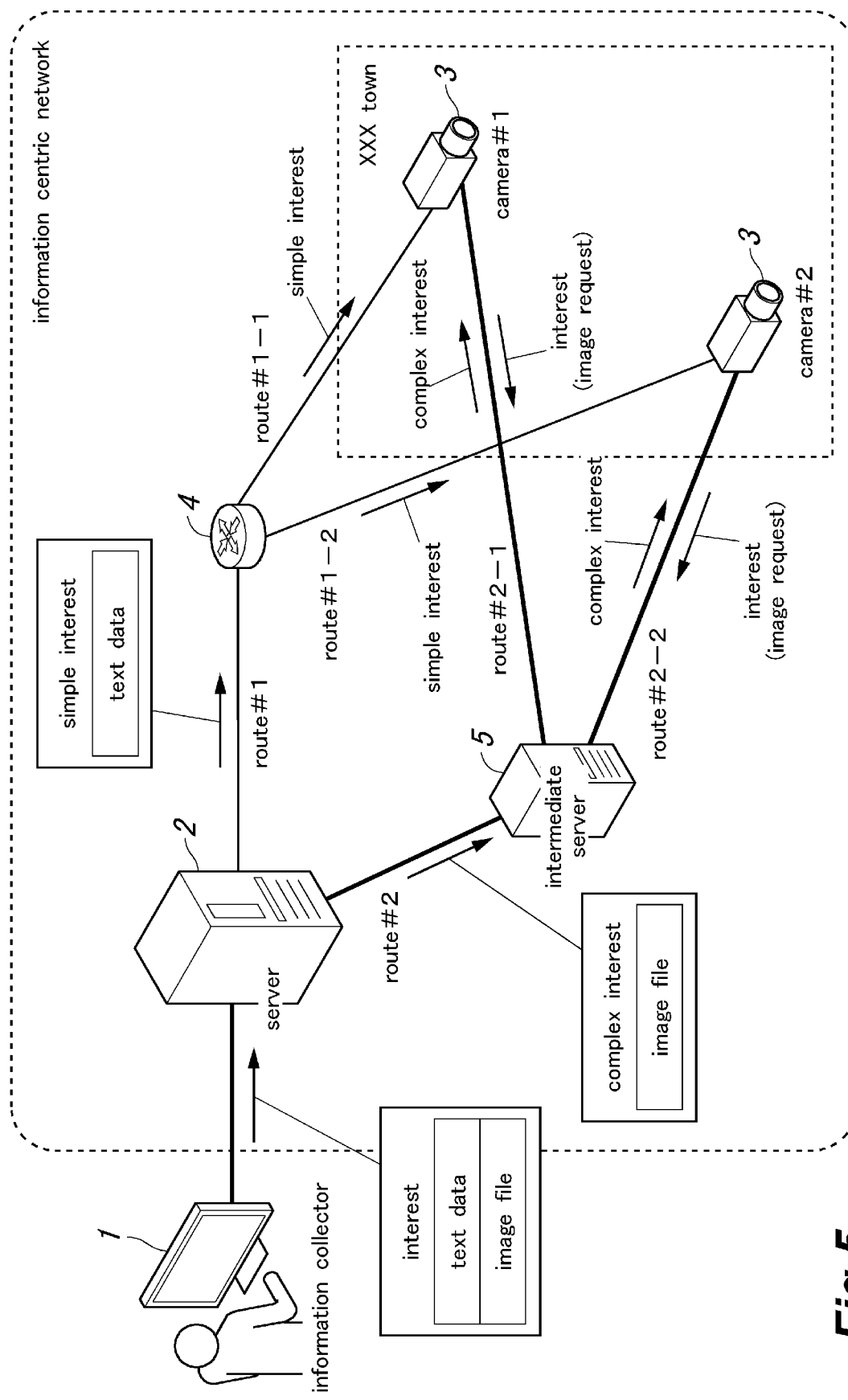
FIG. 5 is an overall configuration diagram of a communication system according to the third embodiment.

Next, the third embodiment will be described. Note that except for what will be particularly discussed here, this embodiment is the same as the above-described embodiment. FIG. 5 is an overall configuration diagram of a communication system according to the third embodiment.

In the present embodiment, as in the first embodiment (see FIG. 1), the server 2 sends out the simple interest to the low-speed communication route of the information centric network and sends out the complex interest to the high-speed communication route of the network.

On the other hand, in the present embodiment, an intermediate server 5 (data accumulating device) is installed in the high-speed communication route to which the complex interest is sent out from the server 2. When each camera 3 receives the simple interest from the server 2, the camera 3 requests the intermediate server 5 to provide the image file for matching. When the intermediate server 5 receives a complex interest from the server 2, the intermediate server 5 accumulates the image file for matching included in the complex interest, and when there is a request from any of the cameras 3, the intermediate server 5 transmits the image file for matching accumulated in the own device to the camera 3. Note that the intermediate server 5 is one of the servers 2 on the information centric network, and the image request from each camera 3 is sent out to the information centric network as an interest requesting for an image file.

Thus, in the present embodiment, when the intermediate server 5 receives a complex interest from the server 2, the intermediate server 5 does not forward the complex interest, and when there is an image request from any of the cameras 3, the intermediate server 5 transmits the image file for matching included in the complex interest to the camera 3. Therefore, unnecessary forwarding of the complex interest can be avoided and the load on the network can be reduced.

Note that each camera 3 may determine whether the image file for matching is necessary based on the text data included in the simple interest and only when it is determined that the image file for matching is necessary, the camera 3 may request the intermediate server 5 to forward the image file for matching. In this case, each camera 3 searches for an image file that meets the search criteria described in the text data from among the image files accumulated in the own device (image search), and when one or more image files that meet the search criteria are found, the camera 3 determines that the image file for matching is necessary.

Figure 6:
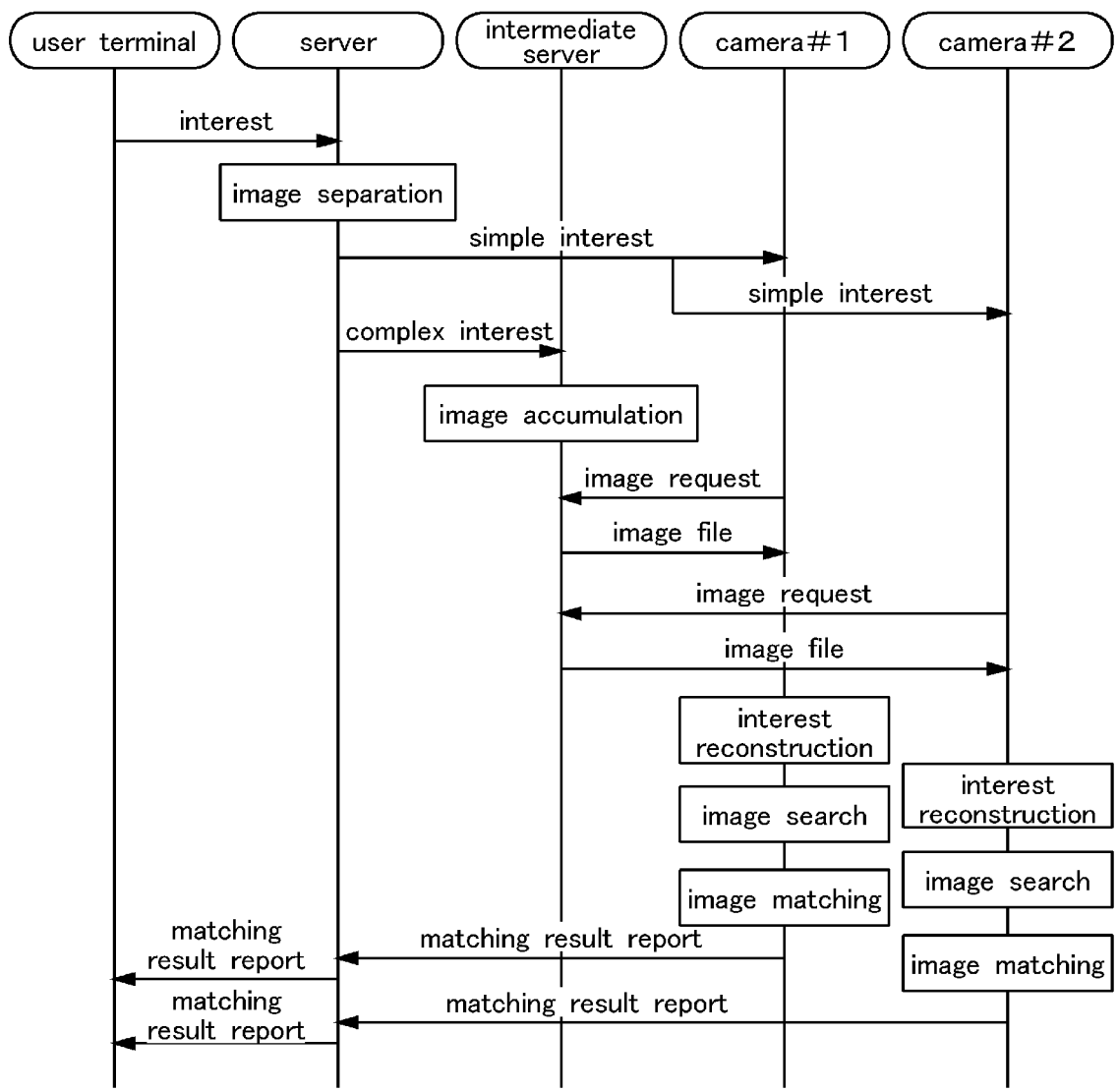
FIG. 6 is a sequence diagram showing an operating procedure of the communication system according to the third embodiment.

Next, an operating procedure of the communication system according to the third embodiment will be described. FIG. 6 is a sequence diagram showing an operating procedure of the communication system.

First, the user terminal 1 sends out an interest including text data and an image file for matching to the information centric network. Then, when the server 2 receives the interest from the user terminal 1, the server 2 separates the image file from the interest (image separation process), generates a simple interest that includes the text data and does not include the image file, and sends out the simple interest to the low-speed communication route of the information centric network. In addition, the server 2 generates a complex interest that includes the image file and sends out the complex interest to the high-speed communication route of the information centric network.

Next, when the intermediate server 5 receives the complex interest from the server 2, the intermediate server 5 accumulates the image file for matching included in the complex interest in the own device.

Also, when each camera 3 receives the simple interest from the server 2, the camera 3 transmits an image request to the intermediate server 5. Subsequently, when the intermediate server 5 receives the image request from each camera 3, the intermediate server 5 transmits the image file corresponding to the image request, which has been accumulated in the own device, to the camera 3. At this time, the image request is sent out to the information centric network as an interest, and the image file is sent out to the information centric network as response data of the interest.

Next, when each camera 3 receives the image file for matching from the intermediate server 5, the camera 3 associates the text data included in the simple interest with the image file for matching acquired from the intermediate server 5 (interest reconstruction process). Then, each camera 3 searches for an image file that meets the search criteria described in the text data from among the image files accumulated in the own device (image search). Subsequently, each camera 3 verifies whether any of the image files found by the image search matches the image file for matching (image matching). Then, each camera 3 transmits the matching result report to the server 2. This matching result report is received by the user terminal 1 via the server 2.

Modification of Third Embodiment

Figure 7:
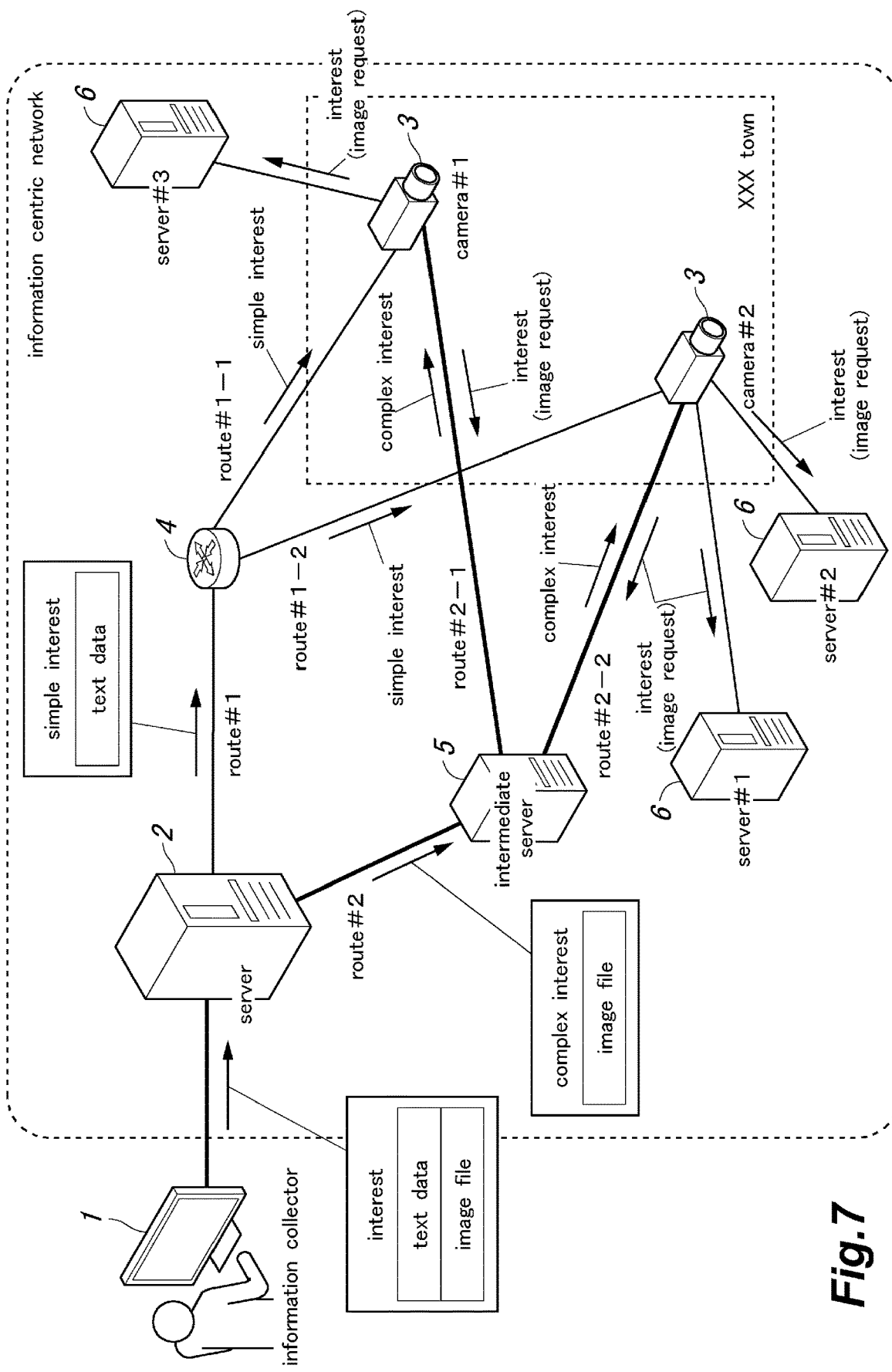
FIG. 7 is an overall configuration diagram of a communication system according to a modification of the third embodiment.

Next, a modification of the third embodiment will be described. Note that except for what will be particularly discussed here, this embodiment is the same as the above-described embodiment. FIG. 7 is an overall configuration diagram of a communication system according to the modification of the third embodiment.

In this modification, as in the third embodiment (see FIG. 5), the intermediate server 5 accumulates the image file for matching included in a complex interest from the server 2 and, upon request from any of the cameras 3, transmits the image file for matching accumulated in the own device to the camera 3.

On the other hand, in this modification, in a case where each camera 3 can access one or more additional servers 6 installed in the information centric network besides the intermediate server 5, each camera 3 requests the one or more servers 6, in addition to the intermediate server 5, to provide the image file for matching. In this case, since the image file corresponding to the request from the camera 3 is not accumulated in the additional server(s) 6, each additional server 6 transmits a response indicating that there is no applicable image file to the camera 3.

Figure 8:
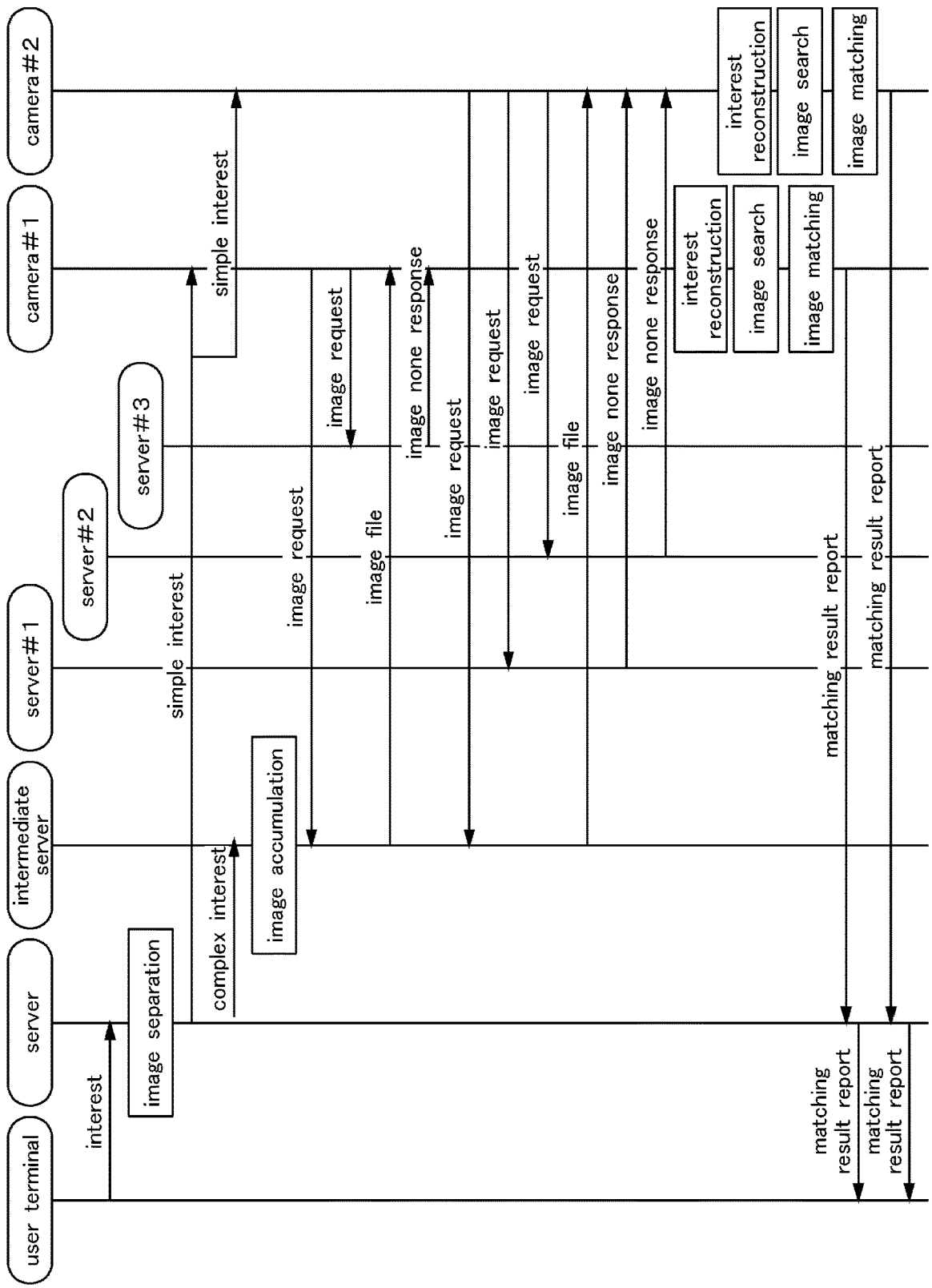
FIG. 8 is a sequence diagram showing an operating procedure of the communication system according to the modification of the third embodiment.

Next, an operating procedure of the communication system according to the modification of the third embodiment will be described. FIG. 8 is a sequence diagram showing an operating procedure of the communication system.

First, the user terminal 1 sends out an interest including text data and an image file for matching to the information centric network. Then, when the server 2 receives the interest from the user terminal 1, the server 2 separates the image file from the interest (image separation process), generates a simple interest that includes the text data and does not include the image file, and sends out the simple interest to the low-speed communication route of the information centric network. In addition, the server 2 generates a complex interest that includes the image file and sends out the complex interest to the high-speed communication route of the information centric network.

Next, when the intermediate server 5 receives the complex interest from the server 2, the intermediate server 5 accumulates the image file included in the complex interest in the own device.

Also, when each camera 3 receives the simple interest from the server 2, the camera 3 transmits an image request to the intermediate server 5 and one or more additional servers 6. Subsequently, when the intermediate server 5 receives the image request from each camera 3, the intermediate server 5 transmits the image file corresponding to the image request, which has been accumulated in the own device, to the camera 3. Also, when the one or more additional servers 6 receive the image request from the associated camera 3, each additional server 6 transmits a response indicating that there is no applicable image file to the camera 3 since the image file corresponding to the image request is not accumulated in the own device.

Next, when each camera 3 receives the image file for matching from the intermediate server 5, the camera 3 associates the text data included in the simple interest with the image file for matching acquired from the intermediate server 5 (interest reconstruction process). Then, the camera 3 searches for an image file that meets the search criteria described in the text data from among the image files accumulated in the own device (image search). Subsequently, the camera 3 verifies whether any of the image files found by the image search matches the image file for matching (image matching). Then, the camera 3 transmits the matching result report to the server 2. This matching result report is received by the user terminal 1 via the server 2.

Fourth Embodiment

Figure 9:
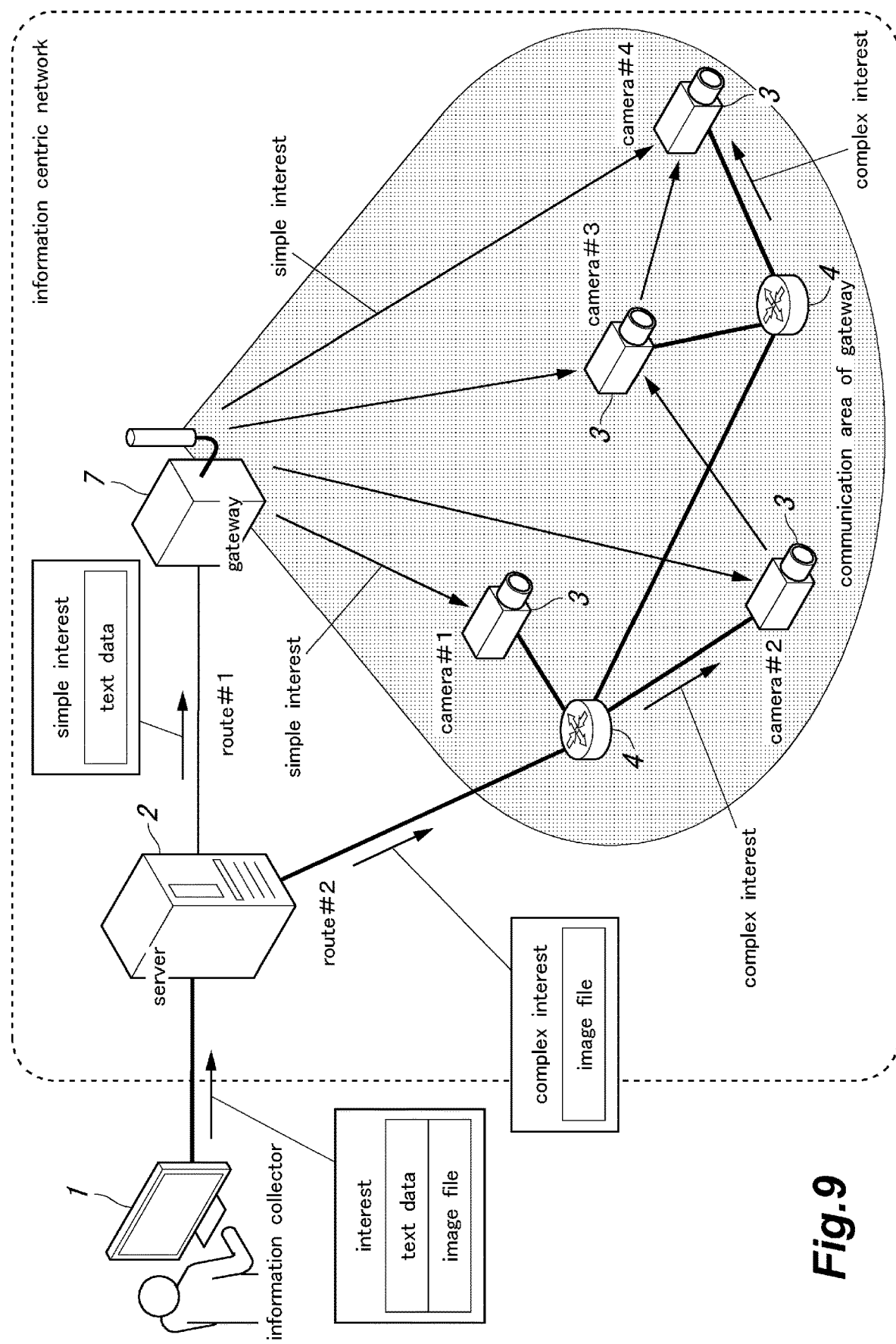
FIG. 9 is an overall configuration diagram of a communication system according to the fourth embodiment.

Next, the fourth embodiment will be described. Note that except for what will be particularly discussed here, this embodiment is the same as the above-described embodiment. FIG. 9 is an overall configuration diagram of a communication system according to the fourth embodiment.

In the present embodiment, as in the first embodiment (see FIG. 1), the server 2 sends out the simple interest to the low-speed communication route of the information centric network and sends out the complex interest to the high-speed communication route of the network.

On the other hand, in the present embodiment, the simple interest is forwarded to the cameras 3 by using a wireless line. Specifically, a gateway 7 (wireless distributor) serving as a base station for long range wireless communication, particularly, LPWA (Low Power Wide Area) communication, is installed in the low-speed communication route for transmitting the simple interest, and the simple interest is forward from the gateway 7 to the cameras 3 via LPWA communication.

The gateway 7 transmits the simple interest by broadcast via LPWA communication. Namely, the gateway 7 notifies the simple interest to the cameras 3 by broadcast communication.

Thereby, the simple interest can be forwarded simultaneously to the cameras 3 positioned within the communication area of the gateway 7. Also, the forwarding range of the simple interest can be limited by the communication area of the gateway 7. Namely, it is possible to forward the simple interest to only the cameras 3 located in a limited range. Therefore, it is possible to avoid forwarding the simple interest to the cameras 3 located over an unnecessarily wide range.

Note that the configurations of the user terminal 1, the server 2, and the camera 3 are substantially the same as in the first embodiment (see FIG. 2), but the communicator 32 of the camera 3 has a function of performing LPWA communication.

Figure 10:
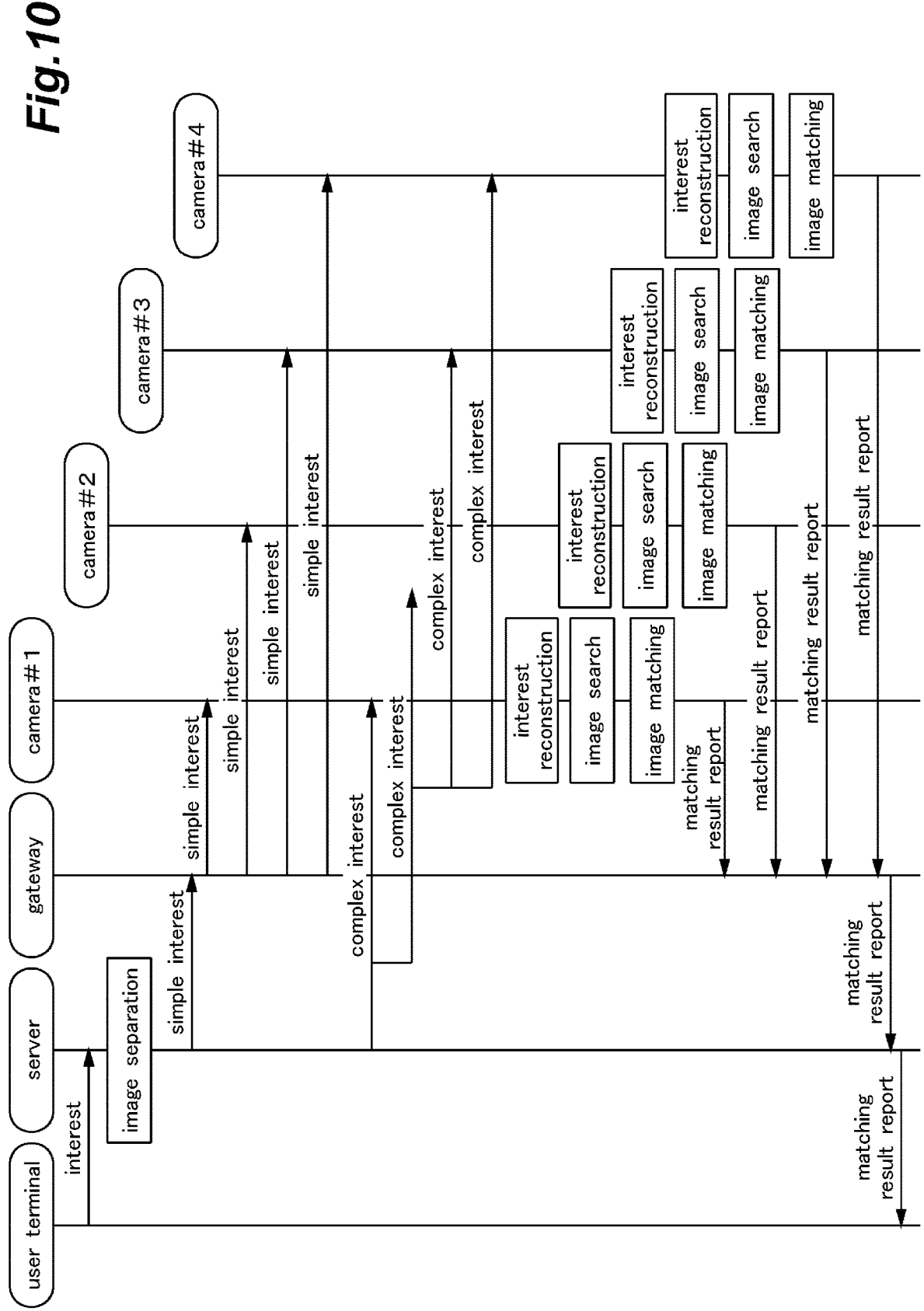
FIG. 10 is a sequence diagram showing an operating procedure of the communication system according to the fourth embodiment.

Next, an operating procedure of the communication system according to the fourth embodiment will be described. FIG. 10 is a sequence diagram showing an operating procedure of the communication system.

First, the user terminal 1 sends out an interest including text data and an image file for matching to the information centric network. Then, when the server 2 receives the interest from the user terminal 1, the server 2 separates the image file from the interest (image separation process), generates a simple interest that includes the text data and does not include the image file, and sends out the simple interest to the low-speed communication route of the information centric network. Subsequently, when the gateway 7 receives the simple interest from the server 2, the gateway 7 transmits the simple interest to the cameras 3 via LPWA communication.

Also, the server 2 generates a complex interest that includes the image file and sends out the complex interest to the high-speed communication route of the information centric network. Next, when each camera 3 receives the complex interest from the server 2, the camera 3 associates the text data included in the simple interest with the image file for matching included in the complex interest (interest reconstruction process). Then, each camera 3 searches for an image file that meets the search criteria described in the text data from among the image files accumulated in the own device (image search). Subsequently, each camera 3 verifies whether any of the image files found by the image search matches the image file for matching (image matching). Then, each camera 3 transmits the matching result report to the gateway 7 via LPWA communication.

Next, when the gateway 7 receives the matching result report from the cameras 3, the gateway 7 sends out the matching result report to the low-speed route of the information centric network. This matching result report is received by the user terminal 1 via the server 2.

Fifth Embodiment

Figure 11:
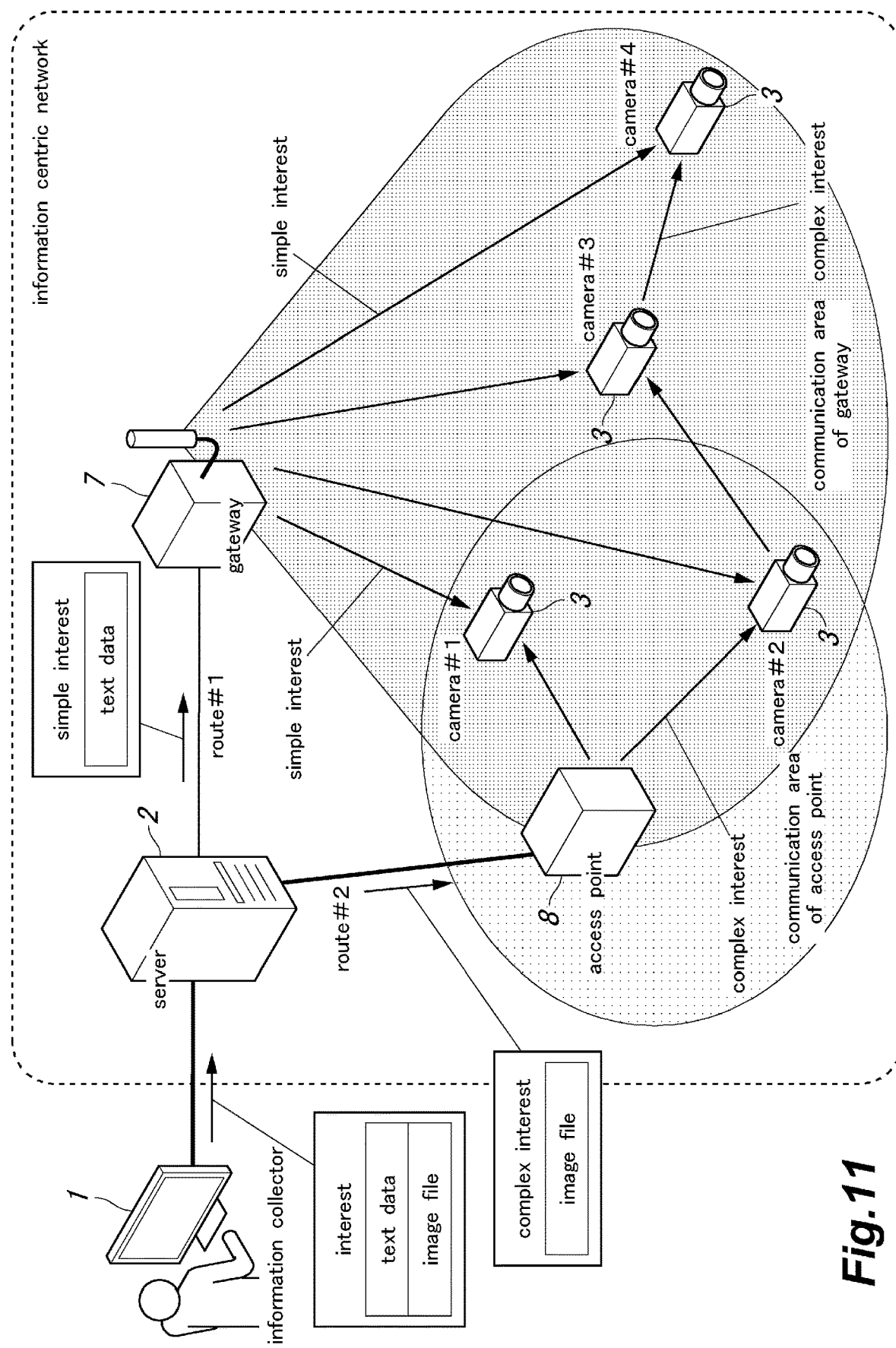
FIG. 11 is an overall configuration diagram of a communication system according to the fifth embodiment.

Next, the fifth embodiment will be described. Note that except for what will be particularly discussed here, this embodiment is the same as the above-described embodiment. FIG. 11 is an overall configuration diagram of a communication system according to the fifth embodiment.

In the present embodiment, as in the fourth embodiment (see FIG. 9), the simple interest is transmitted from the gateway 7 to the cameras 3 via LPWA communication.

On the other hand, in the present embodiment, an access point 8 (wireless distributor) that performs relatively high-speed near field communication, specifically, WLAN communication such as WiFi (registered trademark) communication, is installed in the high-speed communication route for transmitting the complex interest, and the complex interest is forwarded from the access point 8 to the cameras 3 via WLAN communication.

Also, the communication area (radio wave reach range) of WiFi (registered trademark) is smaller than the communication area of LPWA, and therefore, there may be a case where the single access point 8 cannot transmit the complex interest to the all cameras 3 in the communication area of LPWA.

Therefore, in the present embodiment, the complex interest is forwarded between multiple nearby cameras 3 by multi-hop communication. Namely, the complex interest is forwarded from a camera 3 positioned within the communication area of the access point 8 to nearby cameras 3 in turn, so that the cameras 3 positioned outside the communication area of the access point 8 can acquire the complex interest.

Figure 12:
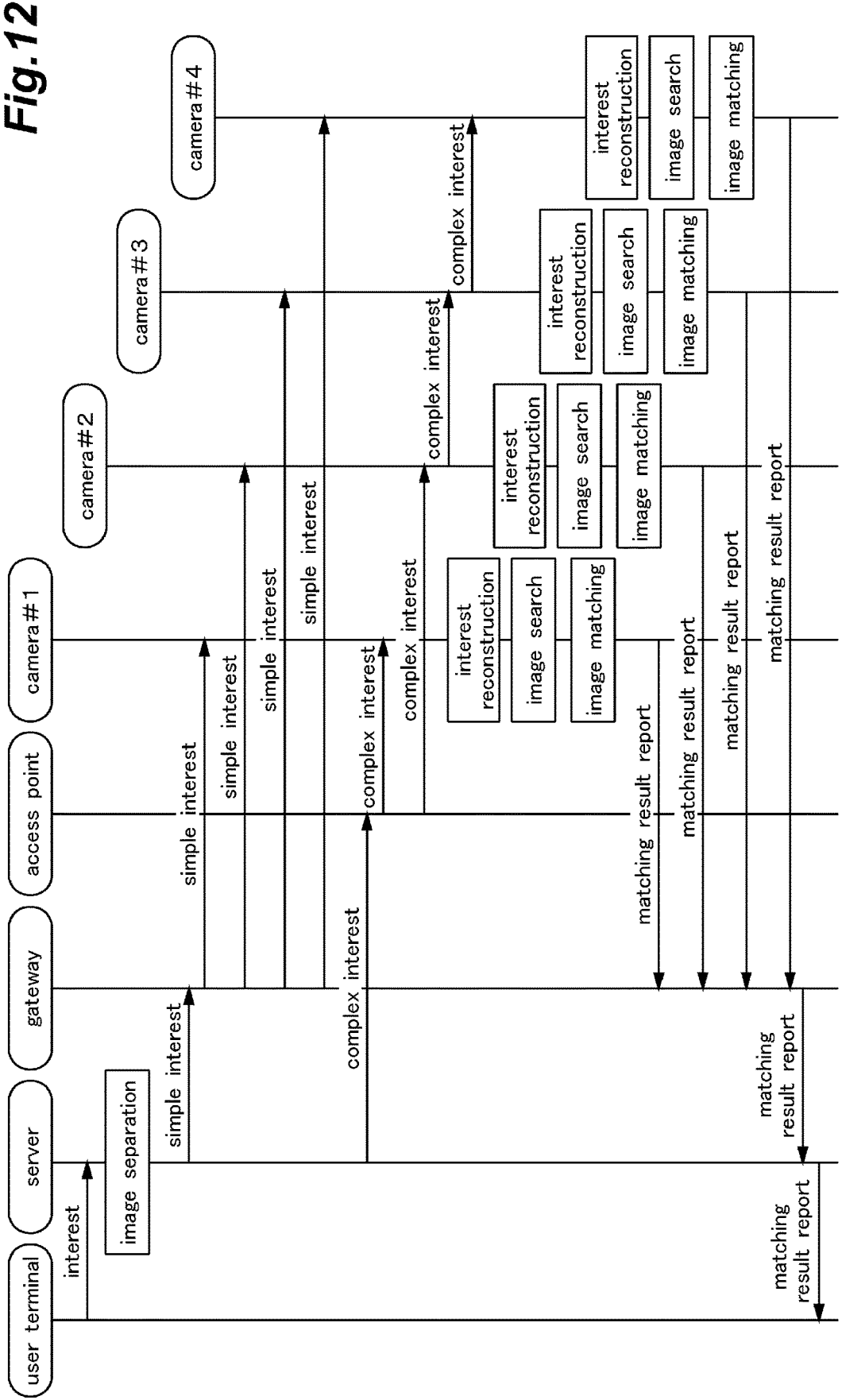
FIG. 12 is a sequence diagram showing an operating procedure of the communication system according to the fifth embodiment.

Next, an operating procedure of the communication system according to the fifth embodiment will be described. FIG. 12 is a sequence diagram showing an operating procedure of the communication system.

First, the user terminal 1 sends out an interest including text data and an image file for matching to the information centric network. Then, when the server 2 receives the interest from the user terminal 1, the server 2 separates the image file from the interest (image separation process), generates a simple interest that includes the text data and does not include the image file, and sends out the simple interest to the low-speed communication route of the information centric network. Subsequently, when the gateway 7 receives the simple interest from the server 2, the gateway 7 transmits the simple interest to the cameras 3 via LPWA communication.

Also, the server 2 generates a complex interest that includes the image file and sends out the complex interest to the high-speed communication route of the information centric network. Subsequently, when the access point 8 receives the complex interest from the server 2, the access point 8 forwards the complex interest to some cameras 3 via WLAN communication. Also, when the some cameras 3 receive the complex interest from the access point 8, these cameras 3 forward the complex interest to other cameras 3 around them.

Next, when each camera 3 receives the complex interest from the access point 8 or another camera 3, the camera 3 associates the text data included in the simple interest with the image file for matching included in the complex interest (interest reconstruction process). Then, each camera 3 searches for an image file that meets the search criteria described in the text data from among the image files accumulated in the own device (image search). Subsequently, each camera 3 verifies whether any of the image files found by the image search matches the image file for matching (image matching). Then, each camera 3 transmits the matching result report to the gateway 7 via LPWA communication.

Next, when the gateway 7 receives the matching result report from the cameras 3, the gateway 7 sends out the matching result report to the low-speed route of the information centric network. This matching result report is received by the user terminal 1 via the server 2.

Sixth Embodiment

Figure 13:
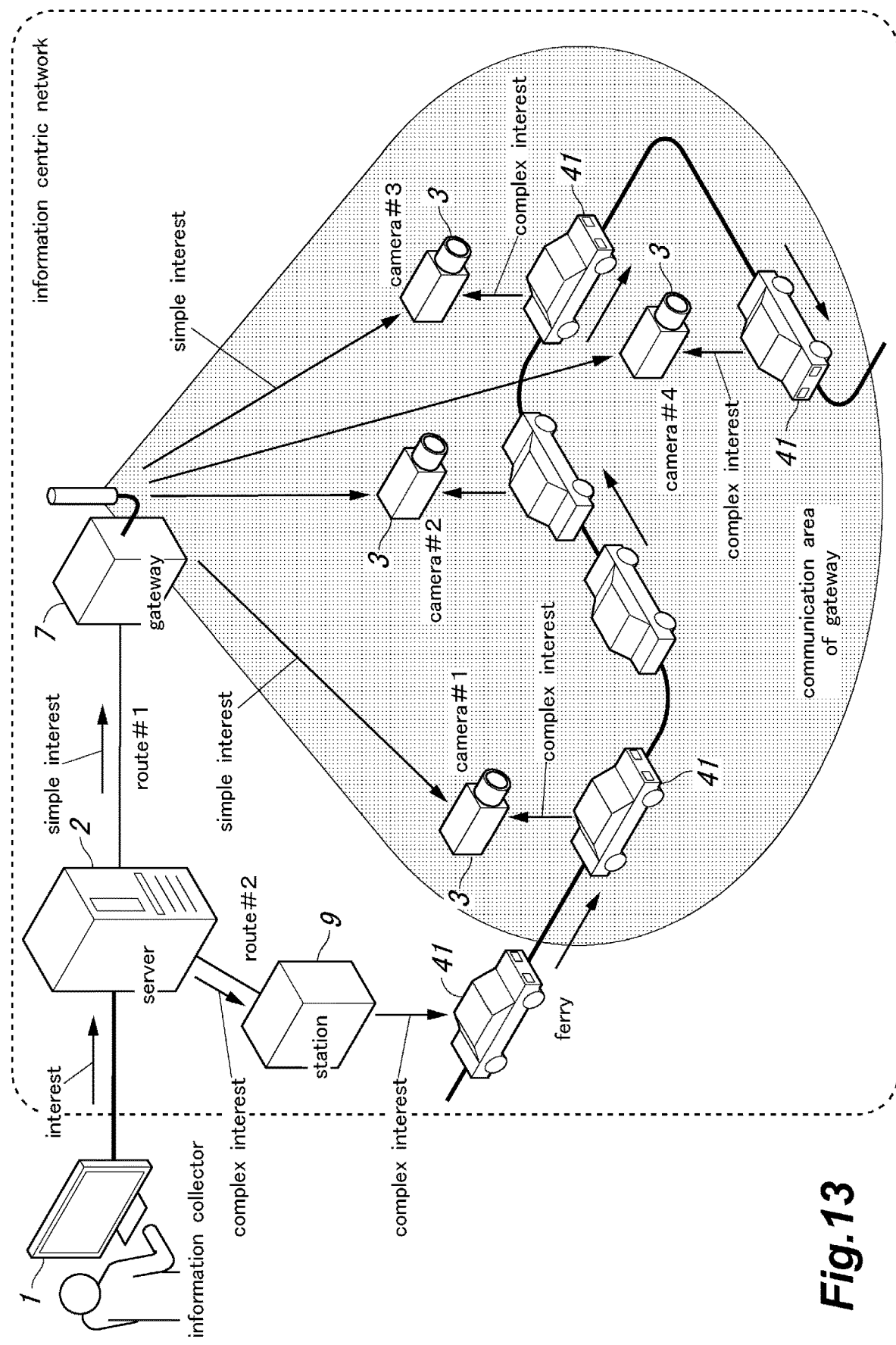
FIG. 13 is an overall configuration diagram of a communication system according to the sixth embodiment.

Next, the sixth embodiment will be described. Note that except for what will be particularly discussed here, this embodiment is the same as the above-described embodiment. FIG. 13 is an overall configuration diagram of a communication system according to the sixth embodiment.

In the present embodiment, as in the fourth embodiment (see FIG. 9), the simple interest is transmitted from the gateway 7 to the cameras 3 via LPWA communication.

On the other hand, in the present embodiment, the complex interest is forwarded to the cameras 3 by using a moving body such as a vehicle or a pedestrian as a ferry 41 that transports the complex interest according to a message ferry method. A station 9 (station device) is installed in the high-speed communication route of the information centric network (route #2). This station 9 accumulates a complex interest received from the high-speed communication route, and when the ferry 41 arrives at the station 9, the station 9 forwards the complex interest to the ferry 41. When the ferry 41 arrives at a camera 3, the ferry 41 forwards the complex interest to the camera 3.

As described above, in the present embodiment, since the complex interest is forwarded to the cameras 3 by the message ferry method, it is possible to deliver the complex interest to the cameras 3 even when the high-speed communication route of the information centric network ends up partway.

Note that in the case where a vehicle acts as the ferry 41, an onboard terminal installed in the vehicle specifically performs the operation of the ferry 41. This onboard terminal has a function of the information centric network.

Also, in the present embodiment, the forwarding of the complex interest from the station 9 to the ferry 41 and the forwarding of the complex interest from the ferry 41 to each camera 3 are performed via wired communication. Therefore, the station 9 and the ferry 41 are connected by communication terminals, and the ferry 41 and each camera 3 are connected by communication terminals. In this case, for example, a charger may be annexed to the station 9 so that when the charger and an electric vehicle are connected to transmit electric power for charging from the charger to the electric vehicle, the complex interest is forwarded from the station 9 to the ferry 41.

Figure 14:
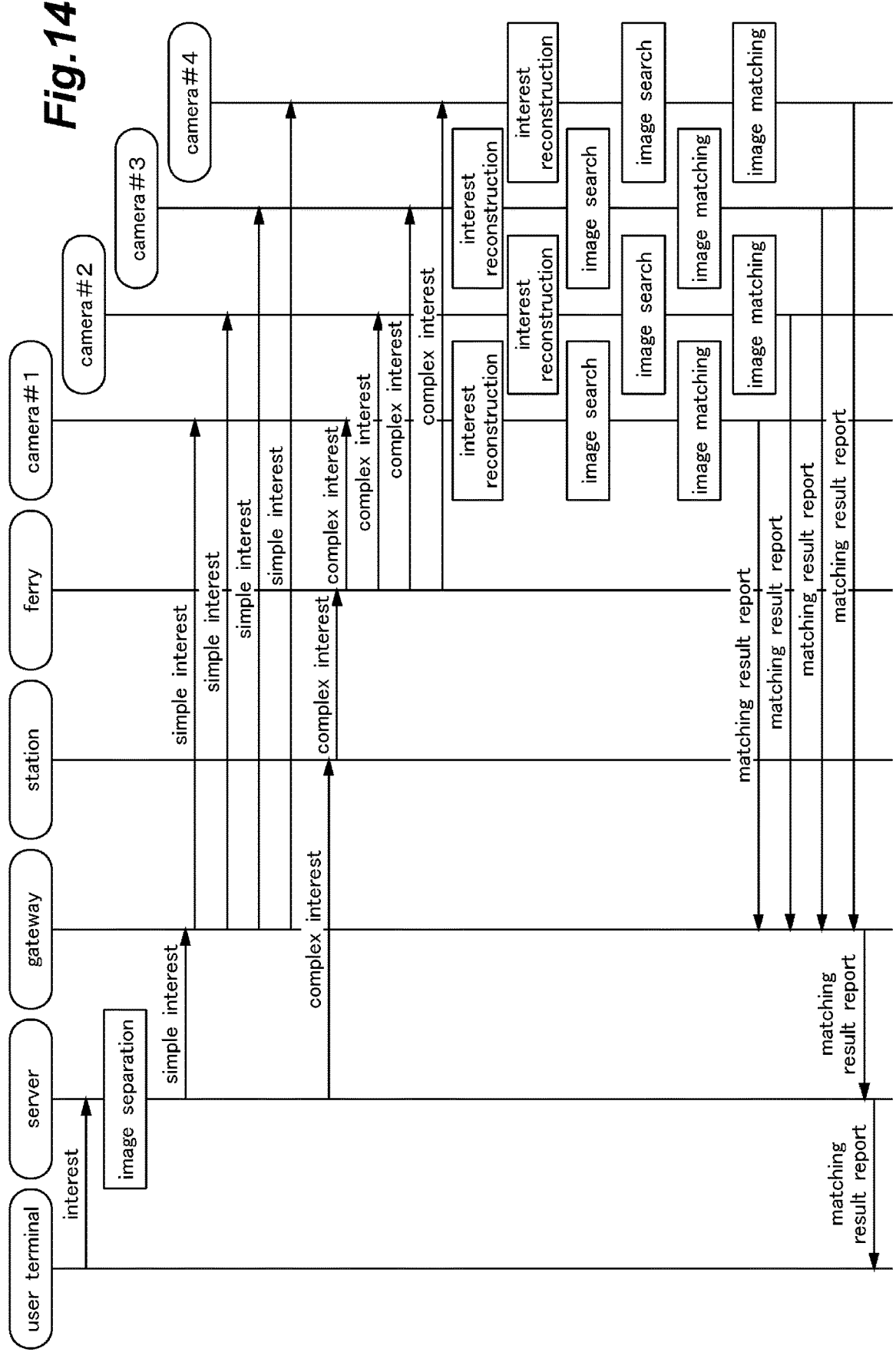
FIG. 14 is a sequence diagram showing an operating procedure of the communication system according to the sixth embodiment.

Next, an operating procedure of the communication system according to the sixth embodiment will be described. FIG. 14 is a sequence diagram showing an operating procedure of the communication system.

First, the user terminal 1 sends out an interest including text data and an image file for matching to the information centric network. Then, when the server 2 receives the interest from the user terminal 1, the server 2 separates the image file from the interest (image separation process), generates a simple interest that includes the text data and does not include the image file, and sends out the simple interest to the low-speed communication route of the information centric network. Subsequently, when the gateway 7 receives the simple interest from the server 2, the gateway 7 transmits the simple interest to the cameras 3 via LPWA communication.

Also, the server 2 generates a complex interest that includes the image file and sends out the complex interest to the high-speed communication route of the information centric network. Next, when the station 9 receives the complex interest from the server 2, the station 9 forwards the complex interest to the ferry 41. Then, when the ferry 41 receives the complex interest from the station 9, the ferry 41 forwards the complex interest to the cameras 3.

Next, when each camera 3 receives the complex interest from the ferry 41, the camera 3 associates the text data included in the simple interest with the image file for matching included in the complex interest (interest reconstruction process). Then, each camera 3 searches for an image file that meets the search criteria described in the text data from among the image files accumulated in the own device (image search). Subsequently, each camera 3 verifies whether any of the image files found by the image search matches the image file for matching (image matching). Then, each camera 3 transmits the matching result report to the gateway 7 via LPWA communication.

Next, when the gateway 7 receives the matching result report from the cameras 3, the gateway 7 sends out the matching result report to the low-speed route of the information centric network. This matching result report is received by the user terminal 1 via the server 2. Note that in a case where the ferry has a camera installed therein and has an LPWA communication function, the camera installed in the ferry also may function as the camera 3. In this case, information on the location where the image was captured needs to be added to the matching result report.

Seventh Embodiment

Figure 15:
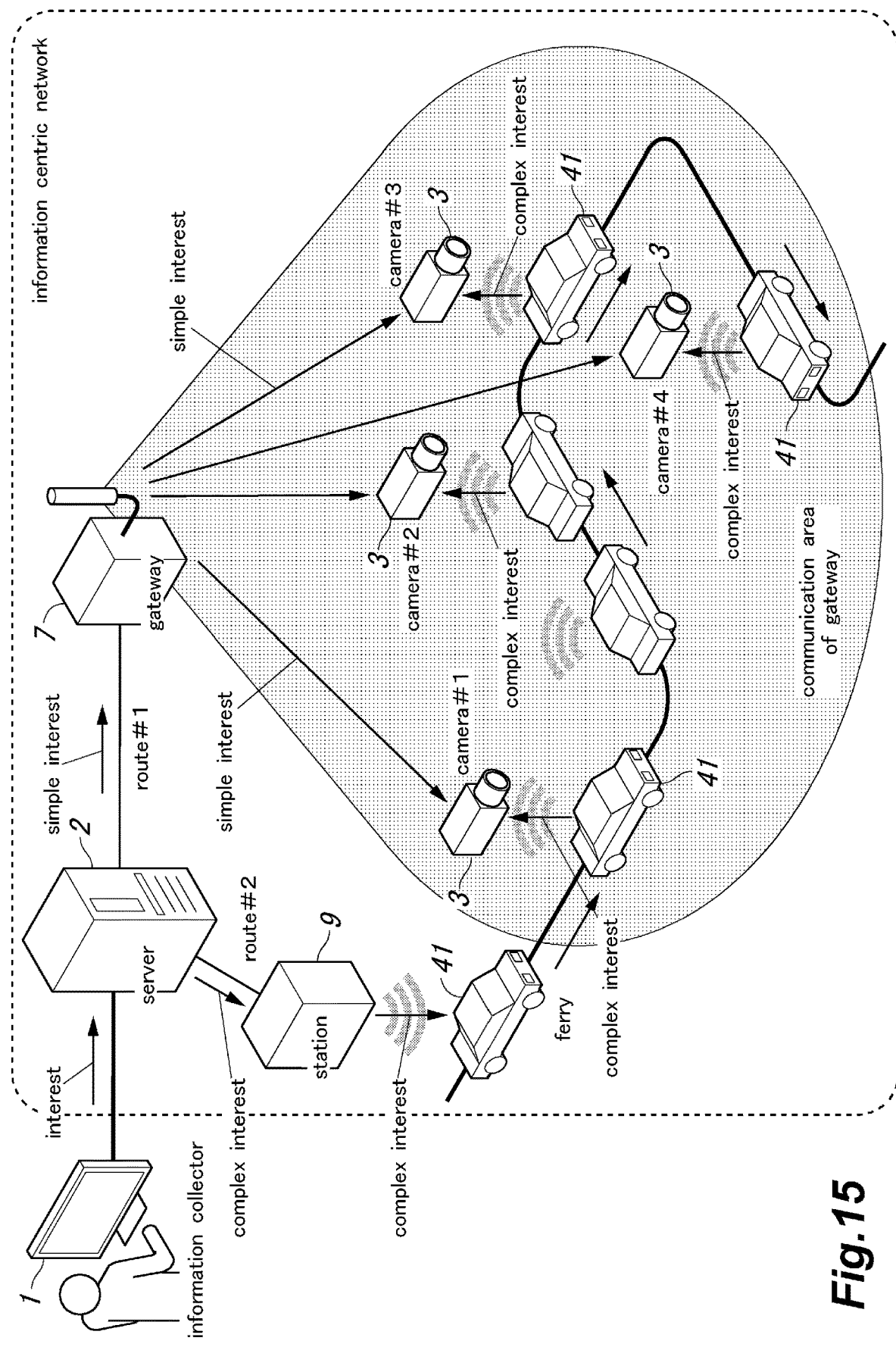
FIG. 15 is an overall configuration diagram of a communication system according to the seventh embodiment.

Next, the seventh embodiment will be described. Note that except for what will be particularly discussed here, this embodiment is the same as the above-described embodiment. FIG. 15 is an overall configuration diagram of a communication system according to the seventh embodiment.

In the present embodiment, as in the sixth embodiment (see FIG. 13), the simple interest is transmitted from the gateway 7 to the cameras 3 via LPWA communication. Also, the station 9 forwards the complex interest to the ferry 41. And, the ferry 41 forwards the complex interest to the cameras 3.

On the other hand, in the present embodiment, the forwarding of the complex interest from the station 9 to the ferry 41 and the forwarding of the complex interest from the ferry 41 to each camera 3 are performed via near field communication such as WLAN communication.

Thereby, when the complex interest is forwarded from the station 9 to the ferry 41, it is only necessary for the ferry 41 to travel near the station 9 without arriving at the station 9. Also, when the complex interest is forwarded from the ferry 41 to each camera 3 also, it is only necessary for the ferry 41 to travel near the camera 3.

Note that the operating procedure of the communication system according to the present embodiment is the same as in the sixth embodiment (see FIG. 1), but in the present embodiment, the complex interest is forwarded from the ferry 41 to each camera 3 via WLAN communication.

Also, in the present embodiment, the ferry 41 forwards the complex interest to each camera 3 via near field communication such as WLAN communication, but the communication method is not limited to WLAN communication. For example, it is possible to forward the complex interest from the ferry 41 to each camera 3 via infrared communication, Bluetooth (registered trademark), millimeter wave communication, or the like.

Eighth Embodiment

Figure 16:
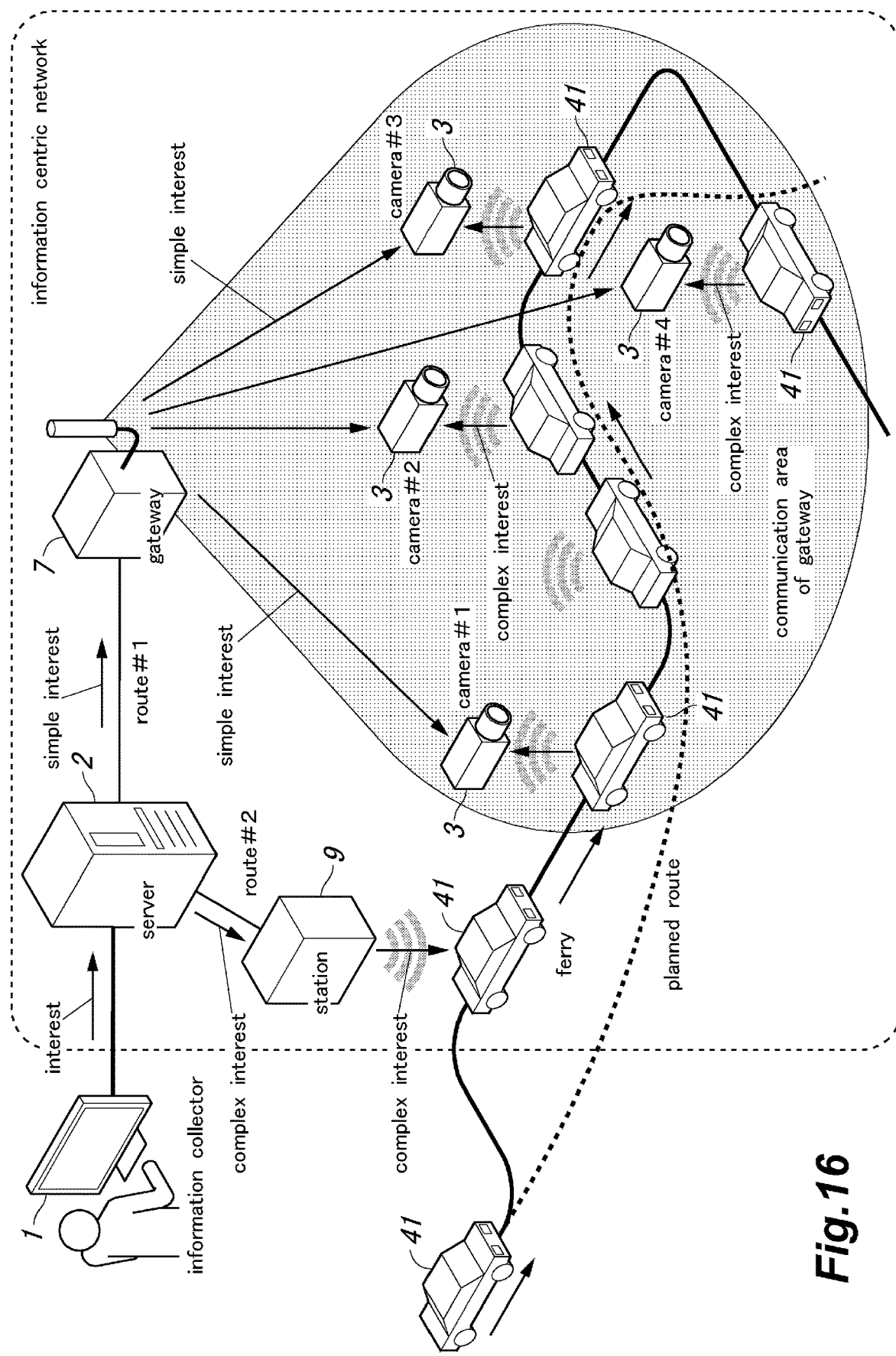
FIG. 16 is an overall configuration diagram of a communication system according to the eighth embodiment.

Next, the eighth embodiment will be described. Note that except for what will be particularly discussed here, this embodiment is the same as the above-described embodiment. FIG. 16 is an overall configuration diagram of a communication system according to the eighth embodiment.

In the present embodiment, as in the seventh embodiment (see FIG. 15), the simple interest is transmitted from the gateway 7 to the cameras 3 via LPWA communication. Also, the ferry 41 forwards the complex interest to the cameras 3 via near field communication such as WLAN communication.

On the other hand, in the present embodiment, the server 2 notifies the position of the station 9 to the ferry 41. Then, the ferry 41 changes the planned route to a route passing near the station 9 so that the complex interest can be forwarded from the station 9.

As described above, in the present embodiment, since the ferry 41 changes the route so as to pass near the station 9, the complex interest can be forwarded reliably from the station 9 to the cameras 3.

Note that in the present embodiment, since the route of the ferry 41 (moving body) is changed, cooperation of the person who controls the ferry 41 (for example, in the case where the ferry 41 is a vehicle, the driver of the vehicle) is necessary. Therefore, to promote the cooperation of the person who controls the ferry 41, an incentive (such as card points and discount coupon) may be given when the person cooperates to change the route.

Figure 17:
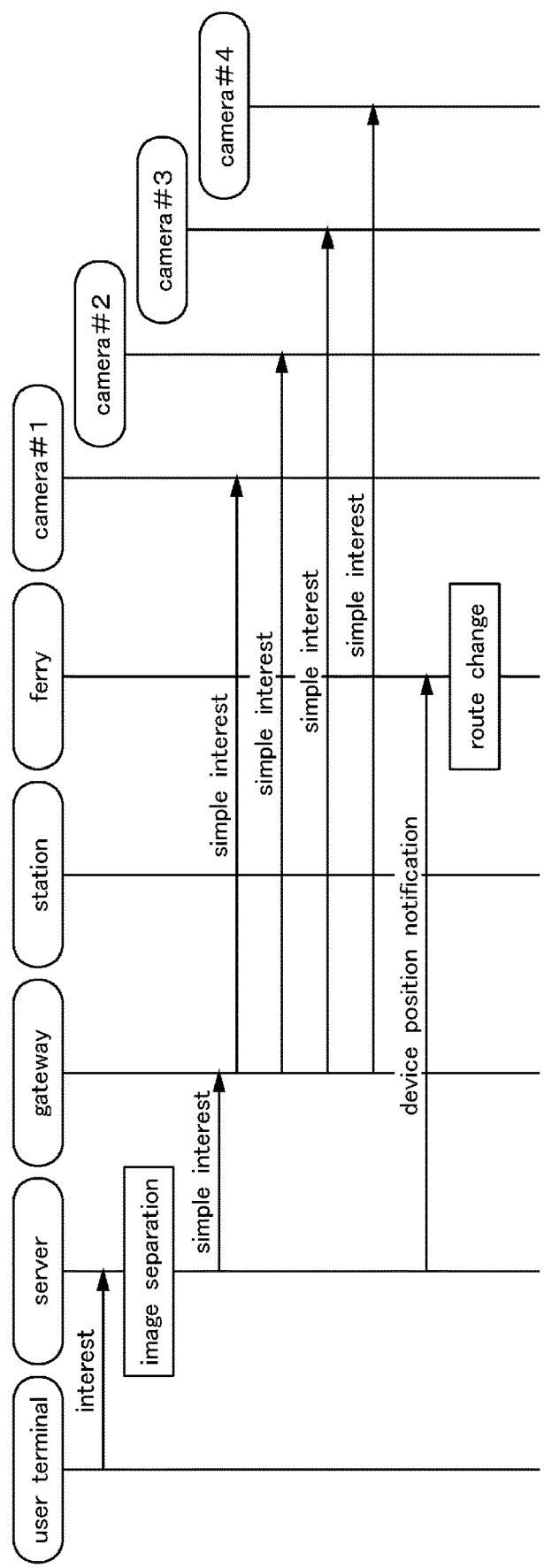
FIG. 17 is a sequence diagram showing an operating procedure of the communication system according to the eighth embodiment.
Figure 18:
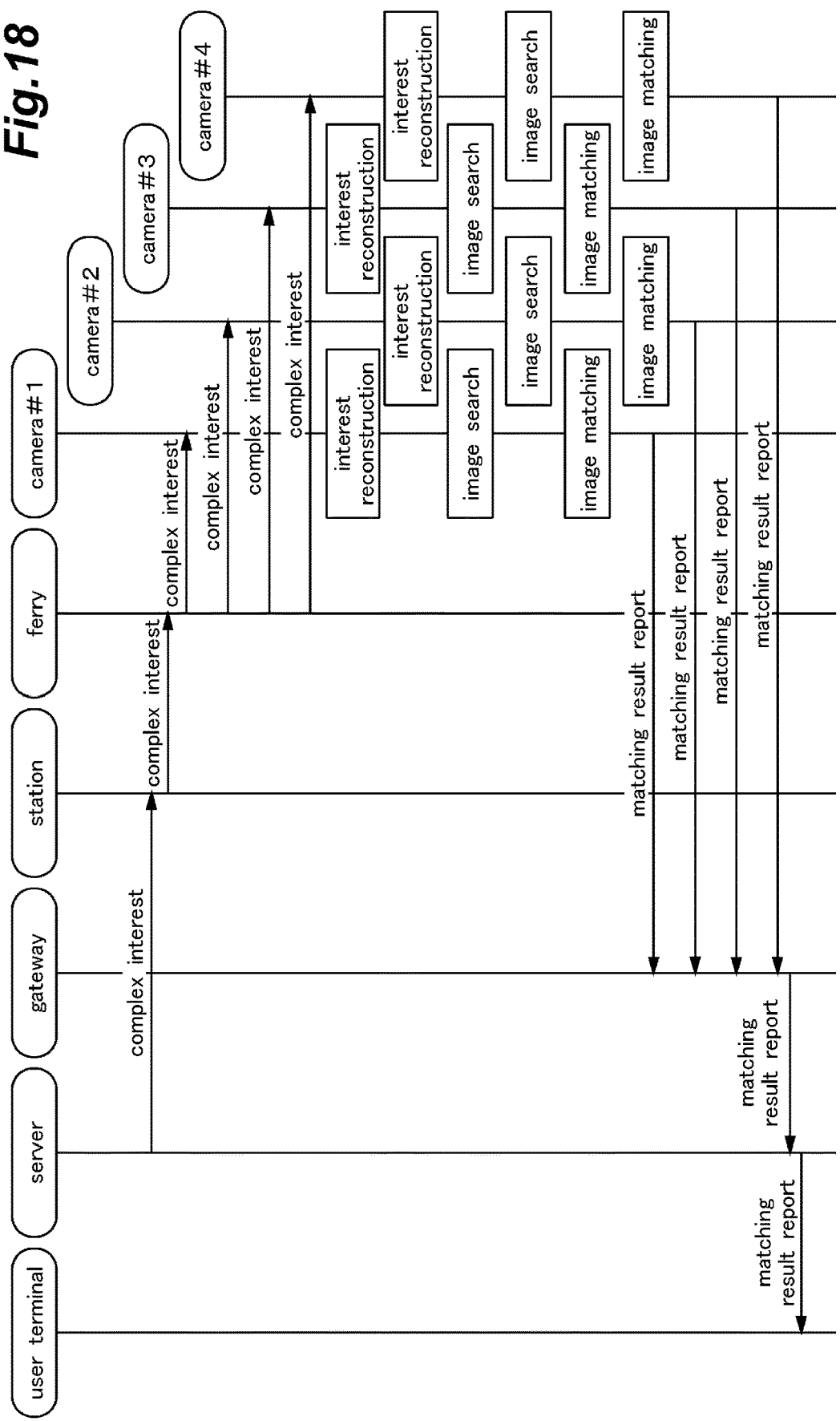
FIG. 18 is a sequence diagram showing an operating procedure of the communication system according to the eighth embodiment.

Next, an operating procedure of the communication system according to the eighth embodiment will be described. FIGS. 17 and 18 are a sequence diagram showing an operating procedure of the communication system.

As shown in FIG. 17, first, the user terminal 1 sends out an interest including text data and an image file for matching to the information centric network. Then, when the server 2 receives the interest from the user terminal 1, the server 2 separates the image file from the interest (image separation process), generates a simple interest that includes the text data and does not include the image file, and sends out the simple interest to the low-speed communication route of the information centric network Subsequently, when the gateway 7 receives the simple interest from the server 2, the gateway 7 transmits the simple interest to the cameras 3 via LPWA communication.

Also, the server 2 transmits a device position notification (interest) including the position information of the station 9 to the ferry 41. Then, when the ferry 41 receives the device position notification from the server 2, the ferry 41 changes the travel route of the own device to a route passing the vicinity of the station 9 based on the information included in the device position notification, specifically, the position information of the station 9 (route change).

Also, as shown in FIG. 18, the server 2 generates a complex interest that includes the image file and sends out the complex interest to the high-speed communication route of the information centric network. Next, when the station 9 receives the complex interest from the server 2, the station 9 forwards the complex interest to the ferry 41 via near field communication (such as WLAN communication). Then, when the ferry 41 receives the complex interest from the station 9, the ferry 41 forwards the complex interest to the cameras 3 via near field communication.

Next, when each camera 3 receives the complex interest from the ferry 41, the camera 3 associates the text data included in the simple interest with the image file for matching included in the complex interest (interest reconstruction process). Then, each camera 3 searches for an image file that meets the search criteria described in the text data from among the image files accumulated in the own device (image search). Subsequently, each camera 3 verifies whether any of the image files found by the image search matches the image file for matching (image matching). Then, each camera 3 transmits the matching result report to the gateway 7 via LPWA communication.

Next, when the gateway 7 receives the matching result report from the cameras 3, the gateway 7 sends out the matching result report to the low-speed route of the information centric network. This matching result report is received by the user terminal 1 via the server 2.

Ninth Embodiment

Next, the ninth embodiment will be described. Note that except for what will be particularly discussed here, this embodiment is the same as the above-described embodiment. Also, the configuration of the communication system according to the present embodiment is the same as in the seventh embodiment (see FIG. 15).

In the present embodiment, as in the seventh embodiment (see FIG. 15), the simple interest is transmitted from the gateway 7 to the cameras 3 via LPWA communication. In addition, the complex interest is forwarded to the cameras 3 by use of the ferry 41 (moving body) according to the message ferry method. Also, the ferry 41 forwards the complex interest to the cameras 3 via near field communication such as WLAN communication.

On the other hand, in the present embodiment, each camera 3 determines, as a preprocessing, whether the image file for matching is necessary based on the text data included in the simple interest during a waiting time from when the simple interest arrives till when the complex interest arrives. Then, when the camera 3 determines that the image file for matching is unnecessary, the camera 3 does not receive the complex interest distributed from the ferry 41.

Also, the ferry 41 transmits the complex interest by broadcast via near field communication (such as WLAN communication) while moving. Namely, the ferry 41 notifies the complex interest to the cameras 3 by broadcast communication. Therefore, the all cameras 3 located within the communication area of the near field communication can receive the complex interest transmitted from the ferry 41. On the other hand, each camera 3 which has determined, in the preprocessing, that the image file for matching is unnecessary operates not to receive the complex interest transmitted from the ferry 41.

Note that by recognizing the cameras 3 to which the complex interest is to be transmitted, the ferry 41 may transmit the complex interest to only the cameras 3 that need the image file for matching.

Figure 19:
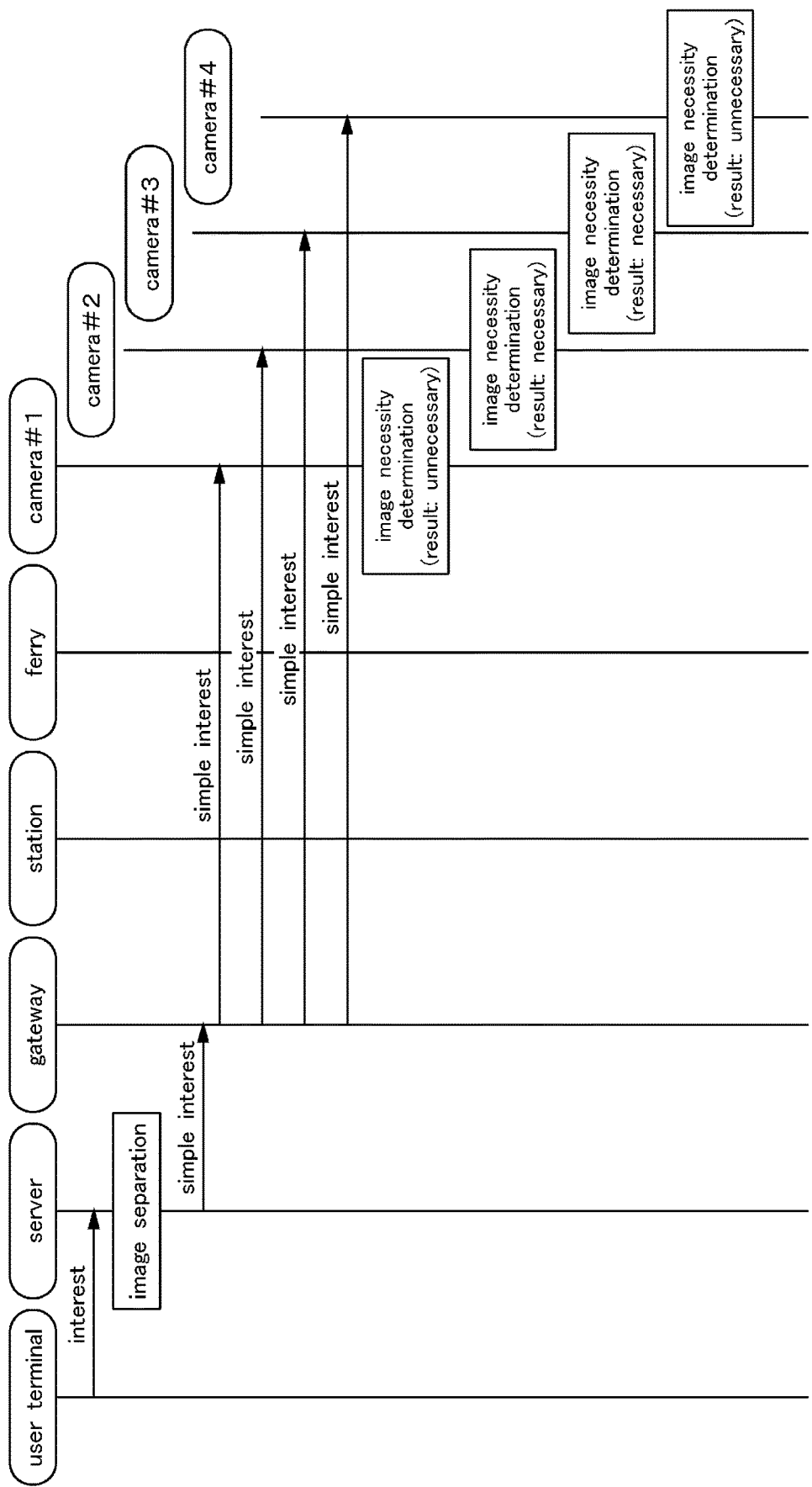
FIG. 19 is a sequence diagram showing an operating procedure of a communication system according to the ninth embodiment.
Figure 20:
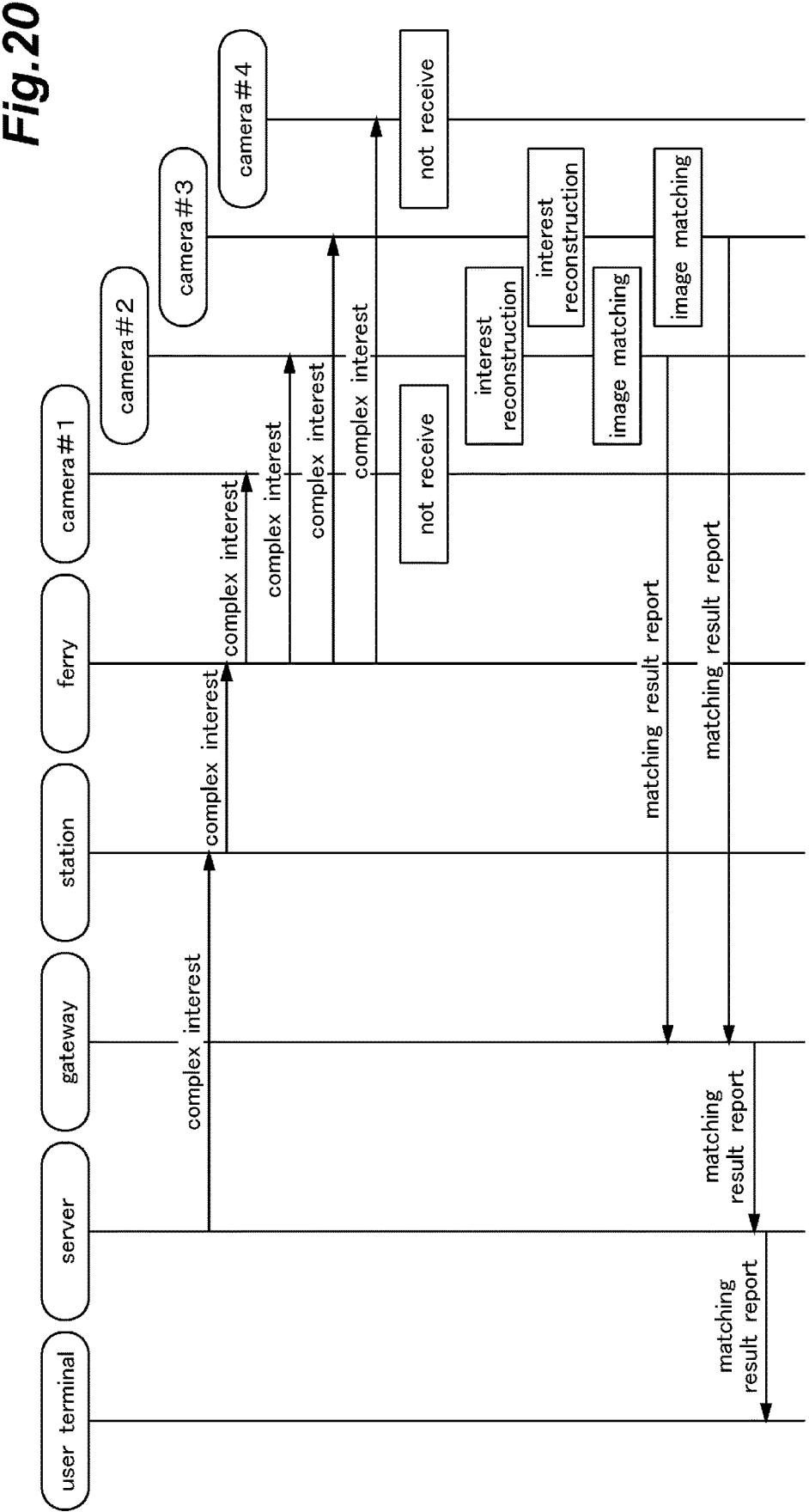
FIG. 20 is a sequence diagram showing an operating procedure of the communication system according to the ninth embodiment.

Next, an operating procedure of the communication system according to the ninth embodiment will be described. FIGS. 19 and 20 are a sequence diagram showing an operating procedure of the communication system.

As shown in FIG. 19, first, the user terminal 1 sends out an interest including text data and an image file for matching to the information centric network. Then, when the server 2 receives the interest from the user terminal 1, the server 2 separates the image file from the interest (image separation process), generates a simple interest that includes the text data and does not include the image file, and sends out the simple interest to the low-speed communication route of the information centric network Subsequently, when the gateway 7 receives the simple interest from the server 2, the gateway 7 transmits the simple interest to the cameras 3 via LPWA communication.

Next, when each camera 3 receives the simple interest from the gateway 7, the camera 3 determines, as a preprocessing, whether the image file for matching is necessary based on the text data included in the simple interest (image necessity determination). At this time, each camera 3 searches for an image file that meets the search criteria described in the text data from among the image files accumulated in the own device (image search). And, when one or more image files that meet the search criteria are found, the camera 3 determines that the image file for matching is necessary. On the other hand, when no image files that meet the search criteria are found, the camera 3 determines that the image file for matching is unnecessary.

Also, as shown in FIG. 20, the server 2 generates a complex interest that includes the image file and sends out the complex interest to the high-speed communication route of the information centric network. Next, when the station 9 receives the complex interest from the server 2, the station 9 forwards the complex interest to the ferry 41 via near field communication (such as WLAN communication). Then, when the ferry 41 receives the complex interest from the station 9, the ferry 41 forwards the complex interest to the cameras 3 via near field communication.

Next, when some cameras 3 determine, in the preprocessing, that the image file for matching is necessary, each of these cameras 3 receives the complex interest from the ferry 41 and associates the text data included in the simple interest with the image file for matching included in the complex interest (interest reconstruction process). Subsequently, each of these cameras 3 verifies whether any of the image files found by the image search matches the image file for matching (image matching). Then, each of these cameras 3 transmits the matching result report to the gateway 7 via LPWA communication.

On the other hand, each camera 3 which has determined, in the preprocessing, that the image file for matching is unnecessary does not receive the complex interest from the ferry 41, and does not perform the interest reconstruction, the image matching, and the matching result report. In the example shown in FIGS. 19 and 20, the cameras #1 and #4 of the cameras 3 determine that the image file for matching is unnecessary, and hence, do not receive the complex interest from the ferry 41 and do not perform the interest reconstruction, the image matching, and the matching result report.

Tenth Embodiment

Figure 21:
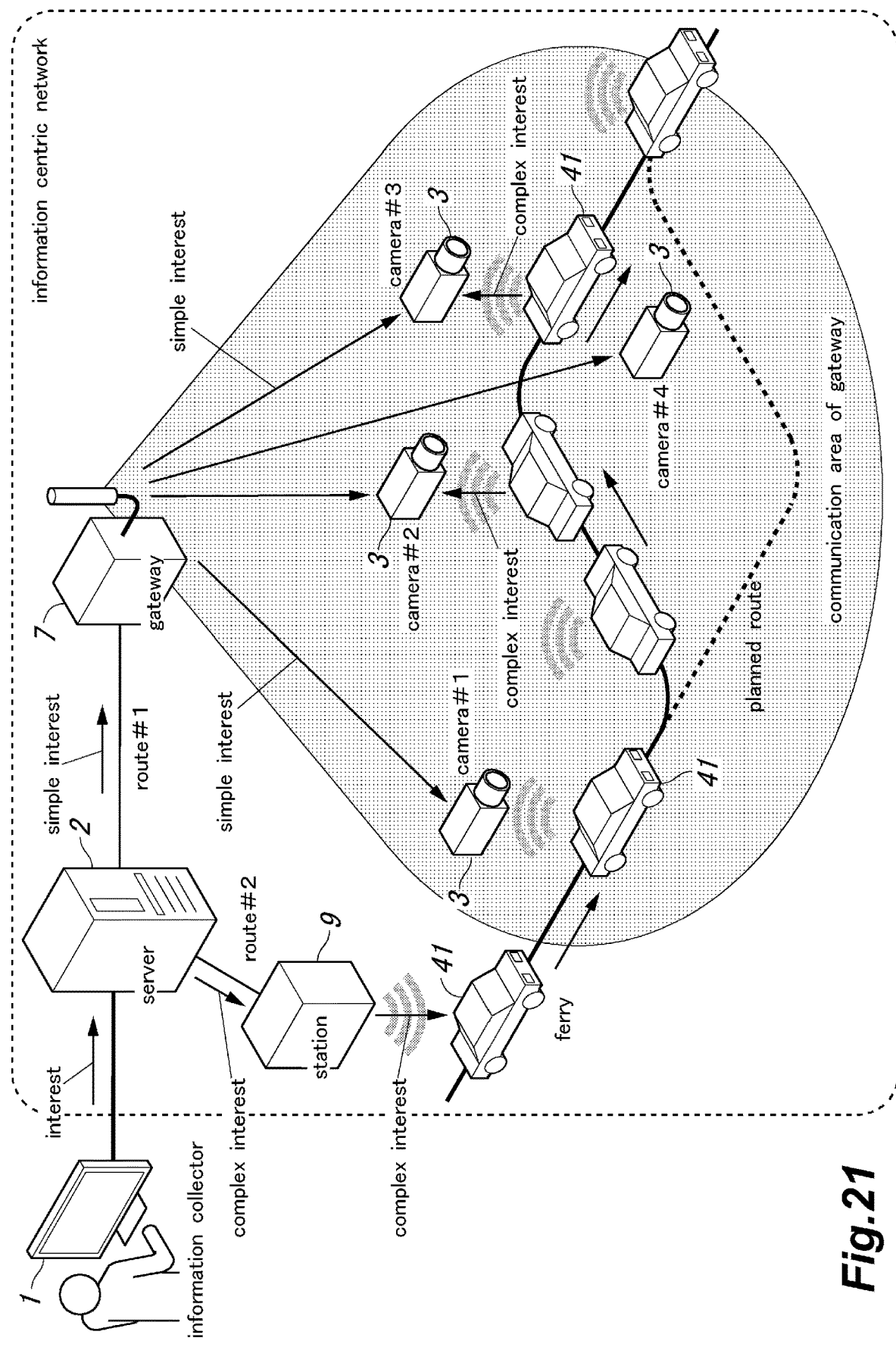
FIG. 21 is an overall configuration diagram of a communication system according to the tenth embodiment.

Next, the tenth embodiment will be described. Note that except for what will be particularly discussed here, this embodiment is the same as the above-described embodiment. FIG. 21 is an overall configuration diagram of a communication system according to the tenth embodiment.

In the present embodiment, as in the seventh embodiment (see FIG. 15), the simple interest is transmitted from the gateway 7 to the cameras 3 via LPWA communication. In addition, the ferry 41 forwards the complex interest to the cameras 3 via near field communication (such as WLAN communication). Also, each camera 3 determines whether the image file for matching is necessary based on the text data included in the simple interest.

On the other hand, in the present embodiment, each camera 3 notifies the server 2 when the image file for matching is necessary. Then, the server 2 notifies, to the ferry 41, the position information of the cameras 3 that need the image file for matching. Subsequently, the ferry 41 changes the planned route to a route passing near the cameras 3 that need the image file for matching so that the complex interest can be forwarded to the cameras 3 that need the image file for matching via near field communication.

As described above, in the present embodiment, since the ferry 41 changes the route so as to travel near the cameras 3 that need the image file for matching, the complex interest can be reliably forwarded from the ferry 41 to the cameras 3. Note that regarding the route change of the ferry, the "traveling near the station" in the eighth embodiment and the "traveling near the cameras that need the complex interest" in the present embodiment may be executed simultaneously.

Note that in the present embodiment, as in the eighth embodiment, the route of the ferry 41 (moving body) is changed, and therefore, to promote the cooperation of the person who controls the ferry 41, an incentive (such as card points and discount coupon) may be given when the person cooperates to change the route.

Also, in the present embodiment, the server 2 notifies the position information of the cameras 3 that need the image file for matching to the ferry 41, and this notification may be performed through any appropriate communication path. For example, the notification may be transmitted from the gateway 7 to the ferry 41 via LPWA communication when the ferry 41 travels in the communication area of the gateway 7.

Figure 22:
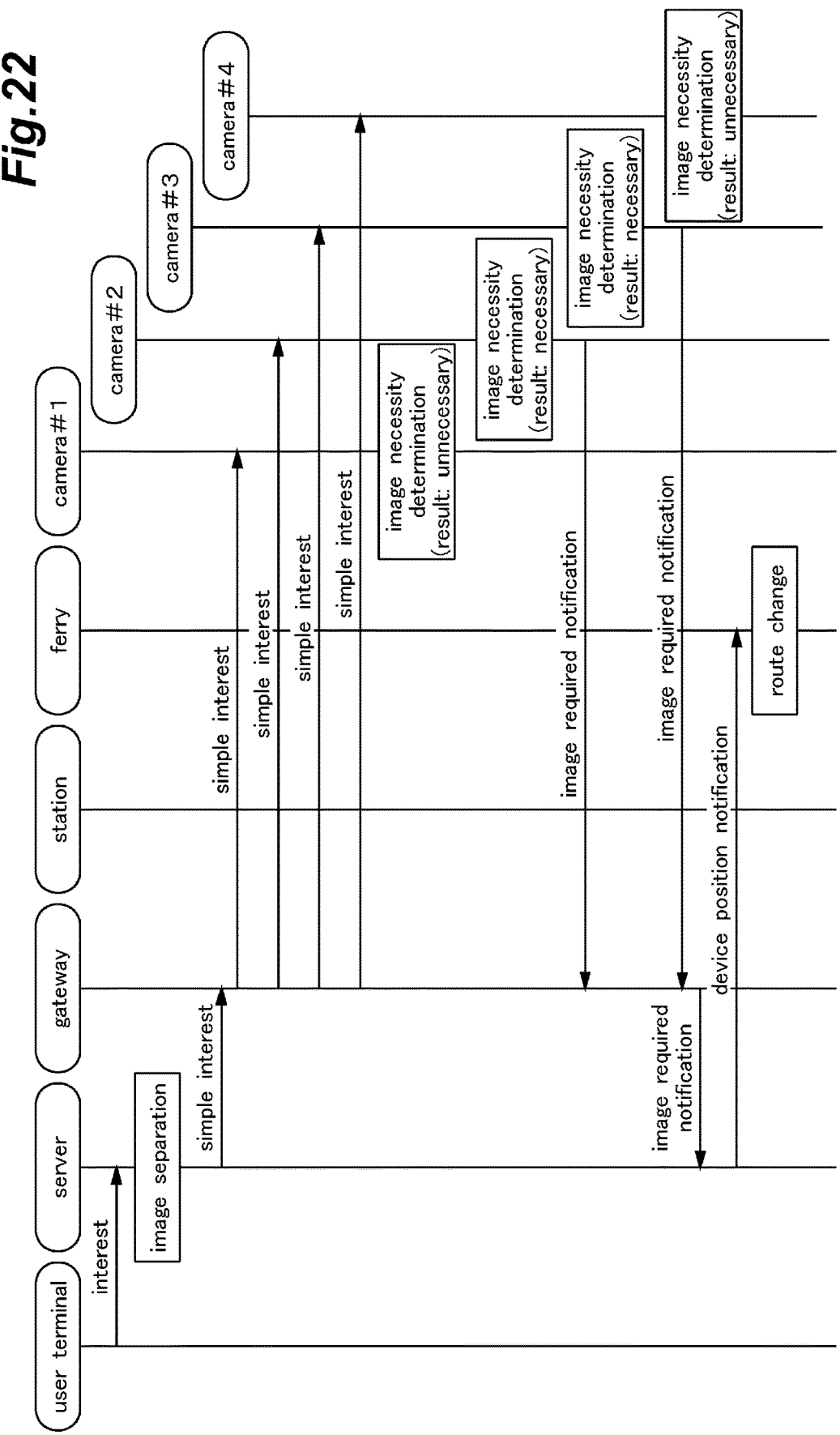
FIG. 22 is a sequence diagram showing an operating procedure of the communication system according to the tenth embodiment.
Figure 23:
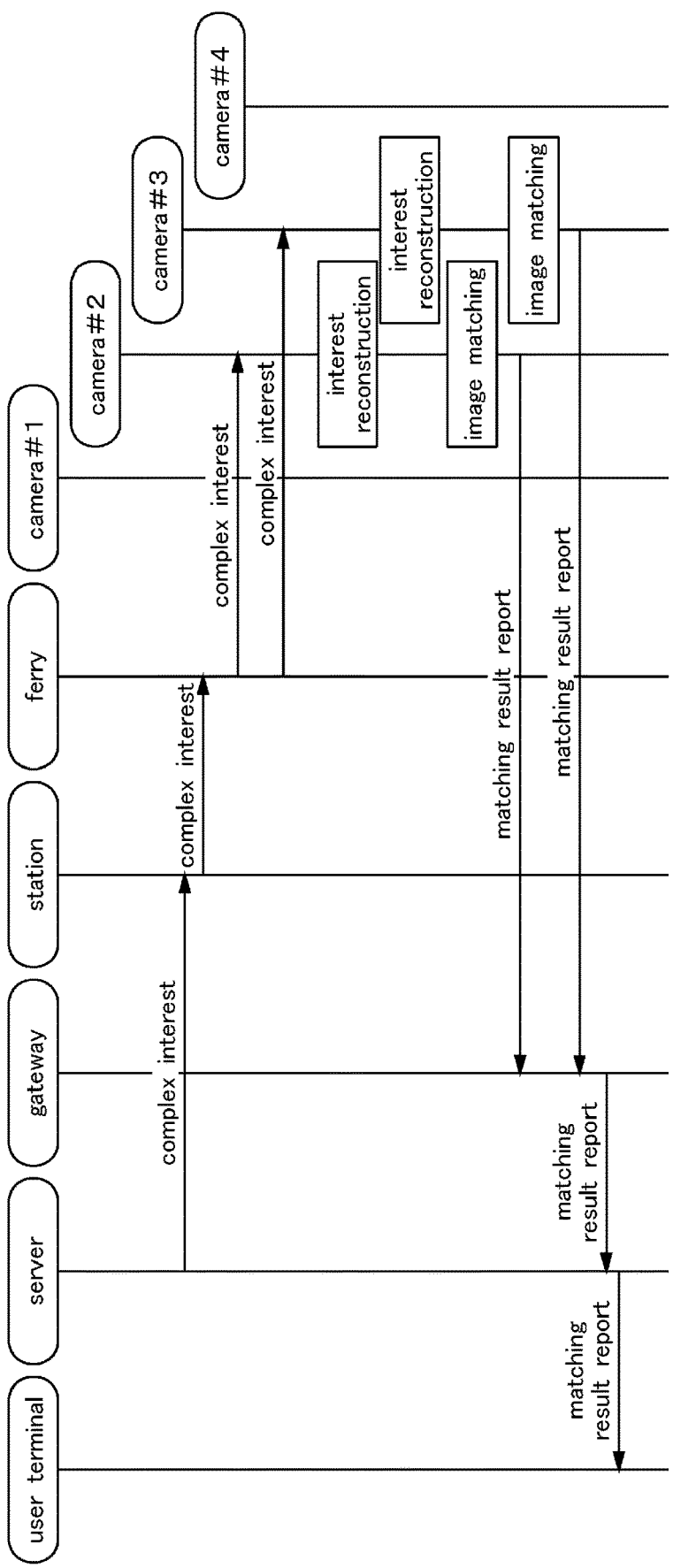
FIG. 23 is a sequence diagram showing an operating procedure of the communication system according to the tenth embodiment.

Next, an operating procedure of the communication system according to the tenth embodiment will be described. FIGS. 22 and 23 are a sequence diagram showing an operating procedure of the communication system.

As shown in FIG. 22, first, the user terminal 1 sends out an interest including text data and an image file for matching to the information centric network. Then, when the server 2 receives the interest from the user terminal 1, the server 2 separates the image file from the interest (image separation process), generates a simple interest that includes the text data and does not include the image file, and sends out the simple interest to the low-speed communication route of the information centric network. Subsequently, when the gateway 7 receives the simple interest from the server 2, the gateway 7 transmits the simple interest to the cameras 3 via LPWA communication.

Next, when each camera 3 receives the simple interest from the gateway 7, the camera 3 determines, as a preprocessing, whether the image file for matching is necessary based on the text data included in the simple interest (image necessity determination). At this time, the camera 3 searches for an image file that meets the search criteria described in the text data from among the image files accumulated in the own device (image search). And, when one or more image files that meet the search criteria are found, the camera 3 determines that the image file for matching is necessary. On the other hand, when no image files that meet the search criteria are found, the camera 3 determines that the image file for matching is unnecessary.

Next, when some cameras 3 determine, in the preprocessing, that the image file for matching is necessary, each of these cameras 3 transmits to the gateway 7 an image required notification indicating that the image data for matching is necessary. In the example shown in FIG. 22, the cameras #2 and #3 of the cameras 3 determine that the image file for matching is necessary and transmit the image required notifications to the gateway 7. On the other hand, the cameras #1 and #4 of the cameras 3 determine, in the preprocessing, that the image file for matching is unnecessary, and hence do not transmit the image required notification to the gateway 7.

Next, when the gateway 7 receives image required notifications from some cameras 3, the gateway 7 forwards the image required notifications to the server 2. When the server 2 receives the image required notifications from the gateway 7, the server 2 transmits a device position notification (interest) including the position information of the cameras 3 that need the image file for matching to the ferry 41 based on the information included in the image required notifications, specifically, the identification information of the cameras 3 that need the image file for matching.

Then, when the ferry 41 receives the device position notification from the server 2, the ferry 41 changes the travel route of the own device to a route passing the vicinity of the cameras 3 that need the image file for matching based on the information included in the device position notification, specifically, the position information of the cameras 3 that need the image file for matching (route change).

Also, as shown in FIG. 23, the server 2 generates a complex interest that includes the image file and sends out the complex interest to the high-speed communication route of the information centric network. Next, when the station 9 receives the complex interest from the server 2, the station 9 forwards the complex interest to the ferry 41 via near field communication (such as WLAN communication). Then, when the ferry 41 receives the complex interest from the station 9, the ferry 41 forwards the complex interest to the cameras 3 via near field communication. At this time, the ferry 41 forwards the complex interest to only the cameras 3 which determined that the image file for matching is necessary.

Next, when some cameras 3 receive the complex interest from the ferry 41, each of these cameras 3 associates the text data included in the simple interest with the image file for matching included in the complex interest (interest reconstruction process). Subsequently, each of these cameras 3 verifies whether any of the image files found by the image search matches the image file for matching (image matching). Then, each of these cameras 3 transmits the matching result report to the gateway 7 via LPWA communication. At this time, each camera 3 which has determined, in the preprocessing, that the image file for matching is unnecessary, does not perform the interest reconstruction, the image matching, and the matching result report. In the example shown in FIG. 1, the cameras #1 and #4 of the cameras 3 determine that the image file for matching is unnecessary, and hence, do not perform the interest reconstruction, the image matching, and the matching result report.

Next, when the gateway 7 receives the matching result report from the cameras 3, the gateway 7 sends out the matching result report to the low-speed route of the information centric network. This matching result report is received by the user terminal 1 via the server 2. This matching result report includes only the matching result of the cameras 3 (#2, #3) that performed the image matching.

Eleventh Embodiment

Next, the eleventh embodiment will be described. Note that except for what will be particularly discussed here, this embodiment is the same as the above-described embodiment. Also, an overall configuration of the communication system according to the eleventh embodiment is the same as in the seventh embodiment (see FIG. 15).

In the present embodiment, as in the seventh embodiment (see FIG. 15), the simple interest is transmitted from the gateway 7 to the cameras 3 via LPWA communication. In addition, the complex interest is forwarded to the cameras 3 by use of the ferry 41 (moving body) according to the message ferry method.

On the other hand, in the present embodiment, during a waiting time from when the simple interest arrives till when the complex interest arrives, each camera 3 searches for an image file that qualifies as a candidate for the image matching based on the text data included in the simple interest from among the image files stored in the own device (candidate image search) as a preprocessing for the image matching using the image file for matching included in the complex interest.

Here, the text data describes information related to the information collector's request content, for example, position information related to the image capture location, time information related to the image capture time, and the like. In the candidate image search process, the information described in the text data is used as the search criteria, and one or more image files that meet the search criteria are searched for. For example, in a person search, when the target person is male, only the image files in which a male person appears are retrieved as the image files that qualify as candidates.

As described above, in the present embodiment, since image files that qualify as candidates are searched for as the preprocessing for the image matching, the image matching is only required to be performed on the image files that qualify as candidates found by the preprocessing, and therefore, the image matching can be performed in a short time.

Figure 24:
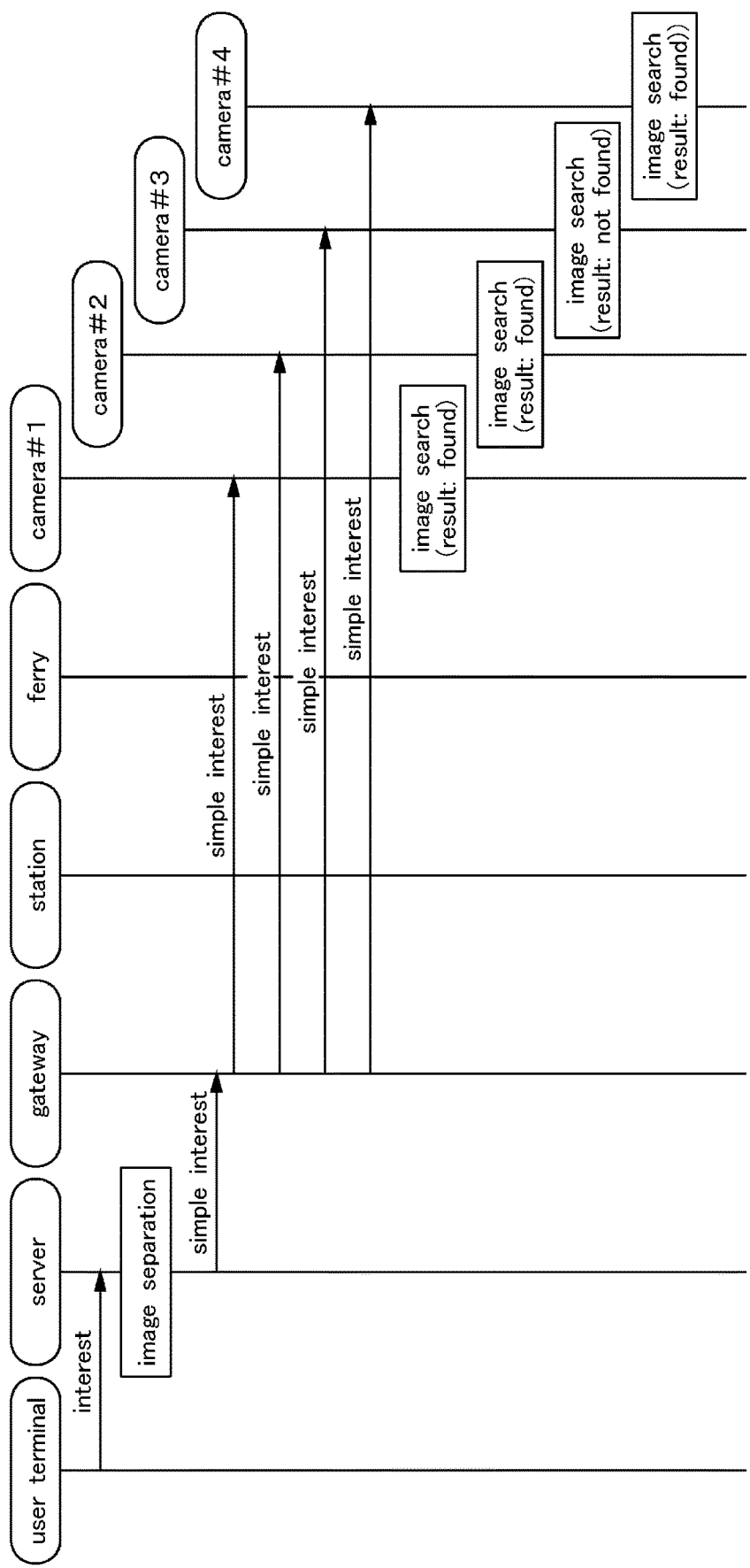
FIG. 24 is a sequence diagram showing an operating procedure of a communication system according to the eleventh embodiment.
Figure 25:
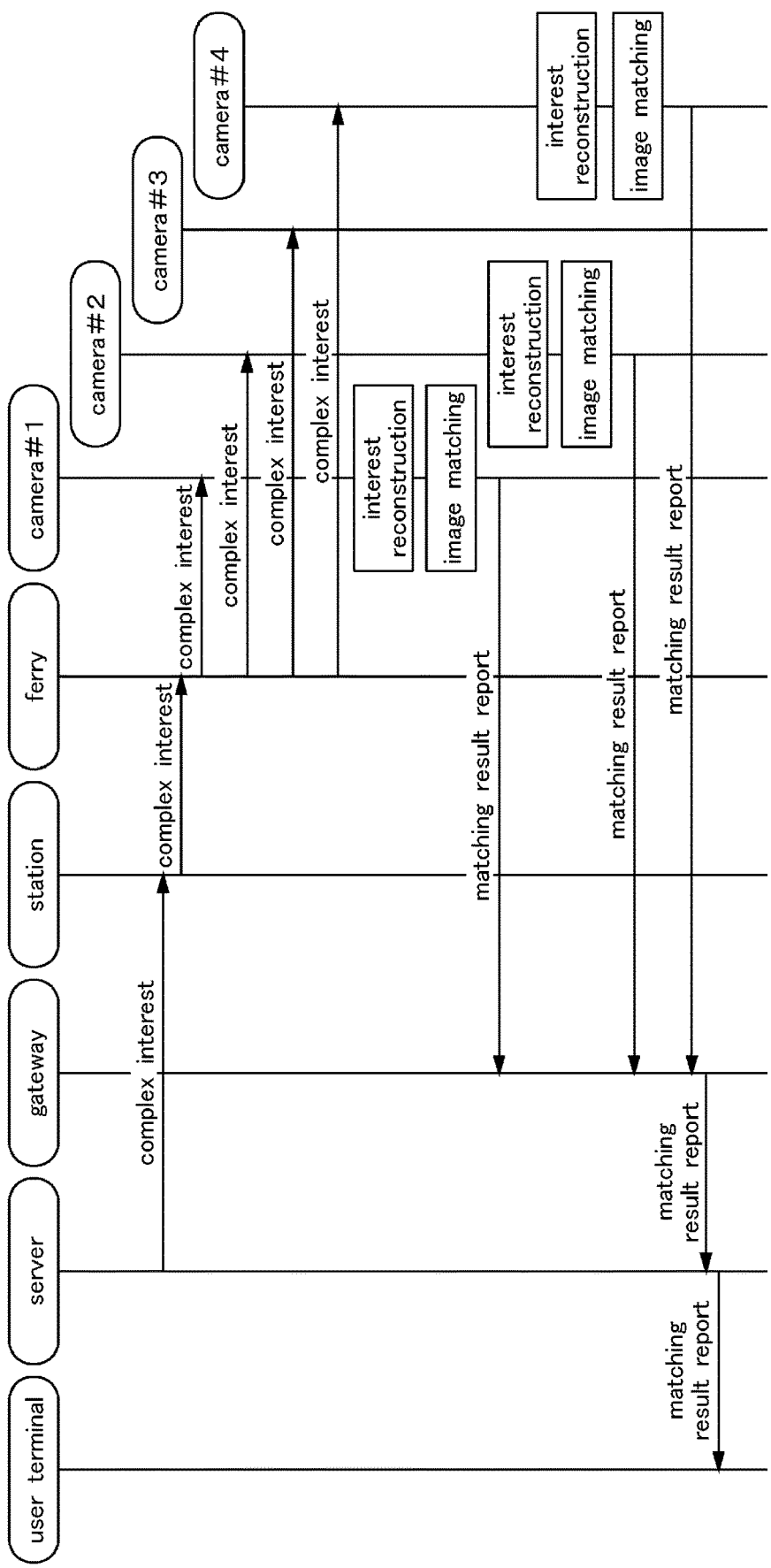
FIG. 25 is a sequence diagram showing an operating procedure of the communication system according to the eleventh embodiment.

Next, an operating procedure of the communication system according to the eleventh embodiment will be described. FIGS. 24 and 25 are a sequence diagram showing an operating procedure of the communication system according to the eleventh embodiment.

As shown in FIG. 24, first, the user terminal 1 sends out an interest including text data and an image file for matching to the information centric network. Then, when the server 2 receives the interest from the user terminal 1, the server 2 separates the image file from the interest (image separation process), generates a simple interest that includes the text data and does not include the image file, and sends out the simple interest to the low-speed communication route of the information centric network. Subsequently, when the gateway 7 receives the simple interest from the server 2, the gateway 7 transmits the simple interest to the camera 3 via LPWA communication.

Next, when each camera 3 receives the simple interest from the gateway 7, the camera 3 searches, as a preprocessing, for an image file that qualifies as a candidate based on the text data included in the simple interest from among the image files stored in the own device (image search).

Also, as shown in FIG. 25, the server 2 generates a complex interest that includes the image file and sends out the complex interest to the high-speed communication route of the information centric network. Next, when the station 9 receives the complex interest from the server 2, the station 9 forwards the complex interest to the ferry 41 via near field communication (such as WLAN communication). Then, when the ferry 41 receives the complex interest from the station 9, the ferry 41 forwards the complex interest to the cameras 3 via near field communication.

Next, when each camera 3 receives the complex interest from the ferry 41, if one or more image files that qualify as candidates have been found in the preprocessing, the camera 3 associates the text data included in the simple interest with the image file for matching included in the complex interest (interest reconstruction process). Then, the camera 3 verifies whether each of the candidate image files found by the preprocessing matches the image file for matching included in the complex interest (image matching). Then, the camera 3 transmits the matching result report to the gateway 7 via LPWA communication.

Next, when the gateway 7 receives the matching result report from the cameras 3, the gateway 7 sends out the matching result report to the low-speed route of the information centric network. This matching result report is received by the user terminal 1 via the server 2.

On the other hand, if some camera 3 has found no image files that qualify as candidates in the preprocessing, the camera 3 does not perform the interest reconstruction, the image matching, and the matching result report. In the example shown in FIGS. 24 and 25, no image files that qualify as candidates have been found in the camera #3 of the cameras 3, and hence, the interest reconstruction, the image matching, and the matching result report are not performed.

Note that in the present embodiment, search for an image file that qualifies as a candidate from among the image files stored in the own device (candidate image search) was performed as the preprocessing based on the text data included in the simple interest, but this candidate image search is not limited to the present embodiment and may be applied to the other embodiments such as the first embodiment.

Twelfth Embodiment

Figure 26:
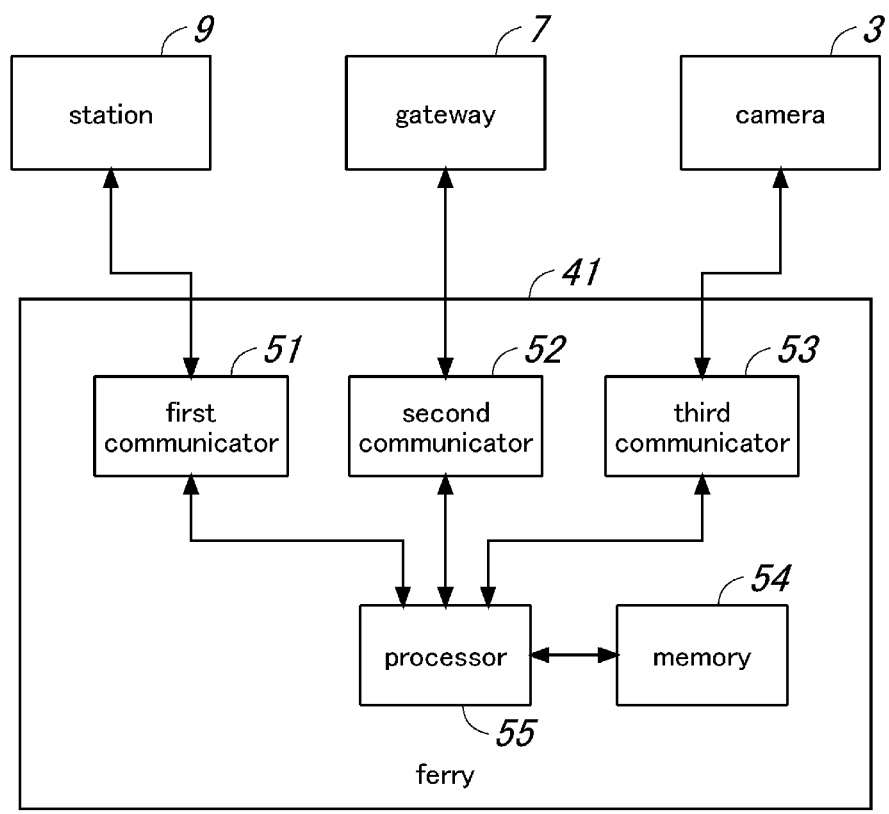
FIG. 26 is a block diagram showing a schematic configuration of a ferry 41 according to the twelfth embodiment.

Next, the twelfth embodiment will be described. Note that except for what will be particularly discussed here, this embodiment is the same as the above-described embodiment. FIG. 26 is a block diagram showing a schematic configuration of a ferry 41 according to the twelfth embodiment.

In the present embodiment, as in the seventh embodiment (see FIG. 15), the complex interest is forwarded to the cameras 3 by use of the ferry 41 (moving body) according to the message ferry method.

The ferry 41 includes a first communicator 51, a second communicator 52, a third communicator 53, a memory 54, and a processor 55.

The first communicator 51 performs WLAN communication, specifically, near field communication such as WiFi (registered trademark), WiGig (registered trademark), and the like with the station 9. This first communicator 51 receives the complex interest from the station 9.

The second communicator 52 performs LPWA communication with the gateway 7. This second communicator 52 receives the simple interest from the gateway 7. As in the tenth embodiment, in the case where the server 2 notifies the position information of the cameras 3 that need the image file for matching to the ferry 41, the notification is transmitted from the gateway 7 to the ferry 41 via LPWA communication when the ferry 41 travels in the communication area of the gateway 7.

The third communicator 53 performs WLAN communication, specifically, near field communication such as WiFi (registered trademark), WiGig (registered trademark), and the like with the camera 3. This third communicator 53 transmits the complex interest to the camera 3. Note that configuration may be made such that the first communicator 51 also functions as the third communicator 53. Also, if some of the first communicator, the second communicator, and the third communicator adopt the same communication method, they may be embodied as the same device. Namely, if the communication method of the first communicator and the communication method of the third communicator are both WLAN communication, the first communicator and the third communicator may be embodied as the same device.

The memory 54 stores programs executed by the processor 55 and the like.

The processor 55 executes various processes related to the complex interest forwarding by executing the programs stored in the memory 54.

Note that in the case where a vehicle acts as the ferry 41, an onboard terminal installed in the vehicle specifically performs the operation of the ferry 41. Also, in the case where a pedestrian acts as the ferry 41, a mobile information terminal (for example, a smartphone or the like) carried by the pedestrian specifically performs the operation of the ferry 41. Further, in the case where a bicycle acts as the ferry 41, a mobile information terminal carried by the rider of the bicycle or an onboard terminal installed in the bicycle specifically performs the operation of the ferry 41. The mobile information terminal and the onboard terminal have a function of the information centric network. Also, the moving body such as a vehicle and a pedestrian that acts as the ferry 41 may be embodied by a moving body that moves around in the target area regularly, such as a delivery company truck or a municipal town patrol member.

Also, the communication between the moving body acting as the ferry 41 and the cameras 3 may be near field communication such as WLAN communication, but in the case where the mobile information terminal (for example, a smartphone or the like) has a function of cellular communication, the complex interest may be forwarded to the moving body acting as the ferry 41 via cellular communication.

Thirteenth Embodiment

Figure 27:
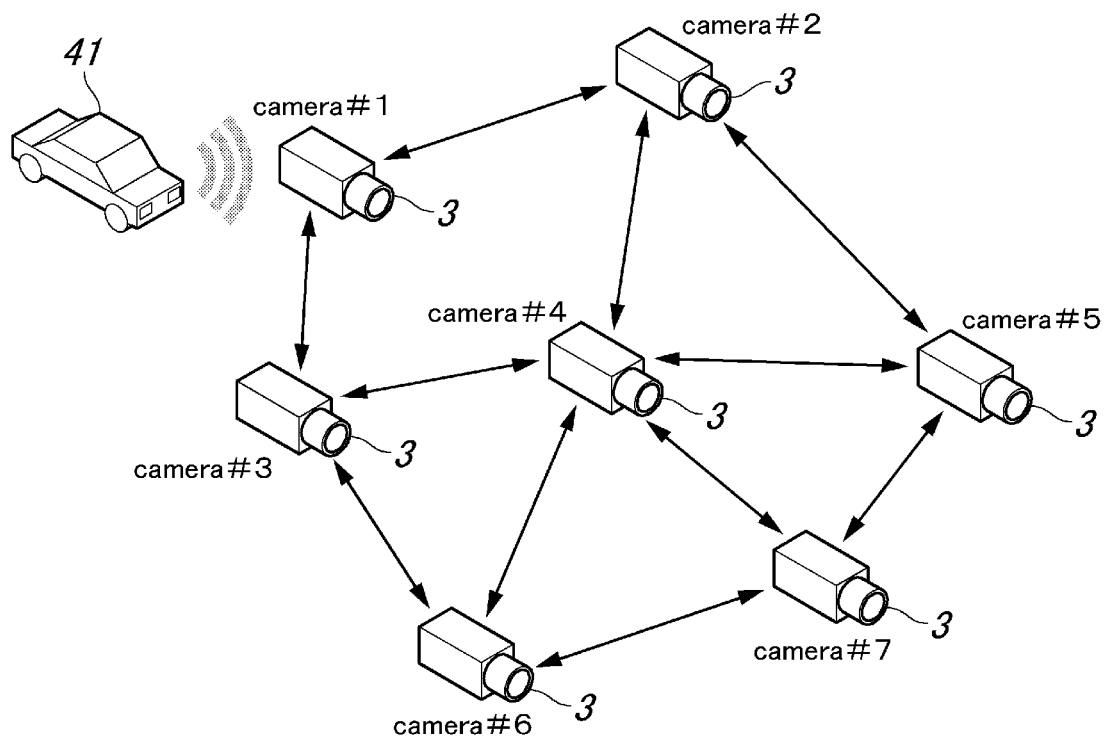
FIG. 27 is an explanatory diagram showing an outline of a communication system according to the thirteenth embodiment.

Next, the thirteenth embodiment will be described. Note that except for what will be particularly discussed here, this embodiment is the same as the above-described embodiment. FIG. 27 is an explanatory diagram showing an outline of a communication system according to the thirteenth embodiment.

In the present embodiment, multi-hop communication is performed by the multiple cameras 3. Each camera 3 functions as a repeater, and the complex interest is forwarded from one camera 3 to the next in turn. Thereby, the complex interest is forwarded to the multiple cameras 3.

Also, in the present embodiment, the cameras 3 constitute a mesh network. Namely, the multiple cameras 3 are mutually connected so that the multiple cameras 3 functioning as repeaters form mesh-like transmission paths. Thereby, the complex interest can be distributed to the multiple cameras 3 located in a required range.

In the example shown in FIG. 27, when the complex interest is forward from the ferry 41 to one camera 3 (#1), the complex interest is forwarded from one camera 3 to the next in turn. Thereby, the complex interest is forwarded to the all cameras 3 that constitute the mesh network.

Fourteenth Embodiment

Figure 28:
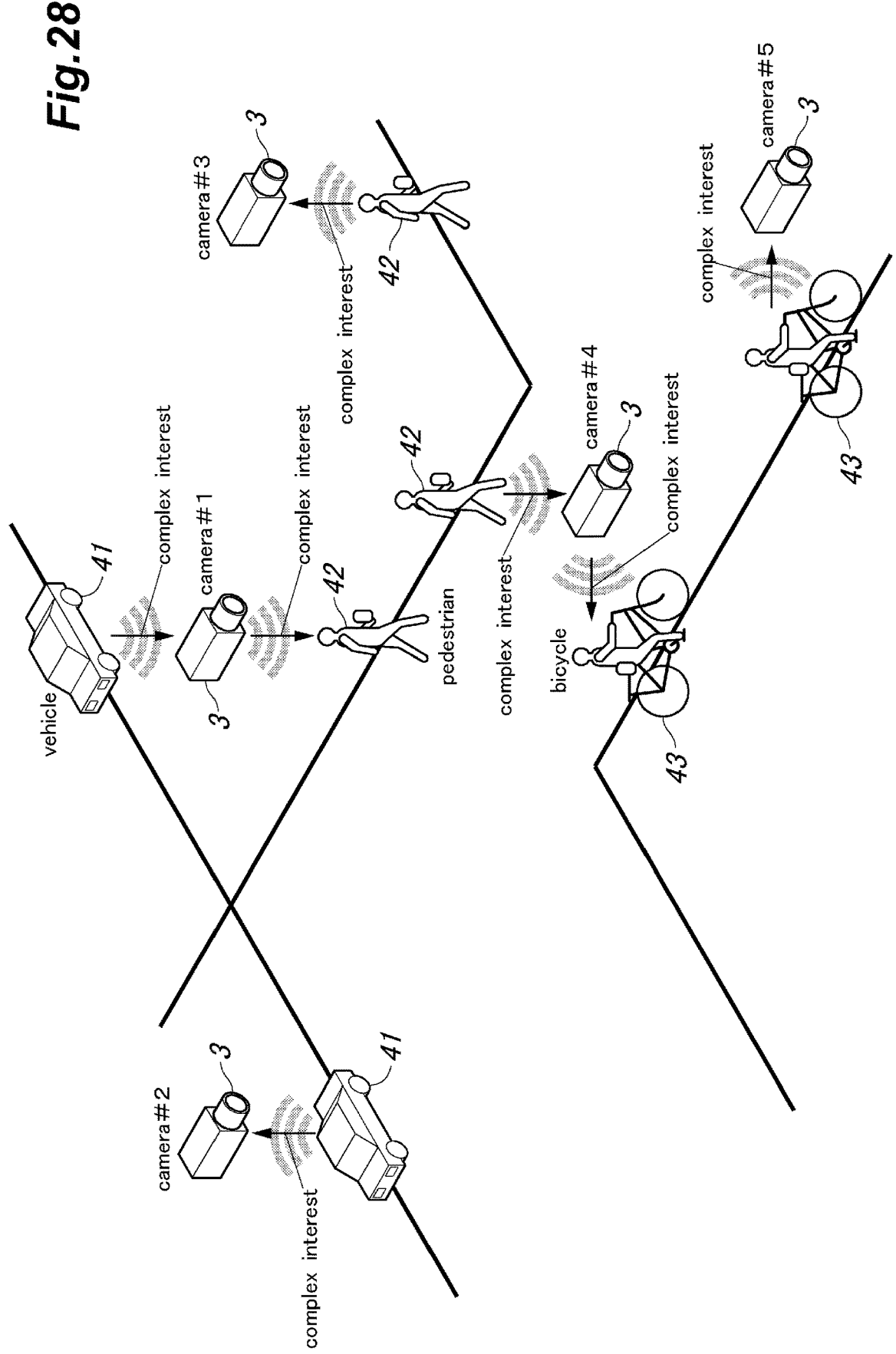
FIG. 28 is an explanatory diagram showing an outline of a communication system according to the fourteenth embodiment.

Next, the fourteenth embodiment will be described. Note that except for what will be particularly discussed here, this embodiment is the same as the above-described embodiment. FIG. 28 is an explanatory diagram showing an outline of a communication system according to the fourteenth embodiment.

In the present embodiment, as in the seventh embodiment (see FIG. 15), the complex interest is forwarded to the cameras 3 by use of the ferry 41 (moving body) according to the message ferry method. On the other hand, in the present embodiment, multiple ferries 41, 42, 43 are used. Further, in the present embodiment, the ferries 41, 42, 43 of multiple types are used.

In the example shown in FIG. 28, each camera 3 which received a complex interests from a ferry 41, 42, 43 forwards the complex interest to another ferry 41, 42, 43 that passes by, and this ferry 41, 42, 43 forwards the complex interest to another camera 3. Further, this camera 3 forwards the complex interest to a ferry 41, 42, 43 of a different type from the ferry 41, 42, 43 from which the complex interest was forwarded.

Specifically, complex interests are forwarded from a vehicle acting as the ferry 41 to cameras 3 (#1, #2). Next, the complex interest is forwarded from the camera 3 (#1) to a pedestrian acting as the ferry 42. Then, the complex interest is forwarded from the pedestrian acting as the ferry 42 to cameras 3 (#3, #4). Also, the complex interest is forwarded from the camera 3 (#4) to a bicycle acting as the ferry 43. Then, the complex interest is forwarded from the bicycle to a camera 3 (#5).

As described above, in the present embodiment, the multiple ferries 41, 42, 43 are used, and further, the ferries 41, 42, 43 of multiple types are used, whereby the complex interest can be forwarded to the cameras 3 located over a wide range.

Incidentally, the above-described embodiment, the server 2 sends out the complex interest including the image file for matching (matching target data) to the information centric network, but it may be possible to divide the image file for matching so that multiple division files are transmitted as separate complex interests. Thereby, even if the information centric network includes no high-speed communication route, an image file having a large volume can be transmitted.

In this case, when each camera 3 receives the complex interests including the respective multiple division files, the camera 3 may integrate the acquired multiple division files to reproduce the original image file for matching. At this time, if the camera 3 determines that the image file for matching is unnecessary as a result of determination of whether the image file for matching is necessary, which is performed as a preprocessing during a waiting time from when the simple interest arrives till when the complex interest arrives, the camera 3 may not have to receive the complex interests thereafter. Also, when a file configuration is made such that the image resolution increases each time one of the layered multiple division files is received, the camera 3 may stop receiving the complex interests at a timing when the image resolution has increased to such a degree that allows for appropriate image matching.

Fifteenth Embodiment

Figure 29:
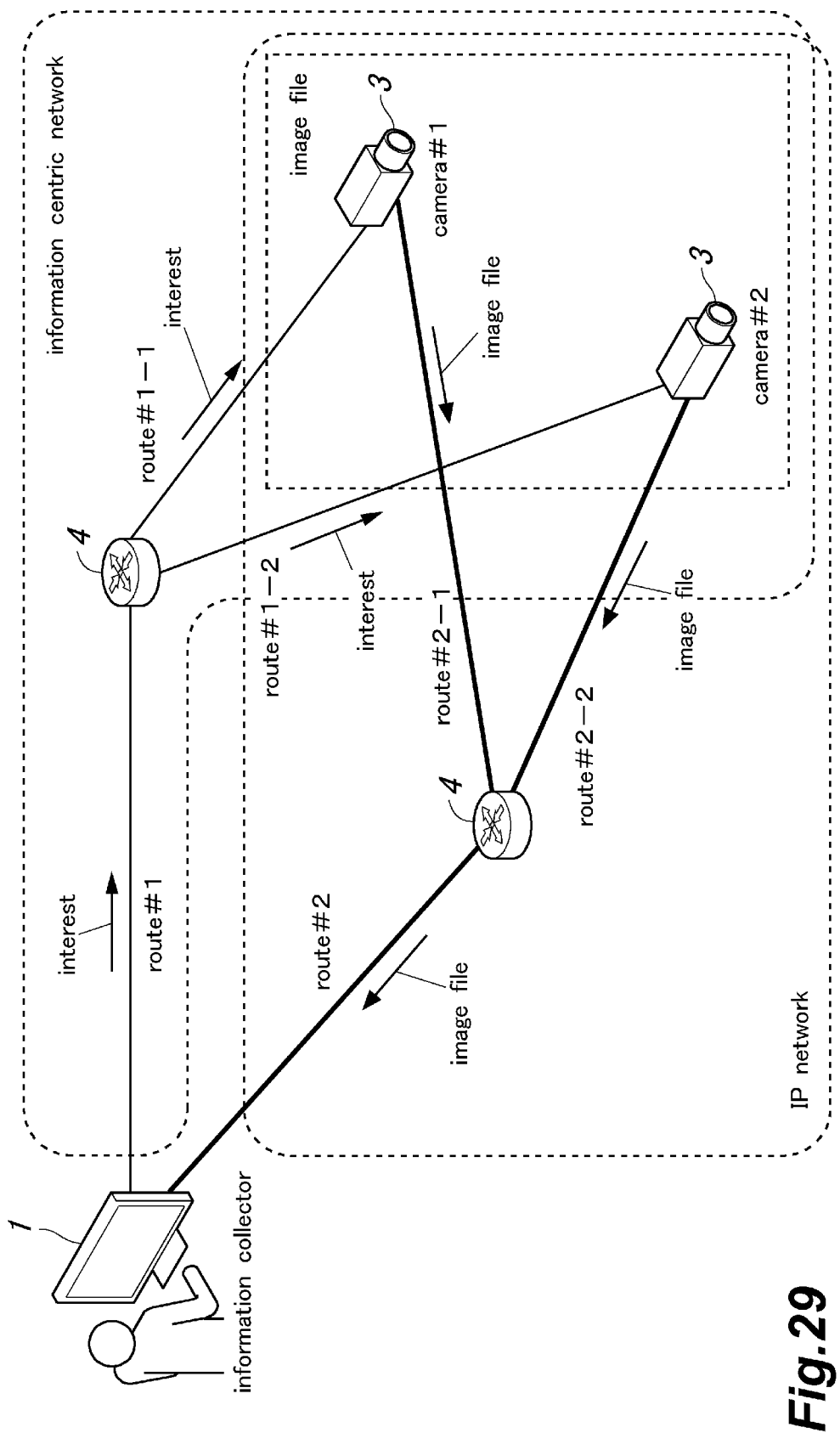
FIG. 29 is an overall configuration diagram of a communication system according to the fifteenth embodiment.

Next, a communication system according to the fifteenth embodiment will be described. FIG. 29 is an overall configuration diagram of the communication system according to the fifteenth embodiment.

This communication system collects necessary contents by using an information centric network (ICN) and includes a user terminal 1 (information collector apparatus) and cameras 3 (content accumulating devices).

The user terminal 1 and the cameras 3 are connected to each other via the information centric network. Also, the user terminal 1 and the cameras 3 are connected to each other via an IP network. Further, routers 4 are installed in the information centric network and in the IP network. Note that besides those shown in the drawing, the routers 4 are installed at appropriate locations in the information centric network and in the IP network.

The user terminal 1 is operated by a user (information collector) to perform operations regarding information collection. In the present embodiment, image search is performed as an example of the information collection. When necessary information is input by the user, the user terminal 1 generates an interest including text data and sends out the interest to the information centric network.

Here, the text data (request content data) describes information related to the user' request content; specifically, information related to the image capture location (area) (a place name and the like), information related to the image capture time (period), and the like, which serve as the criteria for the search process performed by the cameras 3 (search criteria). Also, when a specific object is searched for, the text data describes, as the search criteria, information related to the type of the search target (person, animal, vehicle, etc.) and the like. Further, when the search target is a person, the text data describes information related to attributes of the person (age, gender, attire, height, etc.) and the like. This text data is generated according to the user's input operation related to the search criteria or the like.

At this time, when the user specifies a specific area as the image capture location, the image files captured by the cameras 3 positioned in the specified area become the target. Also, when the user specifies a specific time zone as the image capture time, the image files captured by the cameras 3 during the specified time zone become the target. Further, when the user specifies the type and attributes of the search target, the image files in which an object of the specified type and attributes is image-captured become the target. For example, if the image capture location is specified as "near XXX town" and the attribute of the search target is specified as "adult male," images captured near XXX town and including an adult male can be searched for.

When each camera 3 receives the interest from the user terminal 1, the camera 3 searches for an image file (content) that meets the search criteria described in the text data included in the interest from among the image files accumulated in the own device, and when one or more image files that meet the criteria are found, the camera 3 transmits the one or more image files to the user terminal 1 that made the request (the sender of the interest) via the IP network.

Here, by adding the IP address of the user terminal 1 to the interest sent out from the user terminal 1 to the information centric network, it is possible to transmit the image files from each camera 3 to the user terminal 1 via the IP network.

Also, in the present embodiment, the interest is transmitted from the user terminal 1 to the cameras 3 via low-speed communication paths configuring the information centric network (routes #1, #1-1, #1-2). Also, the image files are transmitted from the cameras 3 to the user terminal 1 via high-speed communication paths configuring the IP network (routes #2, #2-1, #2-2).

Note that in the present embodiment, the high-speed communication paths that transmit the image files configure the IP network, but the high-speed communication paths that transmit the image files may configure the information centric network. In this case, the image files can be delivered to the user terminal 1 by specifying the routers 4 on the high-speed communication paths from each camera 3 to the user terminal 1.

Also, in the present embodiment, description is made of an example in which the user terminal 1 (information collector apparatus) collects image data obtained by the cameras 3 as contents, but the contents to be collected are not limited to the image data. For example, the contents to be collected may be voice data collected by a microphone, state information (temperature, humidity, etc.) detected by various sensors, and the like.

Further, in the present embodiment, description is made of an example in which the cameras 3 are connected to the information centric network as the content accumulating devices, but the content accumulating devices are not limited to the cameras 3. In the information centric network, the connected devices share contents, and therefore, devices other than the cameras 3, for example, not only the sensing devices such as a temperature/humidity sensor and a microphone but also the server and the routers can function as the content accumulating devices.

Figure 30:
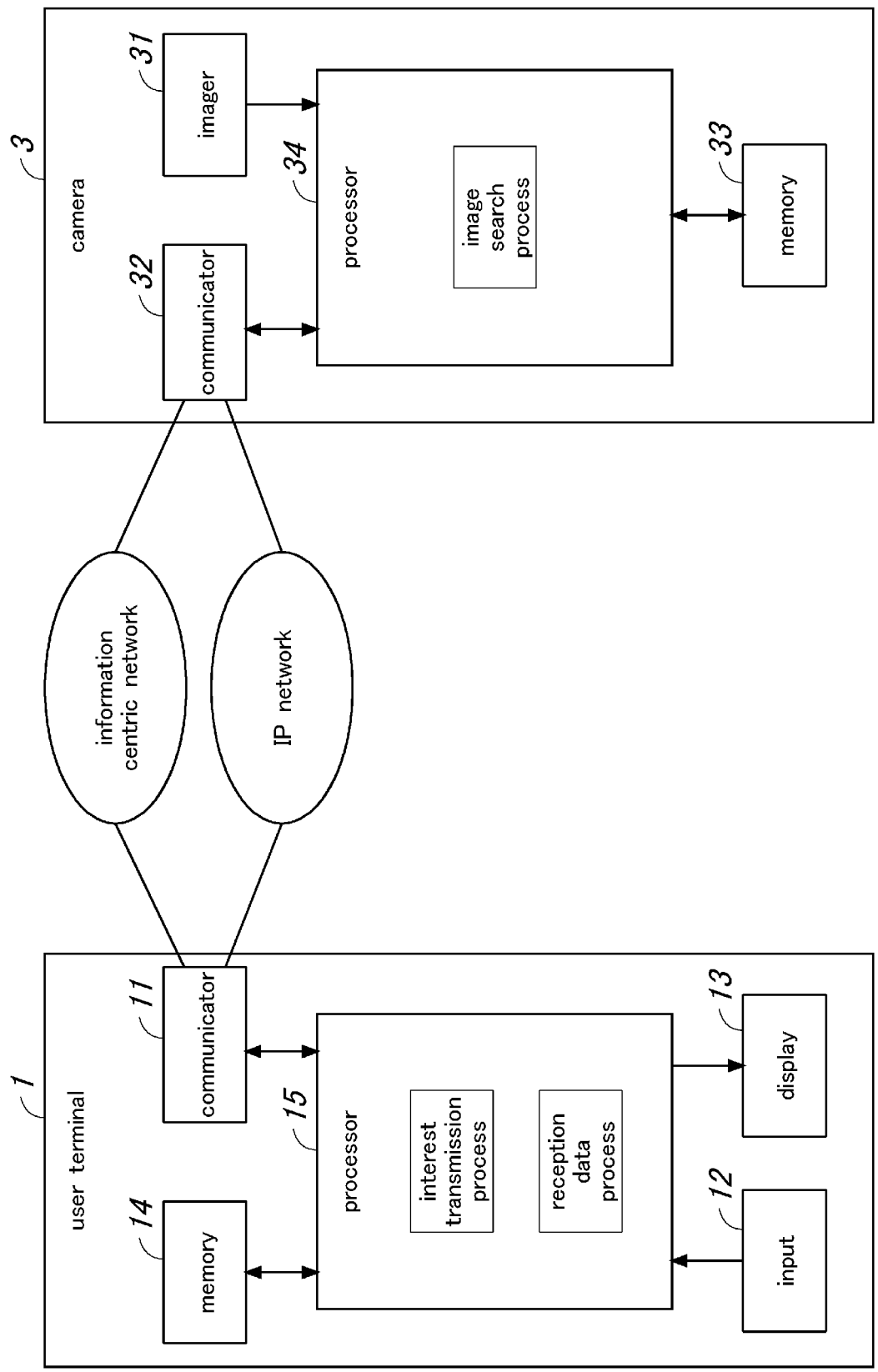
FIG. 30 is a block diagram showing schematic configurations of a user terminal 1 and a camera 3 according to the fifteenth embodiment.

Next, schematic configurations of the user terminal 1 and the camera 3 according to the fifteenth embodiment will be described. FIG. 30 is a block diagram showing schematic configurations of the user terminal 1 and the camera 3 according to the fifteenth embodiment.

The user terminal 1 includes a communicator 11, an input 12, a display 13, a memory 14, and a processor 15.

The communicator 11 sends out an interest (request message) to the information centric network. Also, the communicator 11 receives, as a response to the interest, the image file(s) transmitted from the camera 3 via the IP network.

The input 12 enables the user (information collector) to perform input operation for specifying the search criteria. The display 13 displays an input screen when specifying the search criteria and/or information received by the communicator 11.

The memory 14 stores programs executed by the processor 15 and the like.

The processor 15 executes various processes related to information collection by executing the programs stored in the memory 14. In the present embodiment, the processor 15 executes an interest transmission process, a reception data process, etc.

In the interest transmission process, the processor 15 acquires the text data related to the search criteria input by the user, generates an interest including the text data, and controls the communicator 11 to send out the interest to the information centric network.

In the reception data process, the processor 15 executes processes such as displaying, on the display 13, data received by the communicator 11 from the information centric network, which includes, for example, the image file(s) from the camera 3.

The camera 3 includes an imager 31, a communicator 32 (receiver, transmitter), a memory 33, and a processor 34.

The imager 31 captures an image of the surroundings of the camera 3 and outputs the captured image data. This captured image data (still image, moving image) is stored in an image file by the processor 34.

The communicator 32 receives the interest (request message) transmitted from the information centric network. Also, the communicator 32 transmits the image file (content) to the user terminal 1 via the IP network.

The memory 33 stores programs executed by the processor 34 and the like. Also, the memory 33 accumulates the image files generated by the processor 34.

The processor 34 executes various processes related to information collection by executing the programs stored in the memory 33. In the present embodiment, the processor 34 executes an image search process, etc.

In the image search process, when the interest from the user terminal 1 is received by the communicator 32, the processor 34 searches for an image file that meets the search criteria described in the text data included in the interest from among the image files accumulated in the own device. Specifically, when the text data describes, as the search criteria, the position information of the image capture location (area) and/or the time information of the image capture time (period), the image files matching the image capture location (area) and/or the image capture time (period) are searched for. Also, when the text data describes, as the search criteria, the type and attributes of the search target, the image files in which an object matching the type and attributes appears are searched for.

Note that the processor 34 can perform an image recognition process on the image captured by the imager 31, and with this image recognition process, the type (person, animal, vehicle, and the like) of the subject appearing in the captured image and attributes (when the subject is a person, age, gender, attire, height, etc., for example) of the subject are acquired.

Figure 31:
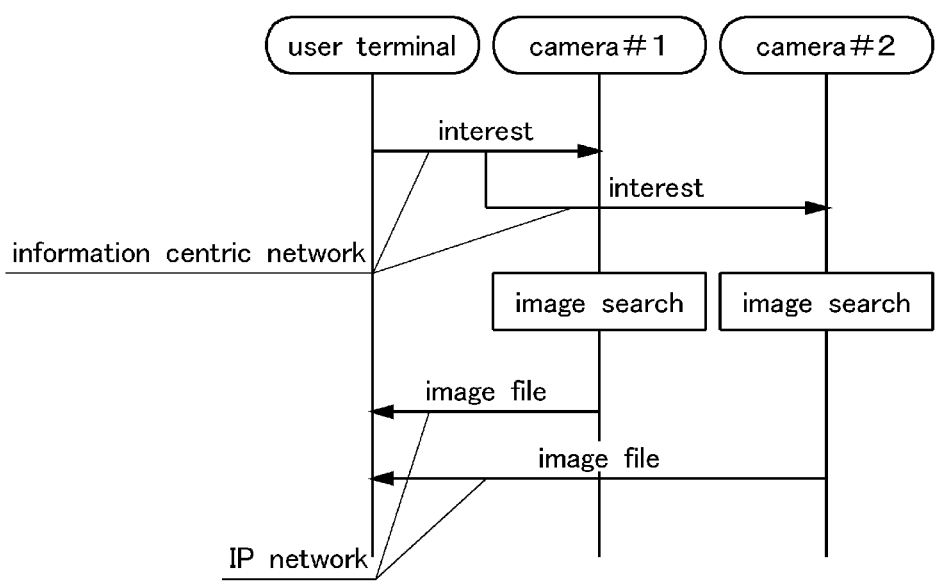
FIG. 31 is a sequence diagram showing an operating procedure of a communication system according to the fifteenth embodiment.

Next, an operating procedure of the communication system according to the fifteenth embodiment will be described. FIG. 31 is a sequence diagram showing an operating procedure of the communication system.

First, the user terminal 1 sends out an interest that includes text data (request content data) describing the search criteria to the information centric network.

Next, when each camera 3 receives the interest from the user terminal 1, the camera 3 searches for an image file that meets the search criteria described in the text data included in the interest from among the image files accumulated in the own device (search process). Subsequently, each camera 3 transmits the image file(s) found by the image search to the user terminal 1 via the IP network.

Sixteenth Embodiment

Figure 32:
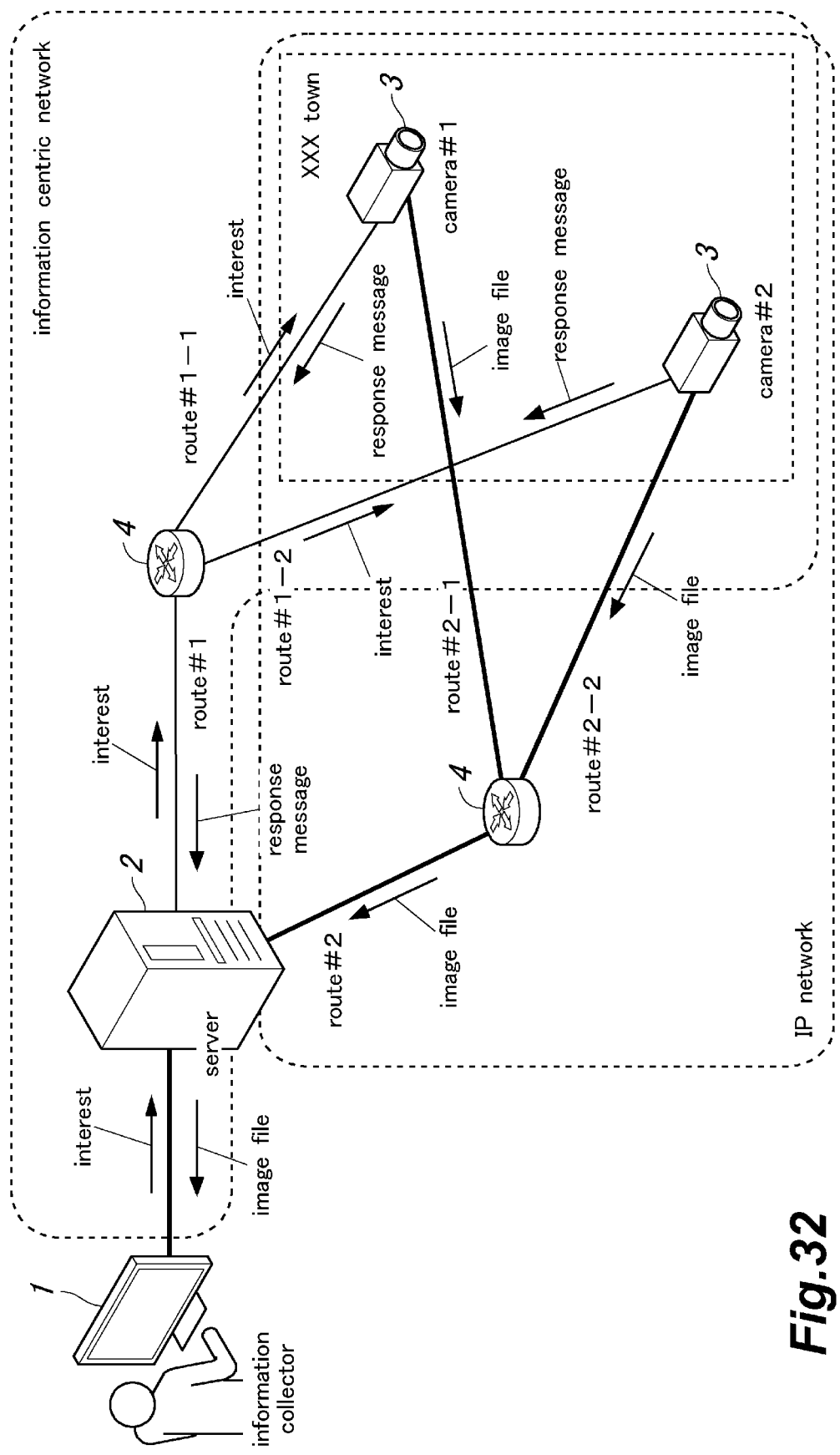
FIG. 32 is an overall configuration diagram of a communication system according to the sixteenth embodiment.

Next, the sixteenth embodiment will be described. Note that except for what will be particularly discussed here, this embodiment is the same as the above-described embodiment. FIG. 32 is an overall configuration diagram of a communication system according to the sixteenth embodiment.

In the present embodiment, as in the fifteenth embodiment (see FIG. 29), the user terminal 1 transmits the interest to the cameras 3 via the information centric network (low-speed communication route).

On the other hand, in the present embodiment, a server 2 (repeater) is provided. This server 2 is interposed between the user terminal 1 and the cameras 3. The server 2 forwards the interest from the user terminal 1 to the cameras 3 via the information centric network. The cameras 3 transmit image files to the server 2 via the IP network (high-speed communication route).

Also, in the present embodiment, each camera 3 sends out a response message as a reply to the interest to the information centric network. This response message is received by the server 2. The response message includes a notification that an image file (content) has been transmitted and the identification information of the image file.

Here, the identification information of the image file specifically is a file name given to the image file. For example, a file name "GZA-20190624-9s3fd" is added to the response message. Note that each file name should be given a certain length and include time and/or random numbers (not limited to numerical numbers but may include random alphabets, symbols, and the like) so as not to be identical with other file names as much as possible.

When the server 2 receives a response message from a camera 3 via the information centric network and an image file from the camera 3 via the IP network, the server 2 transmits the image file to the user terminal 1 as a reply to the interest from the user terminal 1.

As described above, in the present embodiment, the server 2 performs request for an image file from the user terminal 1 on behalf of the same. Therefore, the user terminal 1 does not have to execute control taking into account that the interest transmission and the image file reception are performed by using different networks.

Note that by receiving the image file (content) via the IP network, the server 2 can recognize that a reply to the interest from the user terminal 1 has been made, and therefore, transmission of the response message via the information centric network may be omitted.

Figure 33:
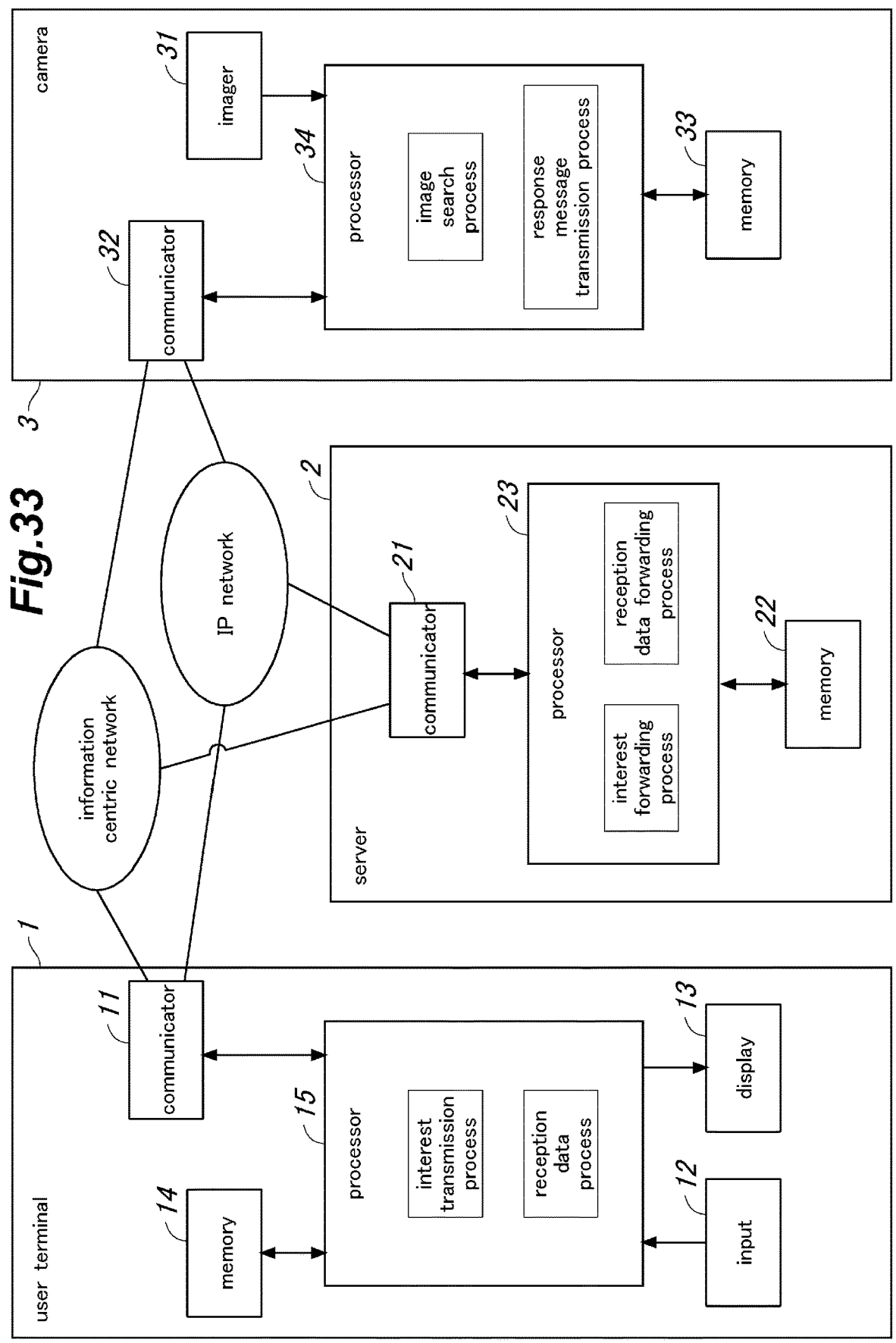
FIG. 33 is a block diagram showing schematic configurations of a user terminal 1, a camera 3, and a server 2 according to the sixteenth embodiment.

Next, schematic configurations of the user terminal 1, the camera 3, and the server 2 according to the sixteenth embodiment will be described. FIG. 33 is a block diagram showing schematic configurations of the user terminal 1, the camera 3, and the server 2.

The configuration of the user terminal 1 is substantially the same as in the fifteenth embodiment (see FIG. 30).

The configuration of the camera 3 is substantially the same as in the fifteenth embodiment, but the processor 34 executes, in addition to the search process, a response message transmission process, etc.

In the response message transmission process, the processor 34 controls the communicator 32 so as to send out a response message including a notification that an image file (content) has been transmitted and the file name of the image file (the identification information of the content) to the information centric network.

The server 2 includes a communicator 21 (receiver, transmitter), a memory 22, and a processor 23.

The communicator 21 performs transmission and reception of the interest (request message) and the response message to and from the information centric network. Also, the communicator 21 transmits and receives image files (contents) via the IP network.

The memory 22 stores programs executed by the processor 23 and the like.

The processor 23 executes various processes related to information collection by executing the programs stored in the memory 22. In the present embodiment, the processor 23 executes an interest forwarding process, a reception data forwarding process, etc.

In the interest forwarding process, the processor 23 controls the communicator 21 such that when an interest from the user terminal 1 is received by the communicator 21, the communicator 21 forwards the interest to a lower node (such as the router on the side of the camera 3) in the information centric network.

In the reception data forwarding process, the processor 23 controls the communicator 21 such that when an image file (content) transmitted from the camera 3 via the IP network is received by the communicator 21, the communicator 21 forwards the image file to the user terminal 1.

Figure 34:
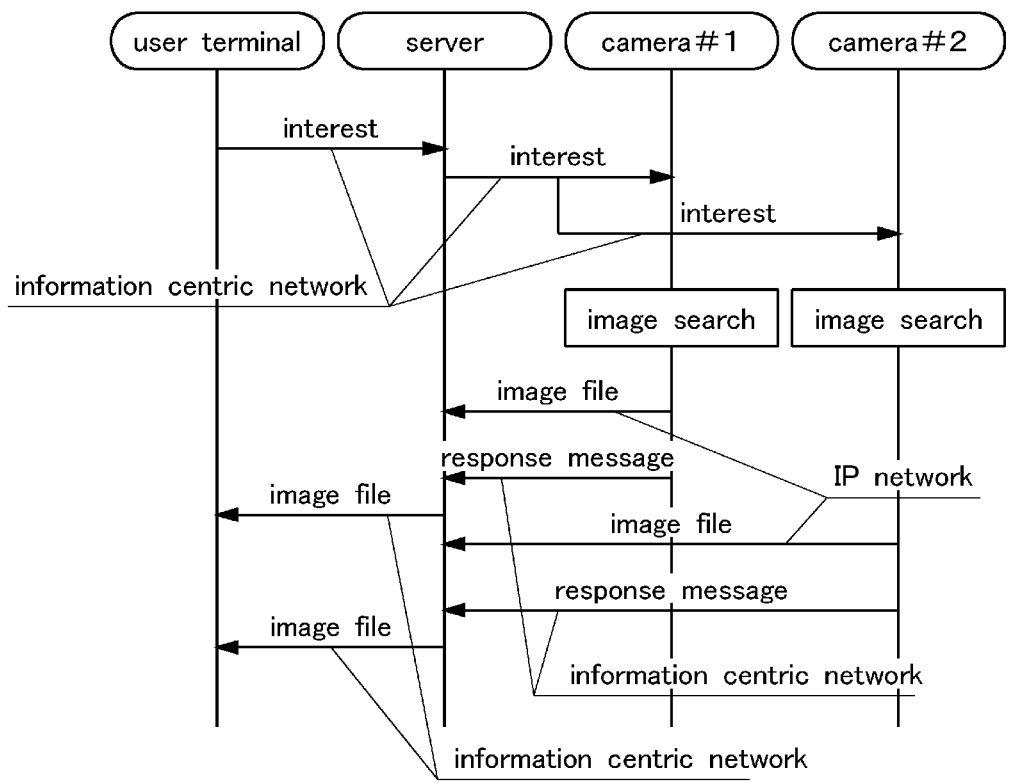
FIG. 34 is a sequence diagram showing an operating procedure of a communication system according to the sixteenth embodiment.

Next, an operating procedure of the communication system according to the sixteenth embodiment will be described. FIG. 34 is a sequence diagram showing an operating procedure of the communication system.

First, the user terminal 1 sends out an interest that includes text data (request content data) describing the search criteria to the server 2, and the server 2 sends out the interest to the information centric network.

Next, when each camera 3 receives the interest from the user terminal 1, the camera 3 searches for an image file that meets the search criteria described in the text data included in the interest from among the image files accumulated in the own device (image search).

Subsequently, each camera 3 transmits the image file(s) found by the image search to the server 2 via the IP network. Also, each camera 3 transmits, to the server 2 via the information centric network, a response message including the file name of each image file transmitted to the server 2.

Next, when the server 2 receives the image file(s) from each camera 3, the server 2 accumulates the image file(s) in the own device. Then, when the server 2 receives the response message from each camera 3, the server 2 transmits the image file(s) to the user terminal 1.

Seventeenth Embodiment

Figure 35:
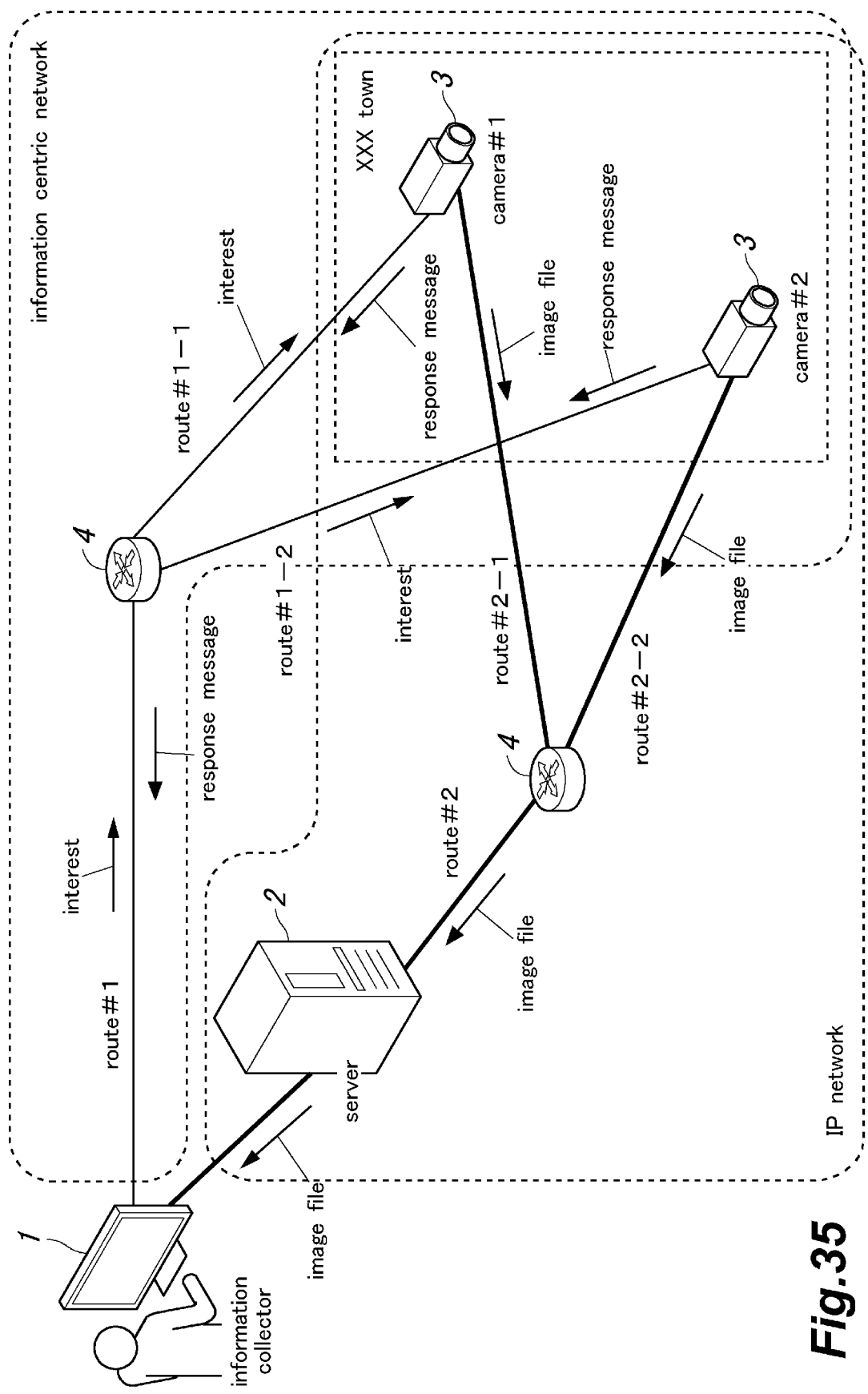
FIG. 35 is an overall configuration diagram of a communication system according to the seventeenth embodiment.

Next, the seventeenth embodiment will be described. Note that except for what will be particularly discussed here, this embodiment is the same as the above-described embodiment. FIG. 35 is an overall configuration diagram of a communication system according to the seventeenth embodiment.

In the present embodiment, as in the fifteenth embodiment (see FIG. 29), the user terminal 1 transmits the interest to the cameras 3 via the information centric network (low-speed communication route). Also, in the present embodiment, as in the sixteenth embodiment, the cameras 3 transmit image files to the server 2 via the IP network (high-speed communication route).

Further, in the present embodiment, as in the sixteenth embodiment (see FIG. 32), each camera 3 sends out a response message as a reply to the interest to the information centric network. However, while the response message is received by the server 2 in the sixteenth embodiment, the response message is received by the user terminal 1 in the present embodiment.

When the server 2 receives an image file from any camera 3, the server 2 temporarily accumulates the image file in the own device. Then, in response to a transmission request from the user terminal 1, the server 2 transmits the image file to the user terminal 1.

By receiving the response message from the camera 3, the user terminal 1 can recognize that an image file (content) that the own device requested with the interest has been transmitted via a different route as well as the file name of the image file (the identification information of the content). Then, the user terminal 1 accesses the server 2 in response to the user's operation or at an appropriate timing, for example, when a predetermined time has elapsed from the transmission of the interest, and acquires, from the server 2, the image file having the file name notified by the response message.

Thus, in the present embodiment, since the image file(s) transmitted from each camera 3 is temporarily accumulated in the server 2, it is possible to prevent a lot of image files from being sent to the user terminal 1 in a concentrated manner.

Figure 36:
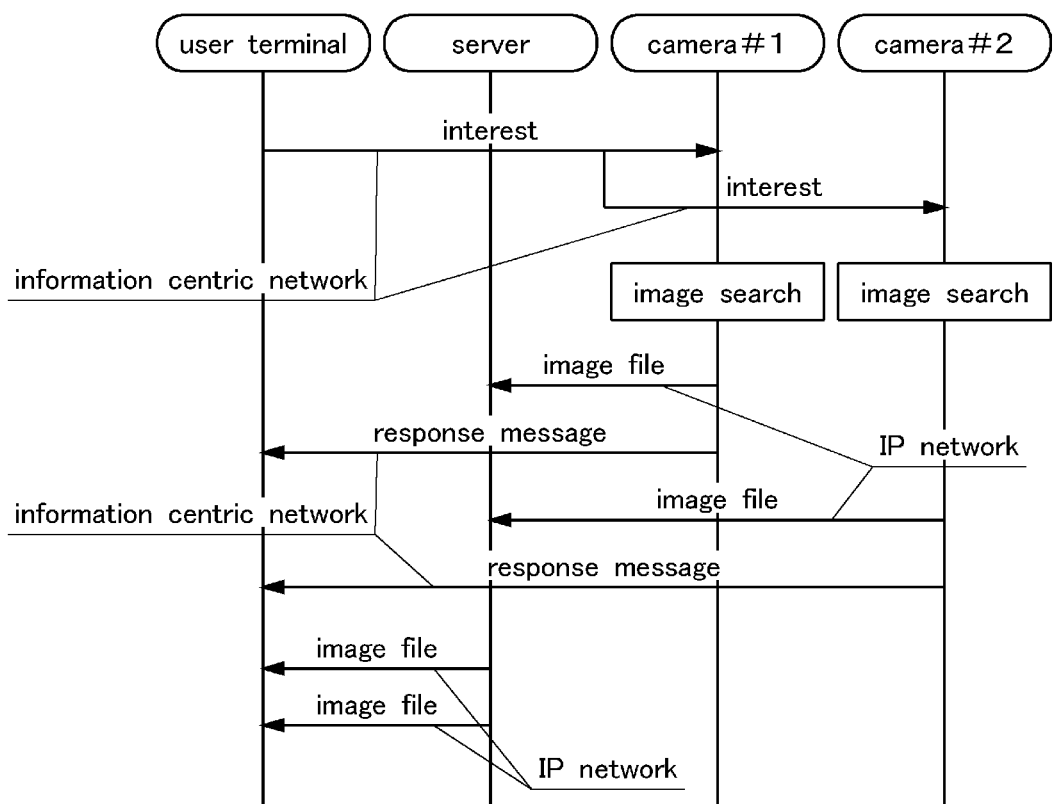
FIG. 36 is a sequence diagram showing an operating procedure of the communication system according to the seventeenth embodiment.

Next, an operating procedure of the communication system according to the seventeenth embodiment will be described. FIG. 36 is a sequence diagram showing an operating procedure of the communication system according to the seventeenth embodiment.

First, the user terminal 1 sends out an interest that includes text data (request content data) describing the search criteria to the information centric network.

Next, when each camera 3 receives the interest from the user terminal 1, the camera 3 searches for an image file that meets the search criteria described in the text data included in the interest from among the image files accumulated in the own device (image search).

Subsequently, each camera 3 transmits one or more image files found by the image search to the server 2 via the IP network. Also, each camera 3 transmits, to the user terminal 1 via the information centric network, a response message including the file name of each image file transmitted to the server 2.

Next, when the server 2 receives the image file(s) from each camera 3, the server 2 accumulates the image file(s) in the own device.

Also, when the user terminal 1 receives the response message from each camera 3, the user terminal 1 accesses the server 2 and, based on the file names of the image files notified from the cameras 3, instructs the server 2 to transmit the applicable image files, whereby the user terminal 1 acquires the image files.

Eighteenth Embodiment

Figure 37:
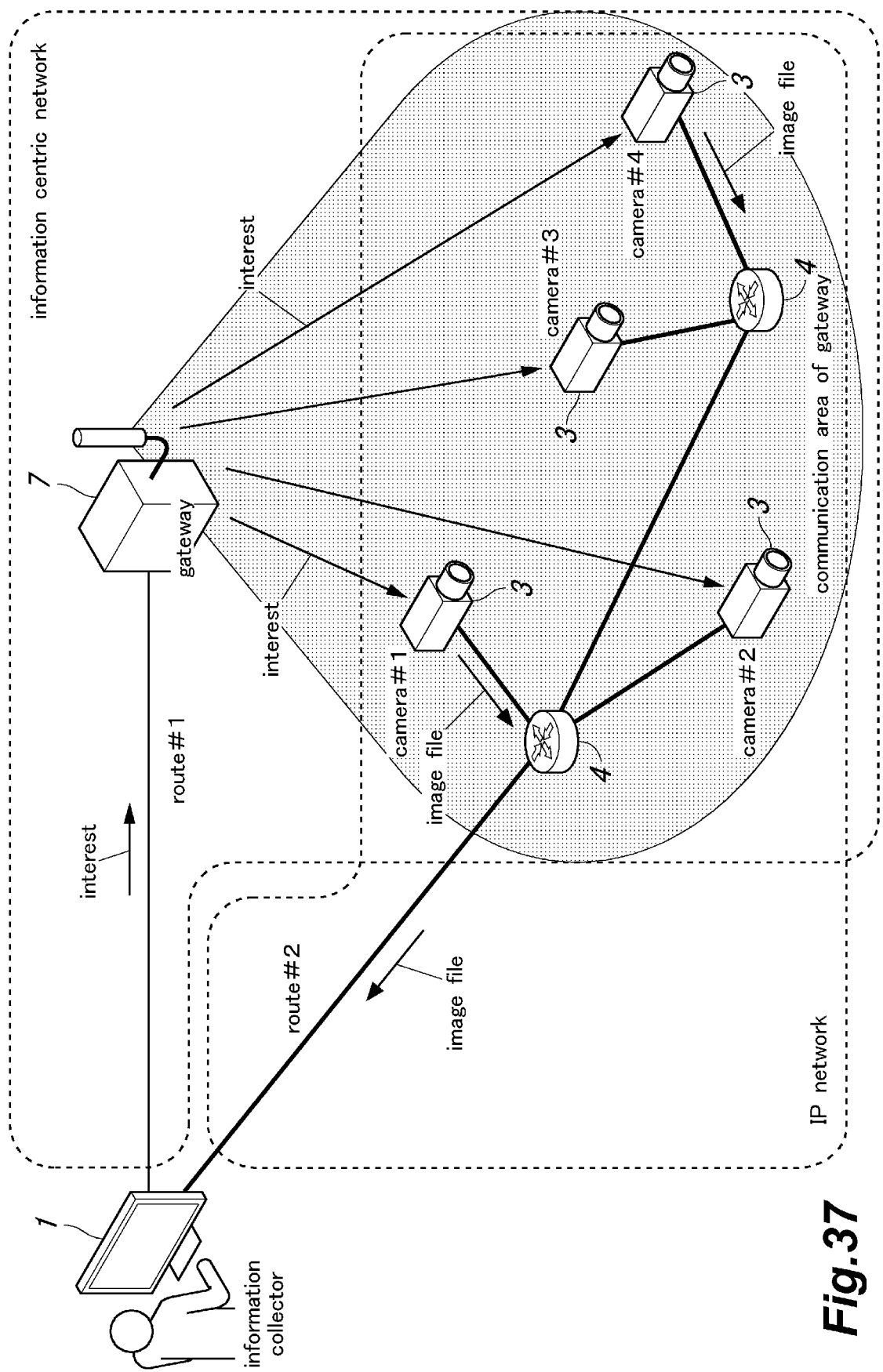
FIG. 37 is an overall configuration diagram of a communication system according to the eighteenth embodiment.

Next, the eighteenth embodiment will be described. Note that except for what will be particularly discussed here, this embodiment is the same as the above-described embodiment. FIG. 37 is an overall configuration diagram of a communication system according to the eighteenth embodiment.

In the present embodiment, as in the fifteenth embodiment (see FIG. 29), the user terminal 1 transmits the interest to the cameras 3 via the information centric network (low-speed communication route), and the cameras 3 transmit image files to the user terminal 1 via the IP network (high-speed communication route).

On the other hand, in the present embodiment, the interest is forwarded to the cameras 3 by using a wireless line. Specifically, a gateway 7 (wireless distributor) serving as a base station for long range wireless communication, particularly, LPWA (Low Power Wide Area) communication, is installed in the low-speed communication route for transmitting the interest, and the interest is forwarded from the gateway 7 to the cameras 3 via LPWA communication.

The gateway 7 transmits the interest by broadcast via LPWA communication Namely, the gateway 7 notifies the interest to the cameras 3 by broadcast communication.

Thereby, the interest can be forwarded simultaneously to the cameras 3 positioned within the communication area of the gateway 7. Also, the forwarding range of the interest can be limited by the communication area of the gateway 7. Namely, it is possible to forward the interest to only the cameras 3 located in a limited range. Therefore, it is possible to avoid forwarding the interest to the cameras 3 located over an unnecessarily wide range.

Note that the configurations of the user terminal 1 and the camera 3 are substantially the same as in the fifteenth embodiment (see FIG. 30), except for that the camera 3 includes, in addition to the communicator 32, another communicator that performs LPWA communication.

Figure 38:
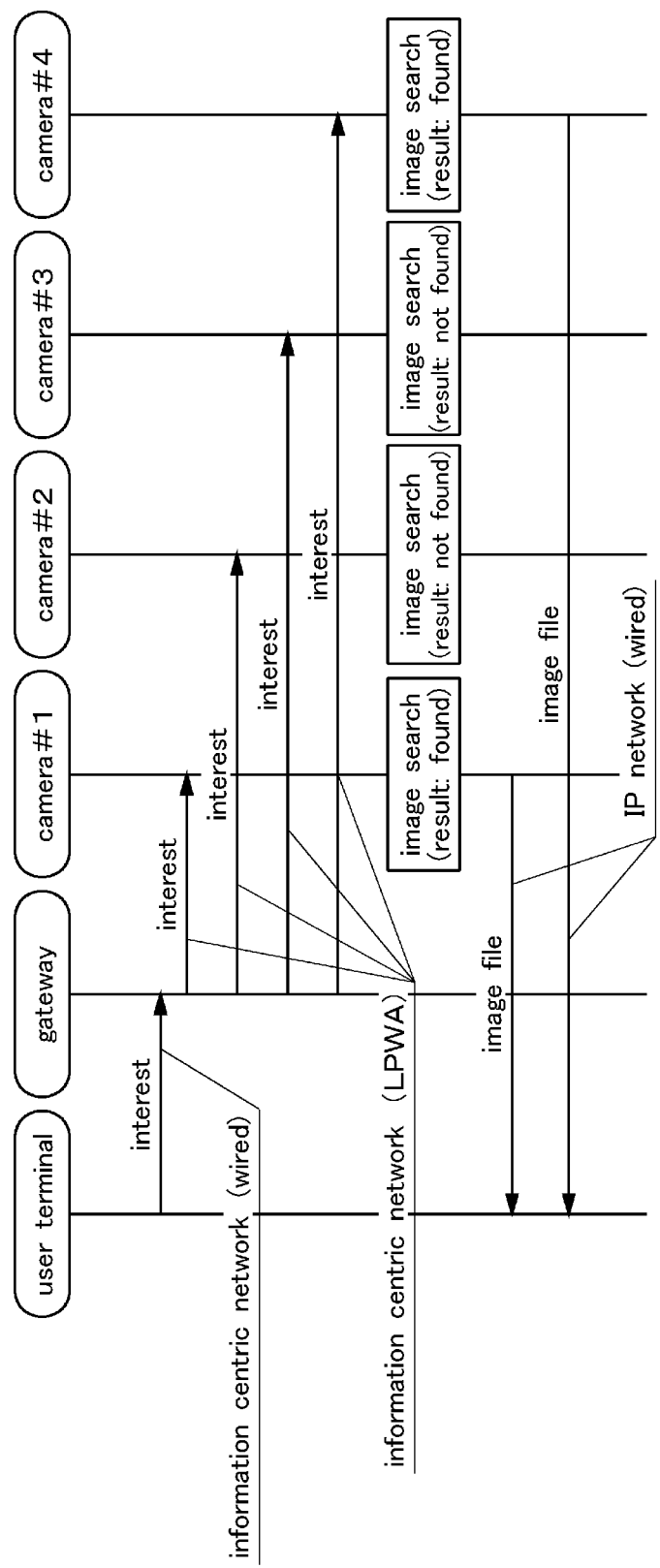
FIG. 38 is a sequence diagram showing an operating procedure of the communication system according to the eighteenth embodiment.

Next, an operating procedure of the communication system according to the eighteenth embodiment will be described. FIG. 38 is a sequence diagram showing an operating procedure of the communication system according to the eighteenth embodiment.

First, the user terminal 1 sends out an interest that includes text data (request content data) describing the search criteria to the information centric network. Subsequently, when the gateway 7 receives the interest from the user terminal 1, the gateway 7 simultaneously transmits the interest to the multiple cameras 3 within the communication area of the gateway 7 by broadcast via LPWA communication.

Next, when each camera 3 receives the interest from the gateway 7, the camera 3 searches for an image file that meets the search criteria described in the text data included in the interest from among the image files accumulated in the own device (image search).

Subsequently, some cameras 3 transmit the image files found by the image search to the user terminal 1 via the IP network. Note that in the example shown in FIG. 38, two cameras 3 (camera #1, camera #4) find image files that meet the search criteria by the image search and accordingly transmit the image files to the user terminal 1. On the other hand, the other two cameras 3 (camera #2, camera #3) find no image files that meet the search criteria by the image search and accordingly transmit no image files.

Nineteenth Embodiment

Figure 39:
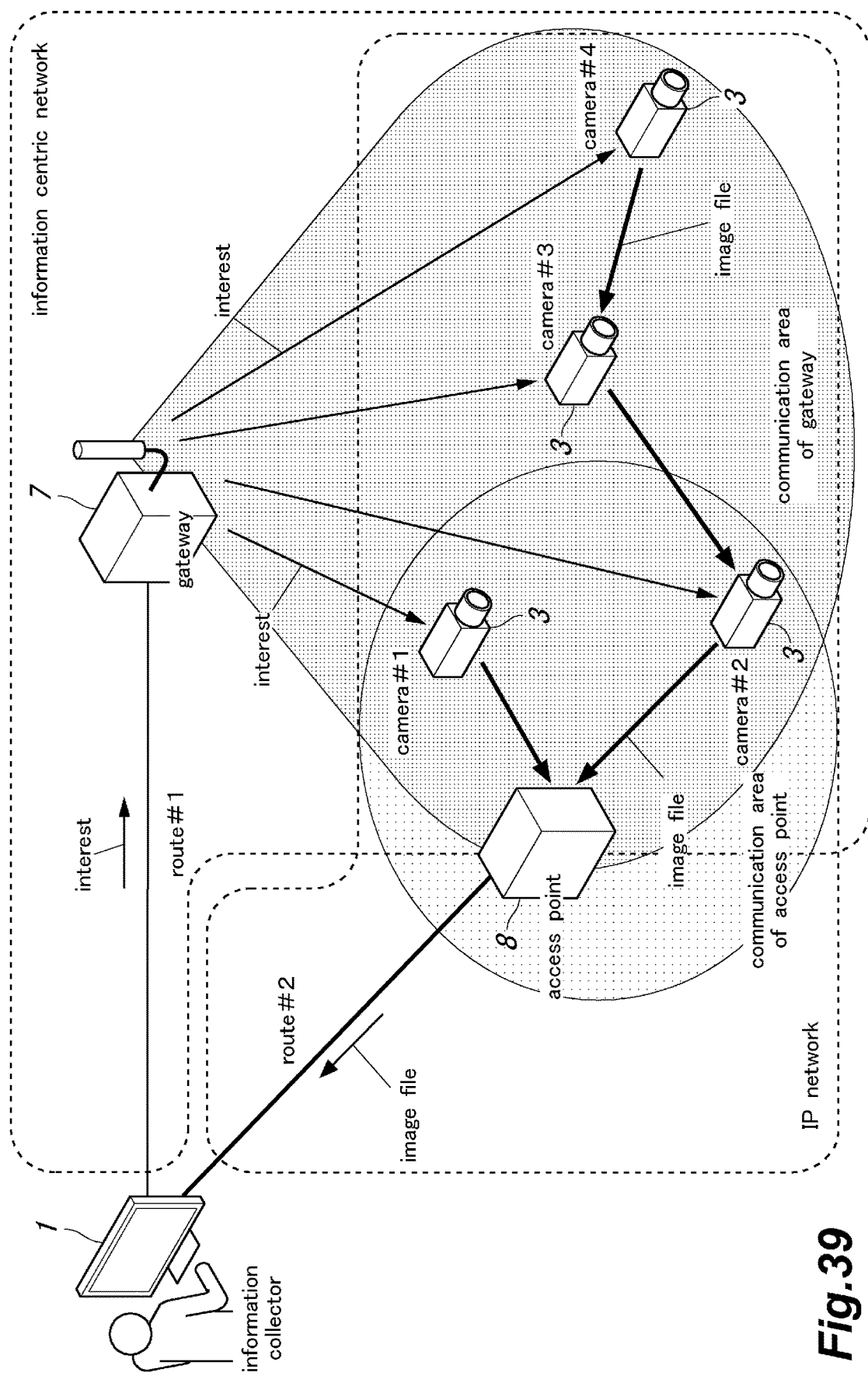
FIG. 39 is an overall configuration diagram of a communication system according to the nineteenth embodiment.

Next, the nineteenth embodiment will be described. Note that except for what will be particularly discussed here, this embodiment is the same as the above-described embodiment. FIG. 39 is an overall configuration diagram of a communication system according to the nineteenth embodiment.

In the present embodiment, as in the eighteenth embodiment (see FIG. 37), the interest is transmitted from the gateway 7 to the cameras 3 via LPWA communication.

On the other hand, in the present embodiment, an access point 8 (wireless distributor) that performs relatively high-speed near field communication, specifically, WLAN communication such as WiFi (registered trademark) communication, is installed in the high-speed communication route for transmitting the image files, and the image files are forwarded from the cameras 3 to the access point 8 via WLAN communication.

Also, the communication area (radio wave reach range) of WiFi (registered trademark) is smaller than the communication area of LPWA, and therefore, there may be a case where the single access point 8 cannot receive the image files transmitted from the all cameras 3 in the communication area of LPWA.

Therefore, in the present embodiment, the image files are forwarded between multiple nearby cameras 3 by multi-hop communication. Namely, the image files are forwarded from one camera 3 to nearby cameras 3 in turn, so that the image files of the cameras 3 positioned outside the communication area of the access point 8 are forwarded to the access point 8 via the cameras 3 positioned within the communication area of the access point 8. In the example of FIG. 39, for example, an image file of the camera #4 is forward to the access point 8 via the camera #3 and the camera #2.

Figure 40:
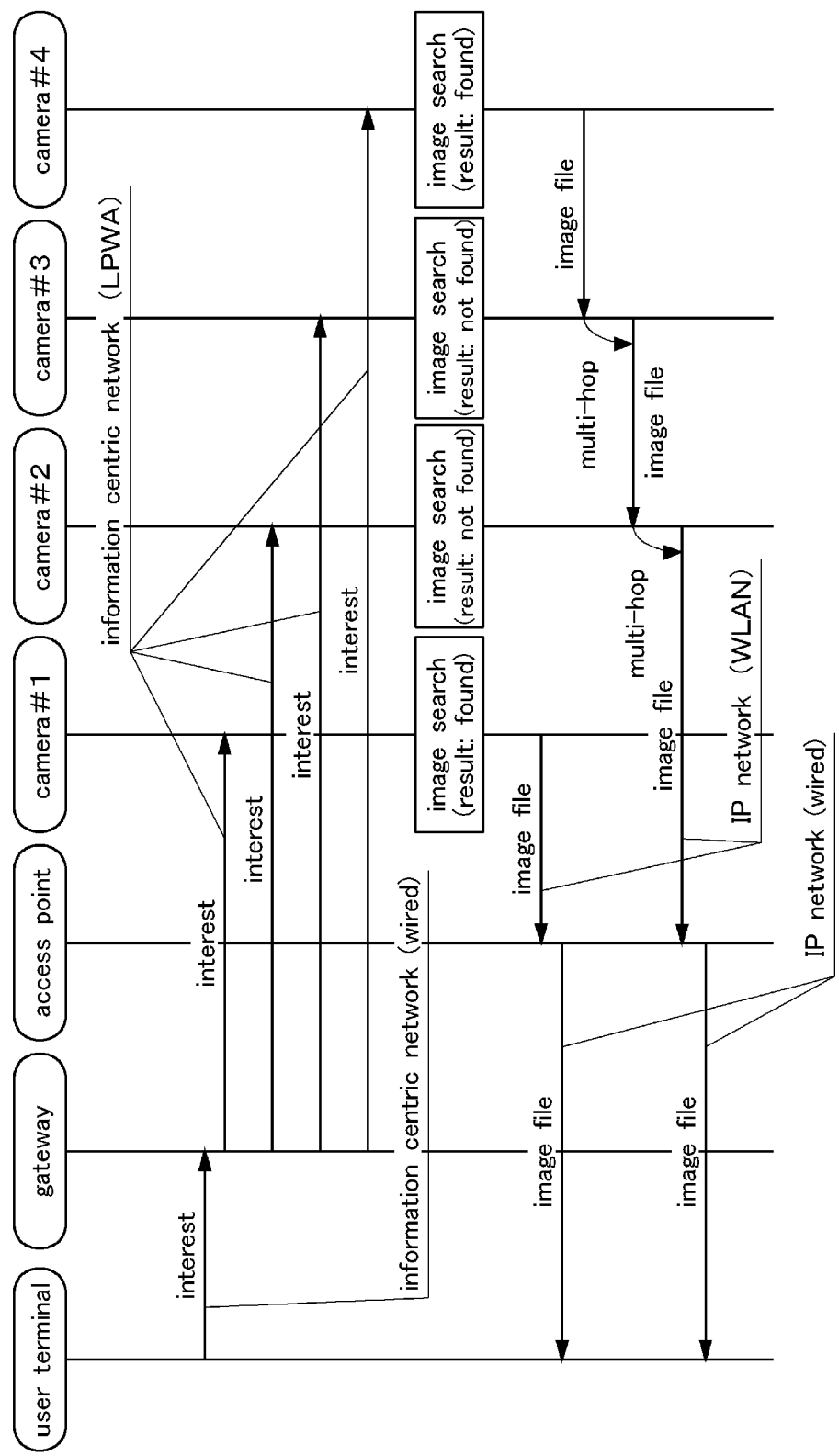
FIG. 40 is a sequence diagram showing an operating procedure of the communication system according to the nineteenth embodiment.

Next, an operating procedure of the communication system according to the nineteenth embodiment will be described. FIG. 40 is a sequence diagram showing an operating procedure of the communication system according to the nineteenth embodiment.

First, the user terminal 1 sends out an interest that includes text data (request content data) describing the search criteria to the information centric network. Subsequently, when the gateway 7 receives the interest from the user terminal 1, the gateway 7 simultaneously transmits the interest to the multiple cameras 3 within the communication area of the gateway 7 by broadcast via LPWA communication.

Next, when each camera 3 receives the interest from the gateway 7, the camera 3 searches for an image file that meets the search criteria described in the text data included in the interest from among the image files accumulated in the own device (image search).

Subsequently, in the case where the camera 3 holding an image file that meets the search criteria is positioned within the communication area of the access point 8, the camera 3 forwards the image file to the access point 8 via WLAN communication.

Also, in the case where the camera 3 holding an image file that meets the search criteria is positioned outside the communication area of the access point 8, the camera 3 forwards the image file to nearby cameras 3 by multi-hop communication. Then, when a camera 3 positioned within the communication area of the access point 8 receive the image file from the camera 3 positioned outside the communication area of the access point 8, the camera 3 forwards the image file to the access point 8. In the example of FIG. 40, as in FIG. 39, an image file of the camera #4 is forwarded to the access point 8 via the camera #3 and the camera #2 according to multi-hop communication between the multiple cameras 3.

Subsequently, when the access point 8 receives image files from some cameras 3, the access point 8 transmits the image files to the user terminal 1 via the IP network.

Twentieth Embodiment

Figure 41:
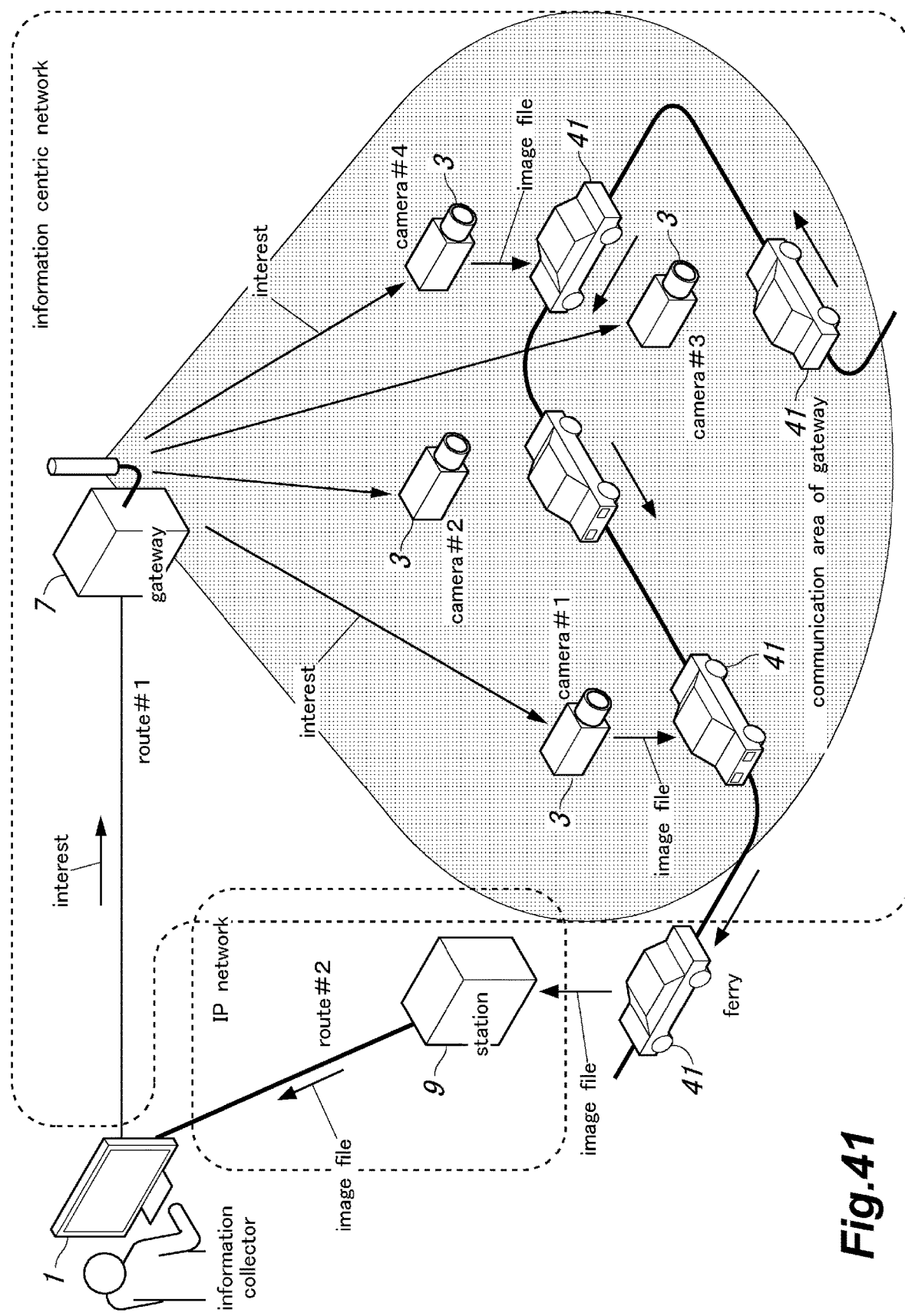
FIG. 41 is an overall configuration diagram of a communication system according to the twentieth embodiment.

Next, the twentieth embodiment will be described. Note that except for what will be particularly discussed here, this embodiment is the same as the above-described embodiment. FIG. 41 is an overall configuration diagram of a communication system according to the twentieth embodiment.

In the present embodiment, as in the eighteenth embodiment (see FIG. 37), the interest is simultaneously transmitted from the gateway 7 to the cameras 3 by broadcast via LPWA communication.

On the other hand, in the present embodiment, a moving body such as a vehicle or a pedestrian is used as a ferry 41 that transports the image files according to the message ferry method, whereby the image files accumulated in the cameras 3 are forwarded from the cameras 3 via the ferry 41. The ferry 41 accumulates the image files forwarded from the cameras 3.

Also, a station 9 (station device) is installed in the high-speed communication route (route #2) of the IP network. The ferry 41 first arrives at each camera 3 so that the image files are forwarded from the cameras 3 to the ferry 41. Then, when the ferry 41 arrives at the station 9, the image files collected from the cameras 3 are forwarded from the ferry 41 to the station 9. Note that in the example of FIG. 41, two cameras 3 (camera #1, camera #4) find image files that meet the search criteria by the image search and accordingly forward the image files to the ferry 41. On the other hand, the other two cameras 3 (camera #2, camera #3) find no image files that meet the search criteria by the image search and accordingly forward no image files.

As described above, in the present embodiment, since the image files that meet the search criteria for the image search are forwarded from the cameras 3 by the message ferry method, it is possible to deliver the image files of the cameras 3 to the user terminal 1 even when the high-speed communication route of the IP network ends up partway.

Note that in the case where a vehicle acts as the ferry 41, an onboard terminal installed in the vehicle specifically performs the operation of the ferry 41. This onboard terminal has functions of LPWA communication, information centric network communication, and IP network communication.

Also, in the present embodiment, the forwarding of the image files from the cameras 3 to the ferry 41 and the forwarding of the image files from the ferry 41 to the station 9 are performed via wired communication. Therefore, the ferry 41 and each camera 3 are connected by communication terminals, and the station 9 and the ferry 41 are connected by communication terminals. In this case, for example, a charger may be annexed to the station 9 so that when the charger and an electric vehicle are connected to transmit electric power for charging from the charger to the electric vehicle, the image files are forwarded from the ferry 41 to the station 9.

Figure 42:
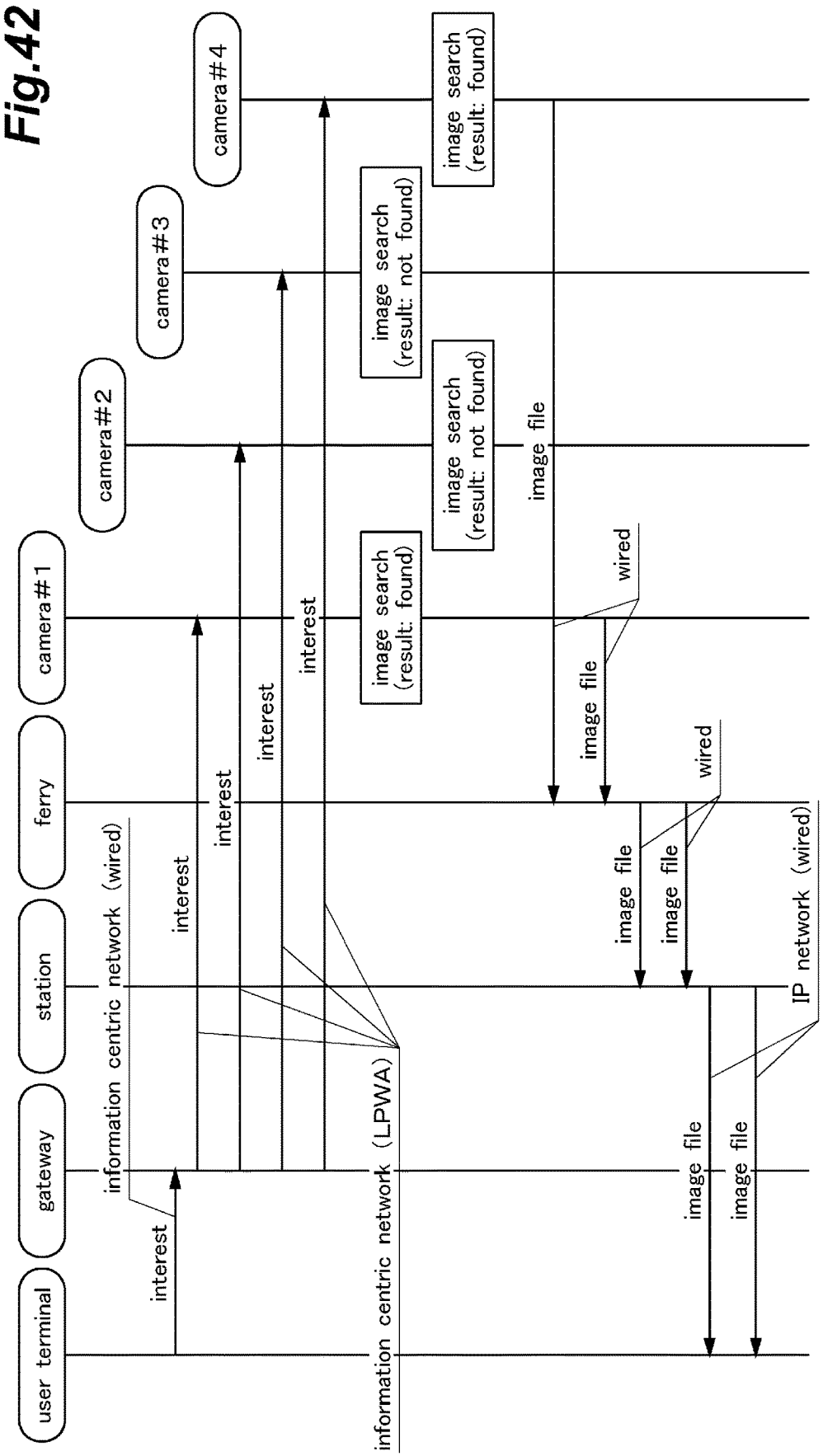
FIG. 42 is a sequence diagram showing an operating procedure of the communication system according to the twentieth embodiment.

Next, an operating procedure of the communication system according to the twentieth embodiment will be described. FIG. 42 is a sequence diagram showing an operating procedure of the communication system.

First, the user terminal 1 sends out an interest that includes text data (request content data) describing the search criteria to the information centric network. Subsequently, when the gateway 7 receives the interest from the user terminal 1, the gateway 7 simultaneously transmits the interest to the multiple cameras 3 within the communication area of the gateway 7 by broadcast via LPWA communication.

Next, when each camera 3 receives the interest from the gateway 7, the camera 3 searches for an image file that meets the search criteria described in the text data included in the interest from among the image files accumulated in the own device (image search).

Subsequently, when the ferry 41 comes near to a camera 3 holding an image file that meets the search criteria, the camera 3 forwards the image file that meets the search criteria found by the image search to the ferry 41.

Next, when the ferry 41 comes near to the station 9, the ferry 41 forwards the image files collected from the cameras 3 to the station 9.

Then, when the station 9 receives the image files from the ferry 41, the station 9 transmits the image files to the user terminal 1 via the IP network.

Twenty First Embodiment

Figure 43:
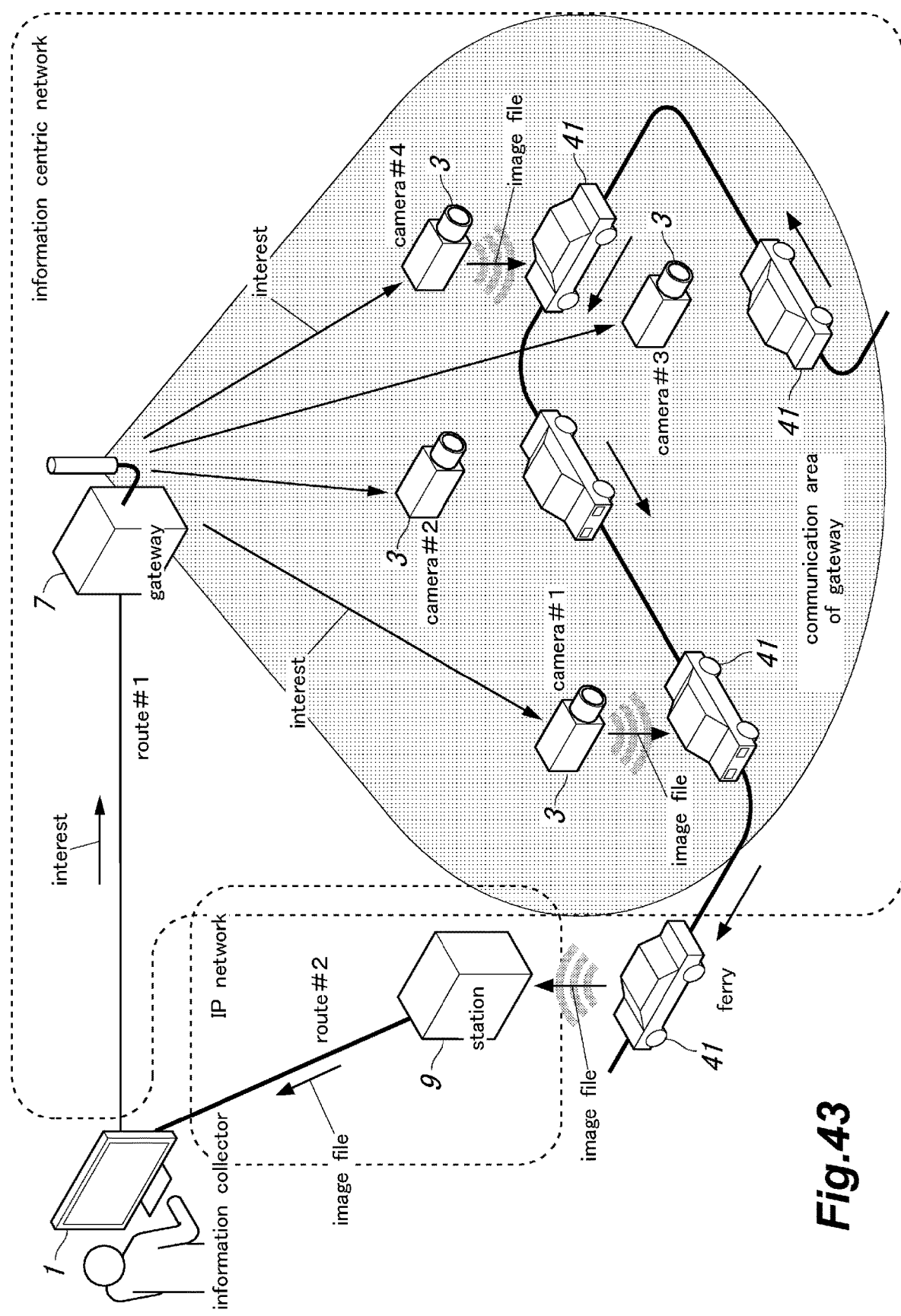
FIG. 43 is an overall configuration diagram of a communication system according to the twenty first embodiment.

Next, the twenty first embodiment will be described. Note that except for what will be particularly discussed here, this embodiment is the same as the above-described embodiment. FIG. 43 is an overall configuration diagram of a communication system according to the twenty first embodiment. Note that an operating procedure of the communication system according to this embodiment is the same as in the twentieth embodiment (see FIG. 42).

In the present embodiment, as in the twentieth embodiment (see FIG. 41), the interest is simultaneously transmitted from the gateway 7 to the multiple cameras 3 within the communication area of the gateway 7 by broadcast via LPWA communication. Also, the cameras 3 forward the image files to the ferry 41. And, the ferry 41 forward the image files to the station 9.

On the other hand, in the present embodiment, the forwarding of the image files from the cameras 3 to the ferry 41 and the forwarding of the image files from the ferry 41 to the station 9 are performed via near field communication such as WLAN communication. Note that in the example of FIG. 43, two cameras 3 (camera #1, camera #4) find image files that meet the search criteria by the image search and accordingly forward the image files to the ferry 41. On the other hand, the other two cameras 3 (camera #2, camera #3) find no image files that meet the search criteria by the image search and accordingly forward no image files.

Thereby, when the image files are forwarded from the ferry 41 to the station 9, it is only necessary for the ferry 41 to travel near the station 9 without arriving at the station 9. Also, when the image files are forwarded from each camera 3 to the ferry 41, it is only necessary for the ferry 41 to travel near the camera 3.

Note that in the present embodiment, the forwarding of the image files from the cameras 3 to the ferry 41 and the forwarding of the image files from the ferry 41 to the station 9 are performed via near field communication such as WLAN communication, but the communication method is not limited to WLAN communication. For example, it is possible to forward the image files by using infrared communication, Bluetooth (registered trademark), millimeter wave communication, or the like. Also, the operating procedure of the communication system according to the present embodiment is the same as in the twentieth embodiment (see FIG. 42) except for that the forwarding from the cameras 3 to the ferry 41 and the forwarding means from the ferry 41 to the station 9 are achieved by near field wireless communication.

Twenty Second Embodiment

Figure 44:
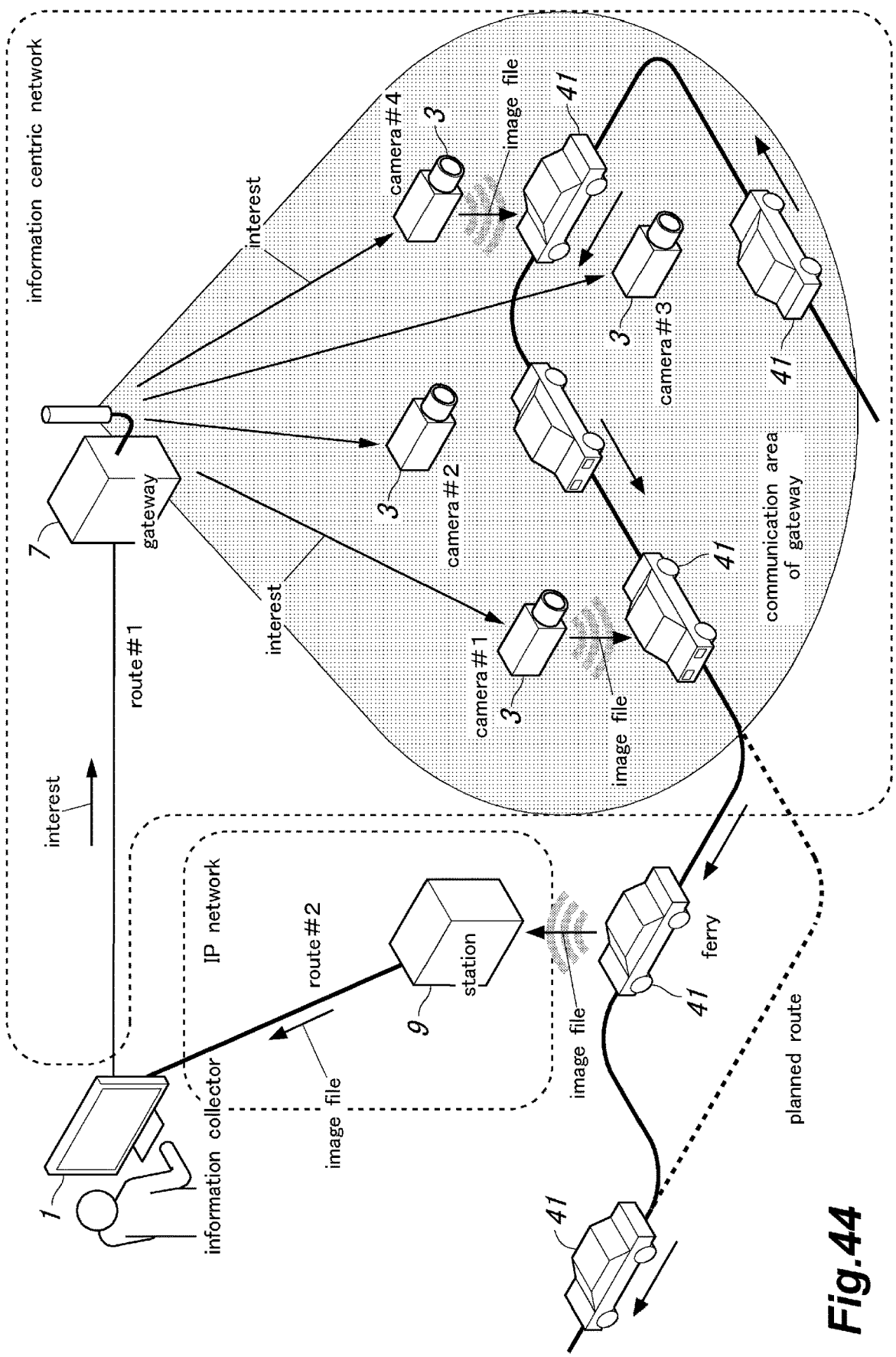
FIG. 44 is an overall configuration diagram of a communication system according to the twenty second embodiment.

Next, the twenty second embodiment will be described. Note that except for what will be particularly discussed here, this embodiment is the same as the above-described embodiment. FIG. 44 is an overall configuration diagram of a communication system according to the twenty second embodiment.

In the present embodiment, as in the twenty first embodiment (see FIG. 43), the interest is simultaneously transmitted from the gateway 7 to the multiple cameras 3 within the communication area of the gateway 7 by broadcast via LPWA communication. Also, the cameras 3 forward the image files that meet the search criteria found by the image search to the ferry 41 via near field communication such as WLAN communication.

On the other hand, in the present embodiment, the gateway 7 notifies the position of the station 9 to the ferry 41 via LPWA communication. Then, the ferry 41 changes the planned route to a route passing near the station 9 so that the image files collected from the cameras 3 can be forwarded to the station 9.

As described above, in the present embodiment, since the ferry 41 changes the route to pass near the station 9, the image files collected from the cameras 3 can be reliably forwarded from the ferry 41 to the station 9.

Note that in the present embodiment, since the route of the ferry 41 (moving body) is changed, cooperation of the person who controls the ferry 41 (for example, in the case where the ferry 41 is a vehicle, the driver of the vehicle) is necessary. Therefore, to promote the cooperation of the person who controls the ferry 41, an incentive (such as card points and discount coupon) may be given when the person cooperates to change the route.

When multiple stations 9 are present around the ferry 41, the gateway 7 may notify the positions of the multiple stations 9 to the ferry 41, and the ferry 41 may select an optimal station 9 based on the planned route of itself.

Figure 45:
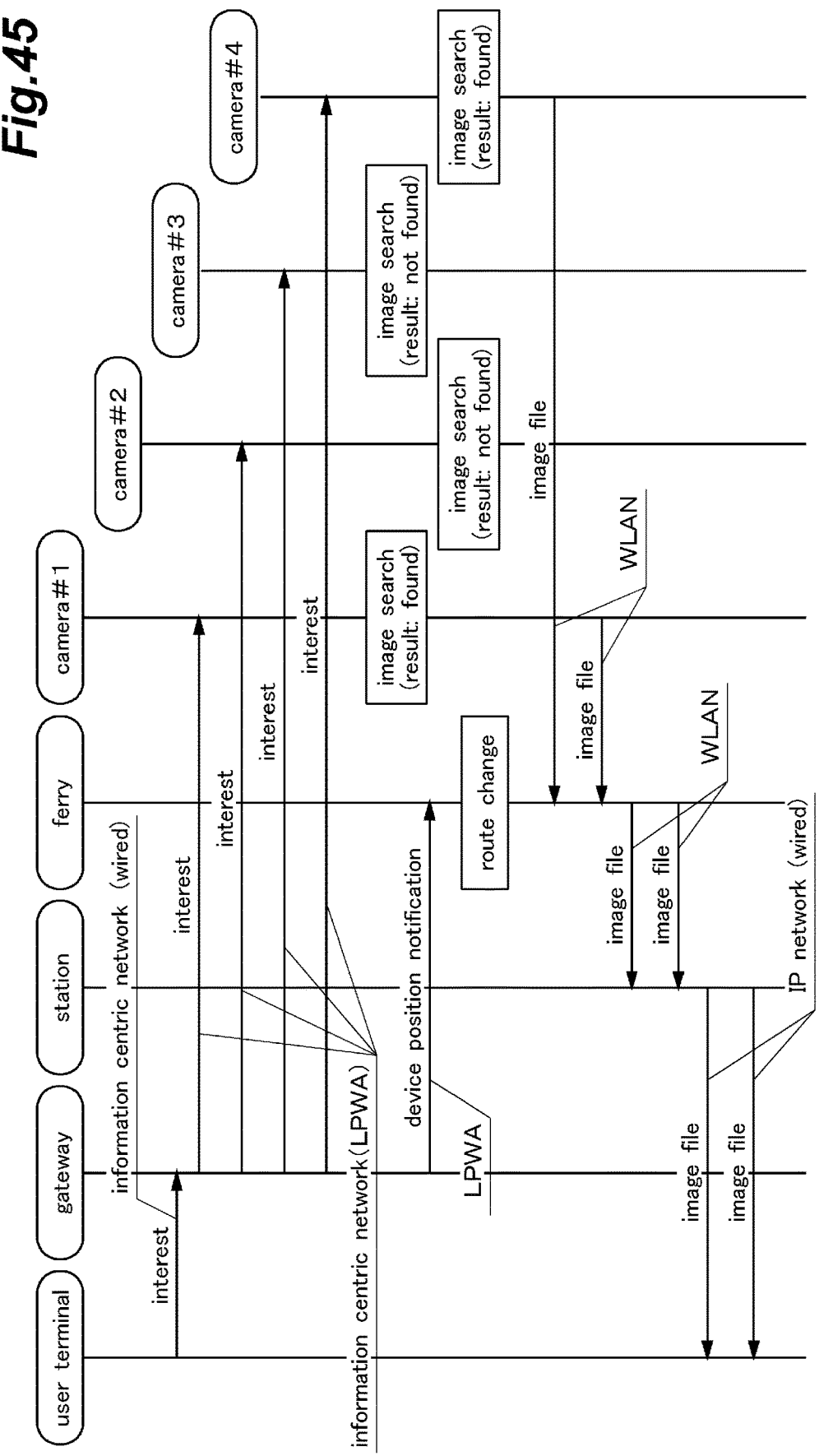
FIG. 45 is a sequence diagram showing an operating procedure of the communication system according to the twenty second embodiment.

Next, an operating procedure of the communication system according to the twenty second embodiment will be described. FIG. 45 is a sequence diagram showing an operating procedure of the communication system.

First, the user terminal 1 sends out an interest that includes text data (request content data) describing the search criteria to the information centric network. Subsequently, when the gateway 7 receives the interest from the user terminal 1, the gateway 7 simultaneously transmits the interest to the multiple cameras 3 within the communication area of the gateway 7 by broadcast via LPWA communication.

Next, when each camera 3 receives the interest from the gateway 7, the camera 3 searches for an image file that meets the search criteria described in the text data included in the interest from among the image files accumulated in the own device (image search).

Also, the gateway 7 transmits the device position notification (interest) including the position information of the station 9 to the ferry 41 via LPWA communication.

Then, when the ferry 41 receives the device position notification from the gateway 7, the ferry 41 changes the movement route of the own device to a route passing the vicinity of the station 9 based on the information included in the device position notification, specifically, the position information of the station 9 (route change).

Subsequently, when the ferry 41 comes near to a camera 3 holding an image file that meets the search criteria, the camera 3 forwards the image file that meets the search criteria to the ferry 41 via near field communication (such as WLAN communication). Note that in the example of FIG. 45, two cameras 3 (camera #1, camera #4) find image files that meet the search criteria by the image search and accordingly forward the image files to the ferry 41. On the other hand, the other two cameras 3 (camera #2, camera #3) find no image files that meet the search criteria by the image search and accordingly forward no image files.

Next, when the ferry 41 comes near to the station 9, the ferry 41 forwards the image files collected from the cameras 3 to the station 9 via near field communication.

Then, when the station 9 receives the image files from the ferry 41, the station 9 transmits the image files to the user terminal 1 via the IP network.

Twenty Third Embodiment

Figure 46:
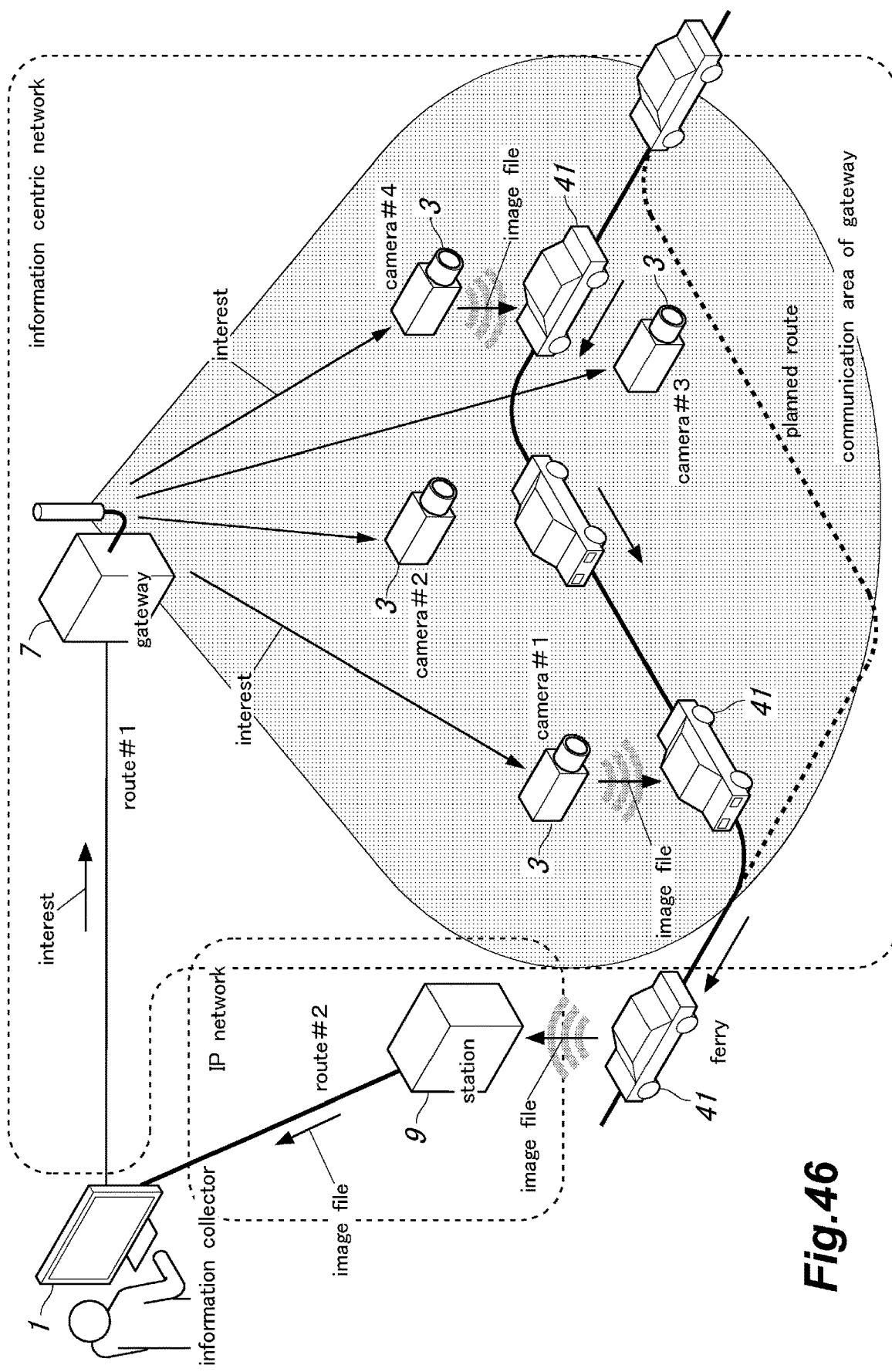
FIG. 46 is an overall configuration diagram of a communication system according to the twenty third embodiment.

Next, the twenty third embodiment will be described. Note that except for what will be particularly discussed here, this embodiment is the same as the above-described embodiment. FIG. 46 is an overall configuration diagram of a communication system according to the twenty third embodiment.

In the present embodiment, as in the twenty first embodiment (see FIG. 43), the interest is simultaneously transmitted from the gateway 7 to the multiple cameras 3 within the communication area of the gateway 7 by broadcast via LPWA communication. Subsequently, each camera 3 searches the image files accumulated in the own device based on the text data (request content data) included in the interest. Then, the cameras 3 forward the applicable image files to the ferry 41 via near field communication (such as WLAN communication).

On the other hand, in the present embodiment, when the cameras 3 accumulate the image files that meet the search criteria specified by the user (information collector), the cameras 3 notify it to the gateway 7. And, the gateway 7 notifies the position information of the cameras 3 accumulating the image files that meet the search criteria to the ferry 41. Then, the ferry 41 changes the planned route to a route passing near the cameras 3 accumulating the image files that meet the search criteria so that the image files can be received via near field communication from the cameras 3 accumulating the image files that meet the search criteria.

As described above, in the present embodiment, the ferry 41 changes the route so as to pass near the cameras 3 accumulating the image files that meet the search criteria, whereby it is possible to reliably forward the image files from the cameras 3 to the ferry 41.

Note that instead of notifying the positions of the cameras 3 accumulating the image files that meet the search criteria to a single ferry 41 so that the ferry 41 pass near the all eligible cameras 3, it is possible to notify the positions of the cameras 3 accumulating the image files that meet the search criteria to multiple ferries 41. In this case, one ferry 41 may select some of the cameras 3 near which the ferry 1 can travel based on the movement route of itself, and leave the remaining cameras 3 to another ferry 41.

Also, in the present embodiment, the positions of the cameras 3 accumulating the image files that meet the search criteria are notified from the gateway 7 to the ferry 41 so that the ferry 41 travels near the cameras 3 accumulating the image files that meet the search criteria, but in combination with the twenty second embodiment, it is possible to notify the position of the station 9 from the gateway 7 to the ferry 41 in addition to the positions of the cameras 3 so that the ferry 41 travels near the cameras 3 accumulating the image file that meets the search criteria as well as near the station 9.

Further, in the present embodiment, as in the twenty second embodiment, the route of the ferry 41 (moving body)

is changed, and therefore, to promote the cooperation of the person who controls the ferry 41, an incentive (such as card points and discount coupon) may be given when the person cooperates to change the route.

Figure 47:
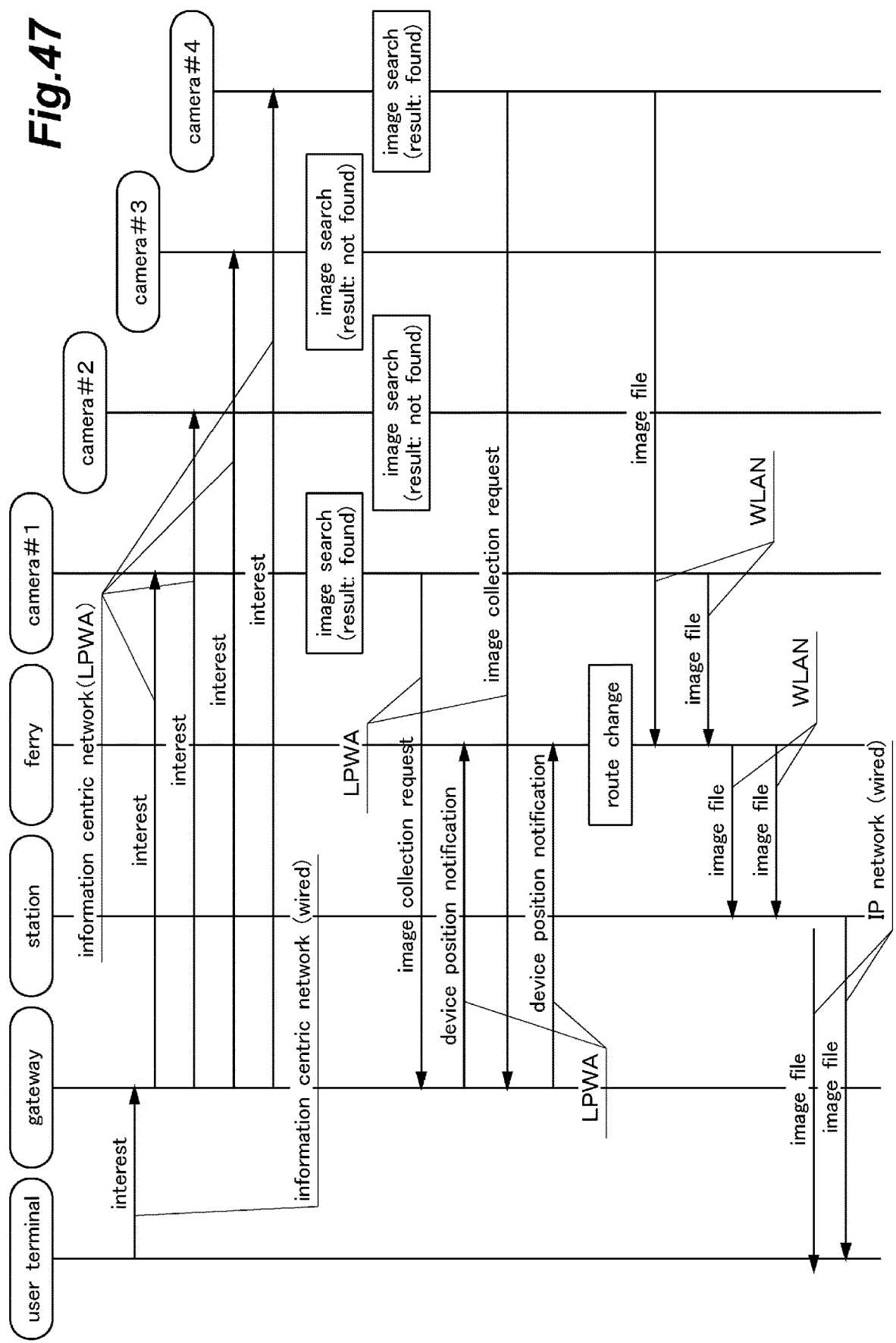
FIG. 47 is a sequence diagram showing an operating procedure of the communication system according to the twenty third embodiment.

Next, an operating procedure of the communication system according to the twenty third embodiment will be described. FIG. 47 is a sequence diagram showing an operating procedure of the communication system.

First, the user terminal 1 sends out an interest that includes text data (request content data) describing the search criteria to the information centric network. Subsequently, when the gateway 7 receives the interest from the user terminal 1, the gateway 7 simultaneously transmits the interest to the multiple cameras 3 within the communication area of the gateway 7 by broadcast via LPWA communication.

Next, when each camera 3 receives the interest from the gateway 7, the camera 3 searches for an image file that meets the search criteria described in the text data included in the interest from among the image files accumulated in the own device (image search). And, when an image file(s) that meets the search criteria is found, the camera 3 transmits to the gateway 7 a notification (image collection request) requesting for collection of the image file that meets the search criteria (content collection). In the example shown in FIG. 47, two cameras 3 (camera #1, camera #4) find image files that meet the search criteria by the image search and accordingly transmit the image collection request to the gateway 7. On the other hand, the other two cameras 3 (camera #2, camera #3) find no image files that meet the search criteria by the image search and accordingly do not transmit the image collection request to the gateway 7.

Subsequently, when the gateway 7 receives image collection requests from the cameras 3, the gateway 7 transmits, to the ferry 41 via LPWA communication, a device position notification (interest) including the position information of the cameras 3 that sent the image collection requests, according to the information included in the image collection requests, specifically, the identification information of the cameras 3 that sent the image collection requests.

Then, when the ferry 41 receives the device position notification from the gateway 7, according to the information included in the device position notification, specifically, the position information of the cameras 3 holding image files that meet the search criteria, the ferry 41 changes the movement route of the own device to a route passing the vicinity of the cameras 3 holding image files that meet the search criteria (route change).

Subsequently, when the ferry 41 comes near to a camera 3 holding an image file that meets the search criteria, the camera 3 forwards the image file that meets the search criteria to the ferry 41 via near field communication (such as WLAN communication).

Next, when the ferry 41 comes near to the station 9, the ferry 41 forwards the image files collected from the cameras 3 to the station 9 via near field communication.

Then, when the station 9 receives the image files from the ferry 41, the station 9 transmits the image files to the user terminal 1 via the IP network.

Twenty Fourth Embodiment

Next, the twenty fourth embodiment will be described. Note that except for what will be particularly discussed here, this embodiment is the same as the above-described embodiment. The configuration of the ferry 41 according to this embodiment is the same as in the twelfth embodiment (see FIG. 26). Note that the description related to the features common with the twelfth embodiment will not be repeated here.

In the present embodiment, as in the twenty first embodiment (see FIG. 43), the image files of the cameras 3 are forwarded by use of the ferry 41 (moving body) according to the message ferry method.

The first communicator 51 transmits the image files to the station 9.

The second communicator 52 receives the interest from the gateway 7. As in the twenty third embodiment, in the case where the position information of the cameras 3 accumulating the image files that meet the search criteria is notified from the gateway 7 to the ferry 41 via LPWA communication, the position information of the cameras 3 is transmitted from the gateway 7 to the ferry 41 when the ferry 41 travels in the communication area of the gateway 7.

The third communicator 53 receives image files from the camera 3.

Note that in the case where the communication with the station 9 and the communication with the cameras 3 are both WLAN communication, the third communicator 53 may be omitted and the first communicator 51 may be used in both the communication with the station 9 and the communication with the cameras 3. Besides this, if some of the first communicator 51, the second communicator 52, and the third communicator 53 adopt the same communication method, those that adopt that communication method may be embodied as a single communicator.

The memory 54 stores programs executed by the processor 55 and the like. Also, the memory 54 accumulates the image files collected from the cameras 3.

The processor 55 executes various processes related to the image file forwarding by executing the programs stored in the memory 54.

Also, the communication between the moving body acting as the ferry 41 and the cameras 3 may be near field communication such as WLAN communication, but in the case where the mobile information terminal (for example, a smartphone or the like) has a function of cellular communication, the image files may be forwarded via cellular communication.

Twenty Fifth Embodiment

Figure 48:
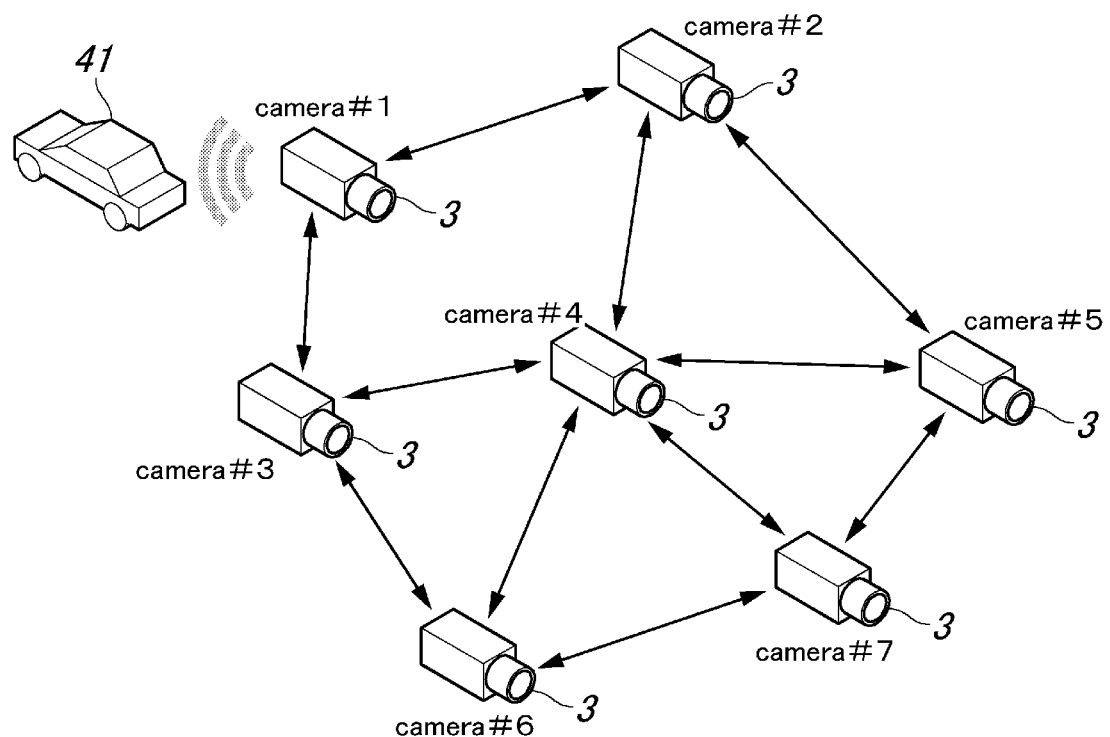
FIG. 48 is an explanatory diagram showing an outline of a communication system according to the twenty fifth embodiment.

Next, the twenty fifth embodiment will be described. Note that except for what will be particularly discussed here, this embodiment is the same as the above-described embodiment. FIG. 48 is an explanatory diagram showing an outline of a communication system according to the twenty fifth embodiment. The configuration of this embodiment is substantially the same as in the thirteenth embodiment (see FIG. 27) but in this embodiment, the direction of forwarding between the ferry 41 and the camera 3 (#1) is opposite from that in the thirteenth embodiment (see FIG. 27).

In the present embodiment, multi-hop communication is performed by the multiple cameras 3. Each camera 3 functions as a repeater, and the image files are forward from one camera 3 to the next in turn. Thereby, the image files are forwarded from the multiple cameras 3 to the ferry 41.

Also, in the present embodiment, the cameras 3 constitute a mesh network. Namely, the multiple cameras 3 are mutually connected so that the multiple cameras 3 functioning as repeaters form mesh-like transmission paths. Thereby, the image files can be collected from the multiple cameras 3 located in a required range.

In the example shown in FIG. 48, the image file of one camera 3 (#1) is forwarded from the camera 3 (#1) to the ferry 41. Also, image files of the other cameras 3 (#2 to #7) are collected to the camera 3 (#1) by being forwarded to the next cameras (#2 to #7) in turn, so that the image files of the cameras 3 (#2 to #7) also are forwarded from the camera 3 (#1) to the ferry 41. Thereby, the image files of the all cameras 3 that constitute the mesh network are forwarded to the ferry 41. Note that configuration may be made such that each camera 3 that has become able to forward an image file to the ferry 41 distributes that information to the other cameras 3 via the mesh network so that the camera 3 to which the image files are to be put together may be set dynamically.

Twenty Sixth Embodiment

Figure 49:
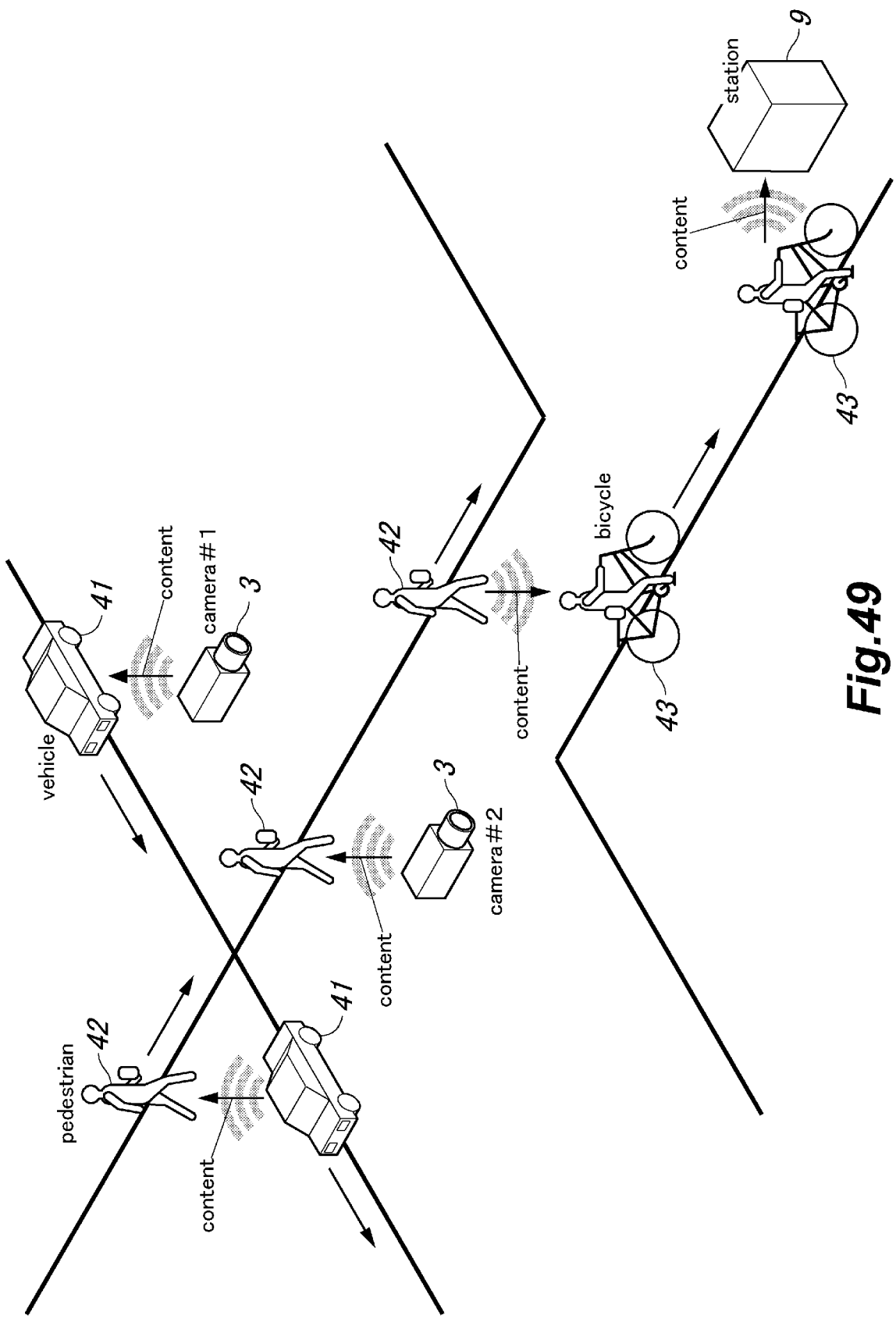
FIG. 49 is an explanatory diagram showing an outline of a communication system according to the twenty sixth embodiment.

Next, the twenty sixth embodiment will be described. Note that except for what will be particularly discussed here, this embodiment is the same as the above-described embodiment. FIG. 49 is an explanatory diagram showing an outline of a communication system according to the twenty sixth embodiment.

In the present embodiment, ferries 41, 42, 43 of multiple types are used.

In the example shown in FIG. 49, when a ferry 41, 42, 43 receives an image file from some camera 3 but it is difficult for the ferry 41, 42, 43 to deliver the image file to the station 9 (for example, when the destination is different or it takes a long time to reach the station 9), the ferry 41, 42, 43 forwards the image file to another ferry 41, 42, 43 that passes by. Then, the ferry 41, 42, 43 passing near the station 9 forwards the image file to the station 9.

In the example of FIG. 49, specifically, an image file is forwarded from the camera 3 (#1) to a vehicle acting as the ferry 41. Then, the image file is forwarded from the vehicle acting as the ferry 41 to a pedestrian acting as the ferry 42. Subsequently, an image file is forwarded from the camera 3 (#2) to the pedestrian acting as the ferry 42. Thereafter, the image files are forwarded from the pedestrian acting as the ferry 42 to a bicycle acting as the ferry 43. Then, the image files are forwarded from the bicycle acting as the ferry 43 to the station 9.

As described above, in the present embodiment, the multiple ferries 41, 42, 43 are used, and further, the ferries 41, 42, 43 of multiple types are used, whereby it is possible to collect image files from the cameras 3 located over a wide range and to reliably forward the image files to the station 9.

In the foregoing, description was made of embodiments to illustrate the technology disclosed in the present application. However, the technology of the present disclosure is not limited to them and may be applied to embodiments which may include change, replacement, addition, omission, etc. Also, new embodiments may be made by combining the components described with respect to the above embodiments.

INDUSTRIAL APPLICABILITY

The information collecting method, the communication control apparatus, and the information collector apparatus according to the present invention have advantages that they can forward the matching target data having a large amount of data to the content accumulating device promptly and stably, and can efficiently perform communication for requesting an unspecified number of content accumulating devices for a content and communication for delivering the found content to the information collector by reconciling the features of the both communications, and are useful as an information collecting method in which an information collector apparatus collects information accumulated in a content accumulating device by using an information centric network, a communication control apparatus connected to the information centric network, and an information collector apparatus connected to the information centric network.

LIST OF REFERENCE NUMERALS 1 user terminal (information collector apparatus)
2 server (communication control apparatus, repeater)
3 camera (content accumulating device)
4 router
5 intermediate server (data accumulating device)
6 server
7 gateway (wireless distributor)
8 access point (wireless distributor, wireless receiver)
9 station (station device)
11 communicator (receiver, transmitter)
12 input
13 display
14 memory
15 processor
21 communicator (receiver, transmitter)
22 memory
23 processor
31 imager
32 communicator (receiver, transmitter)
33 memory
34 processor
41, 42, 43 ferry (moving body)

The invention claimed is:

1. An information collecting method in which an information collector apparatus collects information accumulated in a content accumulating device via an information centric network, wherein:
   the information collector apparatus sends out an interest including request content data and matching target data to the information centric network;
   when a communication control apparatus connected to the information centric network receives the interest from the information collector apparatus, the communication control apparatus separates, from the interest, a simple interest that includes the request content data and does not include the matching target data and a complex interest that includes the matching target data, and sends out the simple interest and the complex interest to the information centric network; and
   when the content accumulating device receives the simple interest and the complex interest from the communication control apparatus, the content accumulating device associates the request content data included in the simple interest with the matching target data included in the complex interest, performs a matching process for verifying whether any of contents accumulated in an own device matches the matching target data based on criteria stipulated in the request content data, and sends out a response message including a matching result of the matching process to the information centric network.

2. The information collecting method according to claim 1, wherein a data accumulating device provided on a high-speed communication path accumulates the matching target data included in the complex interest, and when the content accumulating device receives the simple interest, the content accumulating device requests the data accumulating device to provide the matching target data.

3. The information collecting method according to claim 1, wherein the communication control apparatus sends out the simple interest to a low-speed communication path configuring the information centric network and including a communication section adapted for long range wireless communication, and sends out the complex interest to a high-speed communication path configuring the information centric network and including a communication section adapted for near field communication.

4. The information collecting method according to claim 1, wherein when the content accumulating device receives the complex interest from the communication control apparatus, the content accumulating device forwards the complex interest to another nearby content accumulating device.

5. The information collecting method according to claim 3, wherein a moving body receives the complex interest via near field communication from a station device connected to the high-speed communication path, transports the complex interest, and transmits the complex interest to the content accumulating device via near field communication.

6. The information collecting method according to claim 5, wherein the communication control apparatus notifies a position of the station device to the moving body, and the moving body changes a movement route so as to pass a vicinity of the station device and acquires the complex interest from the station device.

7. The information collecting method according to claim 1, wherein the communication control apparatus sends out the complex interest including pieces of division data obtained by dividing the matching target data to the information centric network, and the content accumulating device acquires the matching target data by integrating the pieces of division data included in the complex interest.

8. The information collecting method according to claim 1, wherein the content accumulating device executes preprocessing based on the request content data included in the simple interest during a period from when the simple interest is received till when the complex interest is received.

9. The information collecting method according to claim 8, wherein as the preprocessing, the content accumulating device searches for a content that meets search criteria described in the request content data included in the simple interest from among the contents accumulated in the own device, and determines whether the matching target data is necessary based on a result of search.

10. The information collecting method according to claim 9, wherein when the content accumulating device determines that the matching target data is necessary, the content accumulating device transmits information related to the own device to the communication control apparatus,
the communication control apparatus notifies information related to the content accumulating device that needs the matching target data to a moving body transporting the complex interest, and
the moving body changes a movement route so as to pass a vicinity of the content accumulating device that needs the matching target data and forwards the complex interest to the content accumulating device.

11. A communication control apparatus connected to an information centric network, comprising:
a receiver that receives an interest including request content data and matching target data from an information collector apparatus;
a processor that separates, from the interest, a simple interest that includes the request content data and does not include the matching target data and a complex interest that includes the matching target data; and
a transmitter that sends out the simple interest and the complex interest to the information centric network.

12. An information collecting method in which an information collector apparatus uses an information centric network to collect information accumulated in a content accumulating device, wherein
the information collector apparatus transmits an interest including request content data to the content accumulating device via a low-speed communication path configuring the information centric network,
when the content accumulating device receives the interest from the information collector apparatus, the content accumulating device searches for a content that meets search criteria described in the request content data included in the interest from among contents accumulated in an own device, and when a content that meets the search criteria is found, transmits the content to the information collector apparatus via a high-speed communication path different from the low-speed communication path,
the content accumulating device sends out a response message, which includes a notification that the content accumulating device has transmitted the content and identification information of the content, to the information centric network, and
a repeater connected to both of the low-speed communication path and the high-speed communication path receives the response message via the low-speed communication path and the content via the high-speed communication path.

13. The information collecting method according to claim 12, wherein the high-speed communication path configures an IP network.

14. An information collecting method in which an information collector apparatus uses an information centric network to collect information accumulated in a content accumulating device, wherein
the information collector apparatus transmits an interest including request content data to the content accumulating device via a low-speed communication path configuring the information centric network,
when the content accumulating device receives the interest from the information collector apparatus, the content accumulating device searches for a content that meets search criteria described in the request content data included in the interest from among contents accumulated in an own device, and when a content that meets the search criteria is found, transmits the content to the information collector apparatus via a high-speed communication path different from the low-speed communication path,
the content accumulating device sends out a response message, which includes a notification that the content accumulating device has transmitted the content and identification information of the content, to the information centric network,
the information collector apparatus receives the response message, and
when a repeater connected to the high-speed communication path receives the content from the content accumulating device, the repeater temporarily accumulates the content and, in response to a transmission request from the information collector apparatus, transmits the content to the information collector apparatus.

15. An information collecting method in which an information collector apparatus uses an information centric network to collect information accumulated in a content accumulating device, wherein the information collector apparatus transmits an interest including request content data to the content accumulating device via a low-speed communication path configuring the information centric network, when the content accumulating device receives the interest from the information collector apparatus, the content accumulating device searches for a content that meets search criteria described in the request content data included in the interest from among contents accumulated in an own device, and when a content that meets the search criteria is found, transmits the content to the information collector apparatus via a high-speed communication path different from the low-speed communication path, a wireless distributor connected to the low-speed communication path distributes the interest to the content accumulating device via long range wireless communication, and the content accumulating device forwards the content via near field communication to a wireless receiver connected to the high-speed communication path.

16. An information collecting method in which an information collector apparatus uses an information centric network to collect information accumulated in a content accumulating device, wherein the information collector apparatus transmits an interest including request content data to the content accumulating device via a low-speed communication path configuring the information centric network, when the content accumulating device receives the interest from the information collector apparatus, the content accumulating device searches for a content that meets search criteria described in the request content data included in the interest from among contents accumulated in an own device, and when a content that meets the search criteria is found, transmits the content to the information collector apparatus via a high-speed communication path different from the low-speed communication path, and a moving body receives the content from the content accumulating device via near field communication, transports the content, and forwards the content via near field communication to a station device connected to the high-speed communication path.

17. The information collecting method according to claim 16, wherein a wireless distributor connected to the low-speed communication path notifies a position of the station device to the moving body, and the moving body changes a movement route so as to pass a vicinity of the station device and forwards the content collected from the content accumulating device to the station device.

18. The information collecting method according to claim 16, wherein the content accumulating device transmits a notification that requests content collection to the wireless distributor connected to the low-speed communication path when the content that meets the search criteria was found by a search process, the wireless distributor notifies information related to the content accumulating device that requested the content collection to the moving body, and the moving body changes a movement route so as to pass a vicinity of the content accumulating device that requested the content collection and receives the content forwarded from the content accumulating device.

* * * * *